United States Patent
Setlur et al.

(10) Patent No.: US 11,567,967 B2
(45) Date of Patent: *Jan. 31, 2023

(54) APPLYING A VISUAL ANALYTICS INTENT LANGUAGE TO INFER AMBIGUOUS OR UNDERSPECIFIED INTENT

(71) Applicant: Tableau Software, LLC, Seattle, WA (US)

(72) Inventors: Vidya Raghavan Setlur, Portola Valley, CA (US); Scott Sherman, Seattle, WA (US); Matthew Michael Brehmer, Seattle, WA (US)

(73) Assignee: TABLEAU SOFTWARE, LLC, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/220,821

(22) Filed: Apr. 1, 2021

(65) Prior Publication Data
US 2022/0318260 A1     Oct. 6, 2022

Related U.S. Application Data

(63) Continuation of application No. 17/219,784, filed on Mar. 31, 2021.
(Continued)

(51) Int. Cl.
*G06F 16/26* (2019.01)
*G06F 16/248* (2019.01)
*G06F 16/2457* (2019.01)

(52) U.S. Cl.
CPC .......... *G06F 16/26* (2019.01); *G06F 16/248* (2019.01); *G06F 16/2457* (2019.01)

(58) Field of Classification Search
CPC ..... G06F 16/26; G06F 16/2457; G06F 16/248
(Continued)

(56) References Cited

U.S. PATENT DOCUMENTS

| 10,896,297 | B1 | 1/2021 | Tory et al. |
| 10,922,493 | B1* | 2/2021 | Das ...................... G06F 16/243 |

(Continued)

OTHER PUBLICATIONS

Setlur, Notice of Allowance, U.S. Appl. No. 17/220,835, dated Jun. 23, 2022, 10pgs.
(Continued)

*Primary Examiner* — Dung K Chau
(74) *Attorney, Agent, or Firm* — Morgan, Lewis & Bockius LLP

(57) ABSTRACT

An electronic device has one or more processors and memory. The memory stores one or more programs configured for execution by the one or more processors. The device receives a request directed to a data source. The request includes one or more intent types and one or more predefined attributes associated with the intent types. Each of the predefined attributes limits a respective data analysis operation of a respective intent type. In response to the request, for each of the intent types, the device formulates a respective intent specification according to the request. The device also applies one or more respective rules corresponding to the respective intent type to determine whether the respective intent type is ambiguous and/or underspecified. When the respective intent type is ambiguous and/or underspecified, the device infers information to resolve the ambiguous and/or underspecified intent.

20 Claims, 45 Drawing Sheets

Related U.S. Application Data

(60) Provisional application No. 63/168,212, filed on Mar. 30, 2021.

(58) Field of Classification Search
 USPC .......................................................... 707/722
 See application file for complete search history.

(56) References Cited

U.S. PATENT DOCUMENTS

| | | | |
|---|---|---|---|
| 10,943,072 B1* | 3/2021 | Jaganmohan | G06N 5/041 |
| 2014/0075004 A1* | 3/2014 | Van Dusen | H04L 41/04 |
| | | | 709/223 |
| 2016/0007083 A1* | 1/2016 | Gurha | G06Q 30/0267 |
| | | | 725/13 |
| 2017/0235848 A1* | 8/2017 | Van Dusen | G06N 5/02 |
| | | | 705/12 |
| 2019/0073547 A1* | 3/2019 | el Kaliouby | G08G 1/0129 |
| 2020/0301916 A1 | 9/2020 | Nguyen et al. | |
| 2022/0043431 A1* | 2/2022 | Sayyarrodsari | G05B 19/41835 |

OTHER PUBLICATIONS

Tableau Software, LLC, International Search Report and Written Opinion, PCT/US2022/022625, dated Jun. 27, 2022, 21 pgs.
Vidya Setlur et al., "Inferencing underspecified natural language utterances in visual analysis," Proceeding of the 24th International Conference on Intelligent User Interfaces, Mar. 17, 2019, Marina del Rey, CA, USA, pp. 40-51, 12 pgs.
Setlur, Notice of Allowance, U.S. Appl. No. 17/219,784, dated Mar. 22, 2022, 11 pgs.

\* cited by examiner

```
field := field-instance | (var-name, [index])
field-instance := (name, [derivation], [bin-count])
field-var := (var-name, {field})
```

Figure 5

```
vail-intent := (intents, field-vars)
```

A single intent is defined as the following tuple:

```
intent := (id, inferred, specific-intent)

specific-intent := (correlation | distribution |
   encoding | fields | focus | geo | trend | ...)

correlation := ([field1], [field2])

distribution := ([bin-field], [bin-count])

fields := (field)

focus := ([field], [values], [sortby-field],
   [adjective], [quantity], [strategy])

trend := ([measure-field], [time-field])

adjective := "top" | "best" | "expensive" | ...

strategy := "filter" | "highlight" | "zoom" | ...
```

Figure 6

```
data-semantics := {(name, field-info)}
field-info := (field-type, [derivation],
   [bin-count], [stats])
field-type := "Cat" | "CTime" | "CGeo" | "CCurrency"
   | "Qd" | "Qi" | "QLat" | "QLon"
stats := (data-type, domain)
data-type := "text" | "numeric"
```

Figure 7

```
output := (weight, intent-ids, encoding, data-shape)

encoding := ([viz-type], [x], [y], [text],
  [color], [size], [shape], [detail])

viz-type := "bar" | "histogram" | "line" |
  "scatterPlot" | "singleAnswer" | "textTable"

data-shape := ({[focus]}, {[sort]})

focus := (field, [values], [output-adjective],
  [quantity], [strategy])

output-adjective := "top" | "bottom" | "high" | "low"

sort := (field, sortby-field, "ascending" |
  "descending")
```

Figure 8

```
set-intent := (id, intent)
remove-intent := (id)
replace-field := (old-field, new-field)
```

Figure 9

```
if !i.strategy
  i.strategy = "highlight"
if !i.field
  if i.adjective
    i.field = fields of data-type "text" &
        (domain.count > i.quantity)
  else if i.values
    i.field = fields with domain containing values
if !i.sort-by & i.adjective
  if i.adjective = "cheapest" | "most expensive"
      |"cheap" | "expensive"
    i.sort-by = fields of data-type "CCurrency"
  else
    i.sort-by = fields of data-type "numeric"
```

Figure 10

```
list = fields of data-type "numeric"
if !i.field1
  i.field1 = list 0
if !i.field2
  i.field2 = list 1
```

Figure 11

```
if !i.bin-field
  i.bin-field = fields of
      field-type "Qi" | "Qd" | "CCurrency"
  if i.bin-size
     i.bin-field uses i.bin-size
```

Figure 12

```
if !i.measure
  i.measure = fields of field-type "Qd"
if !i.time
  i.time = fields of field-type "CTime"
```

Pick data: wine

Pick fields:
- ☐ points
- ☐ price
- ☐ variety
- ☐ name
- ☐ winery
- ☐ id

☒ Focus:
Field: `<none>`
Values:
Sort by: `<none>`
Adjective:
Quantity:
Strategy:

Dropdown (1428):
- ✓ `<none>`
- top
- bottom
- best
- worst
- high
- low
- most expensive
- expensive ← (1430)
- cheapest
- cheap

Add intent:
- Focus
- Correlation
- Trend
- Distribution intent Spec

```
{
  "intentFields": [],
  "intents": [
    {
      "intentType": "focus",
      "id": 1,
      "strategy": "highlight",
      "inferred": [
        "strategy"
      ]
    }
  ],
  "fieldVars": {}
}
``` output spec

```
"...": []
``` commands

```
[
  {
    "command": "clearAll"
  },
  {
    "command": "setDataSource",
    "fieldInfo": {
      "points": {
        "type": "Qd",
        "derivation": "average"
      },
      "price": {
        "type": "CCurrency",
        "derivation": "average"
      },
      "variety": {
        "type": "Cat"
``` data

```
{
  "fieldInfo": {
    "points": {
      "type": "Qd",
    },
    "price": {
    },
    "variety": {
      "type": "Cat"
    },
    "name": {
      "type": "Cat"
    },
    "winery": {
      "type": "Cat"
```

Pick data:    Pick fields:    Add intent:

titanic ▼    ☐ Age    [Focus]
           ☐ AgeBin
     1404-5    ☐ Fare    [Correlation]
           ☐ FareBin
           ☐ Sex    [Trend]
           ☐ Survived    [Distribution]—1408-4 intent spec

```
{}
``` output spec

```
{
  "outputSpecs": []
}
``` commands

```
[
  {
    "command": "clearAll"
  },
  {
    "command": "setDataSource",
    "fieldInfo": {
      "points": {
        "type": "Qd",
        "derivation": "average"
      },
      "price": {
        "type": "CCurrency",
        "derivation": "average"
      },
      "variety": {
        "type": "Cat"
      },
      "name": {
        "type": "Cat"
``` data

```
{
  "fieldInfo": {
    "Age": {
      "type": "Qd",
      "derivation": "average",
      "binSize": 20
    },
    "AgeBin": {
      "type": "Qi",
      "derivation": "count",
      "binSize": 20
    },
    "Fare": {
      "type": "CCurrency",
      "derivation": "average",
      "binSize": 100
    },
    "FareBin": {
      "type": "Qi",
      "derivation": "count",
```

Pick Data: Pick Fields: Add Intent:

covid ⌄   ☐ Date    [Focus]
       ☐ county    [Correlation]
1404-4   ☐ newcountdeaths
       ☐ newcountconfirmed    [Trend] ⟵ 1408-3
       ☐ totalcountconfirmed
       ☐ totalcountdeaths    [Distribution]

intent spec        output Spec

```
{}
```

```
{
  "outputSpecs": []
}
```

Commands        Data

```
[
  {
    "command": "clearAll"
  },
  {
    "command": "setDataSource",
    "fieldInfo": {
      "points":{
        "type" : "Qd",
        "derivation": "average"
      },
      "price": {
        "type": "CCurrency",
        "derivation": "average"
      },
      "variety": {
        "type": "Cat"
      },
      "name": {
        "type": "Cat"
```

```
{
  "fieldInfo": {
    "date": {
      "type": "CTime"
    },
    "county": {
      "type": "CGeo"
    },
    "newcountdeaths": {
      "type": "Qd" ,
    }, "type": "Qd" ,
    }, "type": "Qd" ,
    },
```

```
{ intentFields: [ "variety",
    {field: "price",
      derivation: "average"g],
    intents: [{ intentType: "focus",
               id: 1,
               field: "variety",
               adjective: "expensive",
               inferred: ["sortBy","strategy"],
               sortBy: {field: "price",
                        derivation: "average"},
               strategy: "highlight"}]}
```

```
{ sortedSpecs: [{
    weight: 70,
    intentIds: [1],
    encoding: {
    vizType: "bar",
    x: [{
        field: "price",
        derivation: "average"
      }],
    y: [
        "variety"
      ]
    },
    dataShape: {
       sort: [{
           field: "variety",
           sortBy: {
               field: "price",
               derivation: "average"
           },
           sortType: "descending"
         }
       ],
       focus: [{
          field: "variety",
          "adjective": "high",
          "strategy": "highlight"
          }]
}}],
```

Figure 16D

1600 vail-slackdemo ☆
Add a topic (Today ⌄)

User 12:55 PM
joined #vail-slackdemo.

User 12:55 PM
Hey @cha(t)bot

Only visible to you
Slackbot 12:55 PM
OK! I've Invited @cha(t)bot to this channel.

Cha(t)bot APP 12:55 PM
was added to #vail-slackdemo by User.

Cha(t)bot APP 12:55 PM
Hi. Ask a question about the Wines dataset
Here are the attributes in the dataset - (97 kB)▾

| Dimensions & Measures | Example Values |
|---|---|
| Numbers of Records | |
| Location | Location of winery, e.g. USA, Canada, UK |
| Taster Name | Name of taster, e.g. Roger Voss |
| Variety | Wine variety, e.g. Pinot Noir |
| Vintage Year | Year of vintage release, 1821-2016 |
| Winery | Name of winery, e.g. Louis Latour |
| Points | Number of points for the wine, 80-100 |
| Price | Price of wine, $4-$2500 |

User 12:55 PM
Show me the expensive varieties       — 1612

Cha(t)bot APP 12:55 PM
The Top 3 varieties are Cabernet Franc Merlot, Petite Verdot, and Bordeaux-style Red Blend. "Expensive" is interpreted as an average Price of $109 and greater. (82 kB)▾

[bar chart: Variety vs Avg. Price]   —1614, 1616, 1610

Use the options below to change the filter
[Change Top N ⌄]  —1618

1606

Message #vail-slackdemo

Figure 16E

1600 vail-slackdemo ☆
Add a topic

Today

User 12:55 PM
joined #vail-slackdemo.

User 12:55 PM
Hey @cha(t)bot

Only visible to you
Slackbot 12:55 PM
OK! I've invited @cha(t)bot to this channel.

Cha(t)bot APP 12:55 PM
was added to #vail-slackdemo by User.

Cha(t)bot APP 12:55 PM
Hi. Ask a question about the Wines dataset
Here are the attributes in the dataset - (97 kB)▾

| Dimensions & Measures | Example Values |
|---|---|
| Numbers of Records | |
| Location | Location of winery, e.g. USA, Canada, UK |
| Taster Name | Name of taster, e.g. Roger Voss |
| Variety | Wine variety, e.g. Pinot Noir |
| Vintage Year | Year of vintage release, 1821-2016 |
| Winery | Name of winery, e.g. Louis Latour |
| Points | Number of points for the wine, 80-100 |
| Price | Price of wine, $4-$2500 |

User 12:55 PM
Show me the expensive varieties

Cha(t)bot APP 12:55 PM
The Top 3 varieties are Cabernet Franc Merlot, Petite Verdot, and Bordeaux-style Red Blend. "Expensive" is interpreted as an average Price of $109 and greater. (82 kB) ▾

Use the options below to change the filter

[ Change Top N ⌄ ]

1607

What about the best wines

APPLYING A VISUAL ANALYTICS INTENT LANGUAGE TO INFER AMBIGUOUS OR UNDERSPECIFIED INTENT

RELATED APPLICATIONS

This application is a continuation of U.S. patent application Ser. No. 17/219,784, filed Mar. 31, 2021, entitled "Applying a Visual Analytics Intent Language to Generate Data Visualizations," which claims priority to U.S. Provisional Patent Application No. 63/168,212, filed Mar. 30, 2021, entitled "Applying a Visual Analytics Intent Language to Generate Data Visualizations," each of which is incorporated by reference herein in its entirety.

This application is related to the following applications, each of which is incorporated by reference herein in its entirety:

(i) U.S. patent application Ser. No. 16/162,332, filed Oct. 16, 2018, entitled "Methods and Systems for Building a View of a Dataset Incrementally According to Characteristics of User-Selected Data Fields"; and (ii) U.S. patent application Ser. No. 15/908,709, filed Feb. 28, 2018, entitled "Constructing Data Visualization Options for a Data Set According to User-Selected Data Fields."

TECHNICAL FIELD

The disclosed implementations relate generally to data visualization and more specifically to systems, methods, and user interfaces that apply a visual analytics intent language to generate data visualizations and analyze data.

BACKGROUND

Visual analytics tools enable a user to understand a data set visually and make informed decisions. Increasingly, visual analytics tools are incorporating features such as natural language interactions and machine learning-based analyses and recommendations, which provide more sophisticated and expressive analytical tasks beyond the simple selection of data attributes and values to generate a visualization. However, it remains a challenge to interpret a user's analytical intent because the intent needs to be translated into lower-level system actions that generate appropriate responses. This process typically involves complex implementations that are hard-coded for each application and difficult to fine-tune.

Accordingly, there is a need for systems and methods that can capture user intent during analytical workflows. Such systems and methods should also be able to infer underspecified or ambiguous intents and suggest effective output.

SUMMARY

Visual analytics tools facilitate data analysis and decision making. These tools can suggest visualization types based on selected data attributes with sensible defaults for visually encoding information. Many visual analytics tools now incorporate graphical user interface conventions that employ a heuristic-based approach for presenting visualizations to a user.

Despite recent advancements in visual analytics tools, challenges remain when a user tries to express their higher-level analytical intents in terms of lower-level operations of the tools. There are several difficulties when it comes to expressing intent. First, the intent may be vague and the entry point for the question may not match what is afforded by the tool. For example, a user may be thinking about data attributes whereas the tool requires the user to first select a chart type. Second, there may be a mismatch between the naming of the tool's analytical functions and terminology used by the user. Third, the user may simply not know what actions are required to answer the question.

Furthermore, there is a spectrum in which analytical intent can be expressed. On the one end, analytical intent can be expressed explicitly, such as through user selection of data attributes from a pre-defined list to generate a visualization. On the other end, analytical intent can be vaguely defined or involve subjective judgments, such as a user request for an identification of "safe" neighborhoods in which to buy a house when the user is looking at housing data.

To accommodate these actions, visual analysis application developers have implemented bespoke business logic to determine appropriate responses to these expressions of intent. However, these tend to be rigidly implemented and cannot be generalized across a variety of visual analytics platforms and modalities.

There is a need to develop analytical intent systems and methods to capture user intent during analytical workflows. Analytical intent systems and methods should also be able to infer underspecified or ambiguous intents and suggest effective output. They should also be implemented at a high enough abstraction level for use by different visual analytics tools and across different devices.

In this disclosure, a Visual Analytics Intent Language (VAIL) is presented. VAIL is a language specification that translates expressive higher-level intents into lower-level representations that can serve as a general layer of abstraction for visual analysis applications. VAIL comprises specifications that describe intent, data semantics, and output, which are combined with rules for editing intent, inferring ambiguous or missing intent, and suggesting effective output for a given intent specification. VAIL helps developers manage and represent intent in their own visual analytics applications.

Accordingly, such methods and interfaces reduce the cognitive burden on a user and produce a more efficient human-machine interface. For battery-operated devices, such methods and interfaces conserve power and increase the time between battery charges. Such methods and interfaces may complement or replace conventional methods for visualizing data. Other implementations and advantages may be apparent to those skilled in the art in light of the descriptions and drawings in this specification.

In accordance with some implementations, a method is performed at an electronic device running a first application. The electronic device includes one or more processors and memory. The memory stores one or more programs for execution by the one or more processors. The electronic device receives a request directed to a data source. The request includes one or more intent types. Each intent type is selected from a predefined set of data analysis operations directed to the data source. The request includes one or more predefined attributes associated with the one or more intent types. Each of the one or more predefined attributes limits a respective data analysis operation of a respective intent type. For each of the one or more intent types, the electronic device formulates a respective intent specification according to the request, including determining one or more respective properties of the respective intent specification according to the respective one or more predefined attributes and according to data fields, from the data source, specified in the request. For each of the one or more intent types, the electronic device generates a respective output specification. The respective output specification includes a respective recommended data visualization type, selected from a predefined set of data visualization types, for the data source, The respective output specification includes one or more respective data visualization parameters that specify how to render a data visualization of the respective recommended data visualization type.

In some implementations, the one or more intent types include one or more of: a focus intent, a trend intent, a correlation intent, a distribution intent, a geographic intent, an encoding intent, and a fields intent.

In some instances, the request includes the trend intent. Formulating the respective intent specification includes identifying from the data source (i) a measure data field and (ii) a first data field that represents time.

In some instances, the request includes the trend intent. Formulating the respective intent specification includes identifying from the data source (i) all measure data fields and (ii) all data fields that represent time.

In some instances, the request includes the focus intent. Formulating the respective intent specification includes executing one or more of: (1) a sort operation that arranges data rows from the data source in an order; (2) a filter operation that filters the data rows from the data source to a subset of data rows for which a specific data field has a specific data value; and (3) a highlight operation that highlights a subset of data rows from the data source.

In some instances, the request includes the encoding intent and specifies a first data field. Generating the respective output specification includes: (1) adding an encoding parameter that specifies rendering the data visualization according to the first data field; or (2) overriding an existing encoding parameter for the data visualization according to the first data field.

In some instances, the request includes the fields intent and specifies a first data field. Generating a respective output specification includes applying one or more inferencing rules based on semantic constraints imposed by the first data field.

In some implementations, the method further comprises for each of the one or more intent types, applying one or more respective rules corresponding to the respective intent type to determine whether the respective intent type is ambiguous and/or underspecified. In accordance with a determination that the respective intent type is ambiguous or underspecified, the electronic device infers information to resolve the ambiguous and/or underspecified intent according to (i) the one or more respective rules, (ii) metadata for the data source, and (iii) metadata for data fields specified in the request. The electronic device updates the one or more respective data visualization parameters according to the inferred information.

In some instances, applying the one or more respective rules to determine whether the respective intent type is ambiguous and/or underspecified further comprises: in accordance with a determination that the request specifies a measurable adjective and does not specify a quantity, (1) establishing that the respective intent type is ambiguous; and (2) inferring a numeric value for the quantity.

In some instances, the metadata for the data source includes metadata for: semantics of data fields, data field types corresponding to the data fields, statistics of the data fields, derivations of the data fields, and/or default bin sizes corresponding to the data fields.

In some instances, the data field types include one or more of: a categorical field type, a time field type, a geographical field type, a currency field type, a quantitative dependent field type, a quantitative independent field type, a latitude field type, and a longitude field type.

In some instances, the electronic device infers information to resolve the ambiguous and/or underspecified intent according to context from previous requests, data fields identified in the previous requests, attributes identified in the previous requests, user-provided interpretations, and/or user-provided definitions.

In some implementations, the one or more respective data visualization parameters include: data-shaping information, encoding information, and/or an identifier corresponding to the intent specification.

In some implementations, after generating the respective output specification for each of the one or more intent types, the electronic device visually renders data analysis responsive to the request, in accordance with (i) at least one output specification for one of the one or more intent types and (ii) configuration parameters of the first application and/or the electronic device.

In accordance with some implementations of the present disclosure, a method is performed at an electronic device running a first application. The electronic device includes one or more processors and memory. The memory stores one or more programs for execution by the one or more processors. The electronic device receives a request directed to a data source. The request includes one or more intent types. Each intent type is selected from a predefined set of data analysis operations directed to the data source. The request includes one or more predefined attributes associated with the one or more intent types. Each of the one or more predefined attributes limits a respective data analysis operation of a respective intent type. In response to the request, for each of the one or more intent types, the electronic device formulates a respective intent specification according to the request, including determining one or more respective properties of the respective intent specification according to the respective one or more predefined attributes and according to data fields, from the data source, specified in the request. The electronic device applies one or more respective rules corresponding to the respective intent type to determine whether the respective intent type is ambiguous and/or underspecified. In accordance with a determination that the respective intent type is ambiguous and/or underspecified, the electronic device infers information to resolve the ambiguous and/or underspecified intent according to (i) the one or more respective rules, (ii) metadata for the data source, and (iii) metadata for data fields specified in the request. The electronic device updates the respective intent type according to the inferred information.

In some implementations, the electronic device generates a respective output specification. The respective output specification includes a respective recommended data visualization type, selected from a predefined set of data visualization types, for the data source. The respective output specification also includes one or more respective data visualization parameters that (1) include the inferred information and (2) specify how to render a data visualization of the respective recommended data visualization type.

In some implementations, the one or more intent types include one or more of: a focus intent, a trend intent, a correlation intent, a distribution intent, a geographic intent, an encoding intent, and a fields intent.

In some implementations, applying one or more respective rules to determine whether the respective intent type is ambiguous and/or underspecified further comprises: (1) identifying a set of data properties corresponding to the respective intent specification for the respective intent type; and (2) determining whether the request specifies attributes for each data property of the set of data properties. In some implementations, when the request specifies more than one attribute for a data property in the set of data properties, the electronic device determines that the respective intent type is ambiguous. In some implementations, when the request specifies no attribute for at least one data property in the set of data properties, the electronic device 102 determines that the respective intent type is underspecified.

In some instances, in accordance with a determination that the request specifies exactly one attribute for each data property of the set of data properties, the electronic device establishes that the respective intent type is fully specified.

In some implementations, applying one or more respective rules to determine whether the respective intent type is ambiguous and/or underspecified further comprises: in accordance with a determination that the request specifies a measurable adjective and does not specify a quantity, establishing that the respective intent type is ambiguous and inferring a numeric value for the quantity.

In some implementations, the respective intent type is a focus intent having a focus strategy property, Inferring information to resolve the underspecified intent further comprises: in accordance with a determination that the request does not include a first term selected from the group consisting of "filter," "highlight," and "zoom," selecting a highlight strategy as the default focus strategy.

In some instances, selecting the highlight strategy as the default strategy further comprises: (1) executing a sort operation that arranges data rows from a data table of the data source in an ascending or a descending order according to data values of a data field in the data table; and (2) executing a highlight operation that highlights a specified number of the data values based on ranking of the data values.

In some implementations, the respective intent type is a focus intent having a field property. Inferring information to resolve the underspecified intent further comprises: in accordance with a determination that the request does not specify a data field, selecting a data field, from the data source, having a text data type and having a domain that is greater than or equal to a quantity specified in the request.

In some implementations, the respective intent type is a focus intent having a field property, Inferring information to resolve the underspecified intent further comprises: in accordance with a determination that the data source does not include a data field with a text data type and a domain that is greater than or equal to a quantity specified, selecting a data field, from the data source, whose domain contains a data value that is specified in the request.

In some implementations, the respective intent type is a focus intent. The method further comprises in accordance with a determination that the request includes an adjective for price, determining whether the data source includes a data field having a currency field type. In accordance with a determination that the data source includes a data field having a currency field type, the electronic device executes a sort operation on the data field. In accordance with a determination that the data source does not include a data field having a currency field type, the electronic device identifies all numeric data fields in the data source and executes a respective sort operation on each of the numeric data fields.

In some implementations, the metadata for the data source includes metadata for: semantics of data fields, data field types corresponding to the data fields, statistics of the data fields, derivations of the data fields, and/or default bin sizes corresponding to the data fields.

In some instances, the data field types include one or more of: a categorical field type, a time field type, a geographical field type, a currency field type, a quantitative dependent field type, a quantitative independent field type, a latitude field type, and a longitude field type.

In some implementations, the respective intent type is a distribution intent having a grouping property that includes a grouping field and a bin size. Inferring information to resolve the underspecified intent further comprises: in accordance with a determination that the request does not specify a grouping field, (1) identifying all data fields in the data source having a quantitative dependent field type, a quantitative independent field type, or a currency field type; and (2) designating each of the identified data fields as the inferred information for the grouping field.

In some instances, in accordance with a determination that the request specifies a bin size, the electronic device replaces bin size information in the metadata with the specified bin size.

In some implementations, the intent type is a trend intent having a trend property that includes a measure data field and a date data field. Inferring information to resolve the underspecified intent further comprises: in accordance with a determination that the request does not include a measure data field, (1) identifying all quantitative dependent fields in the data source; and (2) designating each of the quantitative dependent fields as the inferred information for the measure data field. Inferring information to resolve the underspecified intent further comprises: in accordance with a determination that the request does not include a data field having a time field type: (1) identifying all time data fields in the data source; and (2) designating each of the time data fields as the inferred information for the date data field.

In some implementations, the intent type is a correlation intent to correlate two numeric data fields. Inferring information to resolve the underspecified intent further comprises: (1) when the request specifies only one numeric data field, inferring usage of a second data field from all numeric data fields from the data source; and (2) when the request specifies no numeric data fields, inferring usage of a first data field and a second data field, from all numeric data fields from the data source.

In some implementations, the method further comprises inferring information to resolve the ambiguous and/or underspecified intent according to context from previous requests, data fields identified in the previous requests, attributes identified in the previous requests, user-provided interpretations, and/or user-provided definitions.

In accordance with some implementations, a method is performed at an electronic device running a first application. The electronic device includes one or more processors and memory. The memory stores one or more programs for execution by the one or more processors. The electronic device downloads, from a server system that is communicatively connected with the electronic device, a visual analytics intent library that is configured to execute across a plurality of applications, including the first application. The electronic device configures the visual analytics intent library to execute on the electronic device based on the electronic device running the first application. After the configuring, the electronic device receives a request directed to a data source. The request includes one or more intent types. Each of the intent types is selected from a predefined set of data analysis operations directed to the data source. The request includes one or more predefined attributes associated with the one or more intent types. Each of the one or more predefined attributes limits a respective data analysis operation of a respective intent type. In accordance with the request, for each of the one or more intent types, the electronic device formulates a respective intent specification according to the visual analytics intent library, including determining one or more respective properties of the respective intent specification according to the respective one or more predefined attributes and according to data fields, from the data source, specified in the request.

In some implementations, the electronic device has a first device type. In some implementations, the visual analytics intent library is configured to execute across a plurality of device types, including the first device type.

In some implementations, for each of the intent types, after formulating the respective intent specification, the electronic device generates a respective output specification according to the visual analytics intent library. The respective output specification includes a respective recommended data visualization type, selected from a predefined set of data visualization types, for the data source. The respective output specification also includes one or more respective data visualization parameters that specify how to render a data visualization of the respective recommended data visualization type.

In some implementations, the one or more respective data visualization parameters include: data-shaping information, encoding information, and/or an identifier corresponding to the intent specification In some implementations, after generating the respective output specification for each of the one or more intent types, the electronic device visually renders data analysis responsive to the request, in accordance with (i) at least one output specification for one of the one or more intent types and (ii) configuration parameters of the first application and/or the electronic device.

In some implementations, visually rendering data analysis responsive to the request is further in accordance with the electronic device having a first device type.

In some instances, the at least one output specification for one of the one or more intent types includes a first output specification corresponding to a first intent type and having inferred information. Visually rendering data analysis further comprises displaying the inferred information in the first application.

In some instances, the electronic device displays a data widget that enables the inferred information to be modified. The electronic device receives a user interaction with the data widget. In response to the user interaction, the electronic device edits the first intent specification. The electronic device updates the first output specification in accordance with the edited first intent specification. The electronic device generates and visually renders updated data analytics in accordance with the updated first output specification and the configuration parameters of the first application and/or the electronic device.

In some implementations, the electronic device is a voice assistant device. The method further comprises after generating the respective output specification, (1) converting the respective output specification into a respective verbal response and (2) outputting the respective verbal response.

In some instances, the respective output specification includes inferred information. Outputting the respective verbal response includes outputting a verbal description of the inferred information.

In some implementations, the first application includes a graphical user interface. The method further comprises receiving the request, including identification of the one or more intent types, via the graphical user interface.

In some instances, the electronic device generates a respective data visualization according to the respective output specification. The electronic device displays the data visualization on the graphical user interface.

In some implementations, the first application is a messaging application. The method further comprises after generating the respective output specification: (1) converting the visual specification into a text output; and (2) displaying the text output in the messaging application.

In some implementations, the one or more intent types include one or more of: a focus intent, a trend intent, a correlation intent, a distribution intent, a geographic intent, an encoding intent, and a fields intent.

In some implementations, prior to receiving the request, the electronic device receives a natural language command. The electronic device parses the natural language command according to a visual intent specification language to form the request.

In some instances, the electronic device determines, according to the parsing, that the one or more intent types includes a trend intent type in accordance with the natural language command having a term "time" or a term "trend."

In some instances, the electronic device determines, according to the parsing, that the one or more intent types includes a focus intent type in accordance with the natural language command having a measurable adjective.

In some implementations, the method further comprises updating a first intent specification formulated from a prior request by correlating the first intent specification with an intent specification formulated in the request.

In some instances, the prior request includes a first data field from the data source. The request specifies replacing the first data field with a second data field from the data source. Updating the first intent specification includes replacing the first data field with the second data field.

In some implementations, an electronic device includes one or more processors, memory, and one or more programs stored in the memory. The programs are configured for execution by the one or more processors. The one or more programs include instructions for performing any of the methods described herein.

In some implementations, a non-transitory computer-readable storage medium stores one or more programs configured for execution by an electronic device having one or more processors and memory. The one or more programs include instructions for performing any of the methods described herein.

Thus methods, systems, and user interfaces are disclosed that capture user intent, infer underspecified or ambiguous intents, and suggest effective output.

BRIEF DESCRIPTION OF THE DRAWINGS

For a better understanding of the aforementioned systems, methods, and graphical user interfaces, as well as additional systems, methods, and graphical user interfaces that provide data visualization analytics, reference should be made to the Description of Implementations below, in conjunction with the following drawings in which like reference numerals refer to corresponding parts throughout the figures.

FIG. 5 provides Backus-Naur Form (BNF) productions to define some VAIL terms according to some implementations.

FIG. 6 provides BNF productions to define intent specifications according to some implementations.

FIG. 7 provides BNF productions to define data-semantics according to some implementations.

FIG. 8 provides BNF productions to define output specifications according to some implementations.

FIG. 9 provides BNF productions for editing intent specifications according to some implementations.

FIG. 10 provides BNF productions for inferring information to resolve underspecified focus intent according to some implementations.

FIG. 11 provides BNF productions for inferring information to resolve underspecified correlation intent according to some implementations.

FIG. 12 provides BNF productions for inferring information to resolve underspecified distribution intent according to some implementations.

FIG. 13 provides BNF productions for inferring information to resolve underspecified trend intent according to some implementations.

FIGS. 14A-14J provide a series of screen shots for interactions with a graphical user interface-based application 224 that uses VAIL, in accordance with some implementations.

FIGS. 16A-16G provide a series of screen shots for interactions with a Slack chatbot in accordance with some implementations FIGS. 17A-17C provide a series of screen shots for interactions with a voice assistant device that includes a display screen 1700 according to some implementations.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

Visual analysis tools are increasingly attempting to make data exploration more accessible and intelligent. The expression of intent in these tools has become more nuanced, allowing for more abstract, high-level analytical inquiry. This disclosure describes a Visual Analytics Intent Language (VAIL) for supporting the development of expressive visual analytics tools.

VAIL is a language encapsulating semantics for analytical intents that developers can incorporate into their visual analytics applications, to translate expressive higher-level intents into lower-level representations. VAIL can serve as a general layer of abstraction for visual analysis applications.

VAIL comprises specifications that describe intent, data semantics, and output, which are combined with rules for editing intent, inferring underspecified (e.g., omitted information) or ambiguous (e.g., vague) intents, and suggesting effective output for a given intent specification. VAIL helps developers manage and represent intent in their own visual analytics applications.

In this disclosure, the terms "VAIL," "VAIL engine," and "visual analytics intent system" are used interchangeably.

I. Environment

Figure 1:
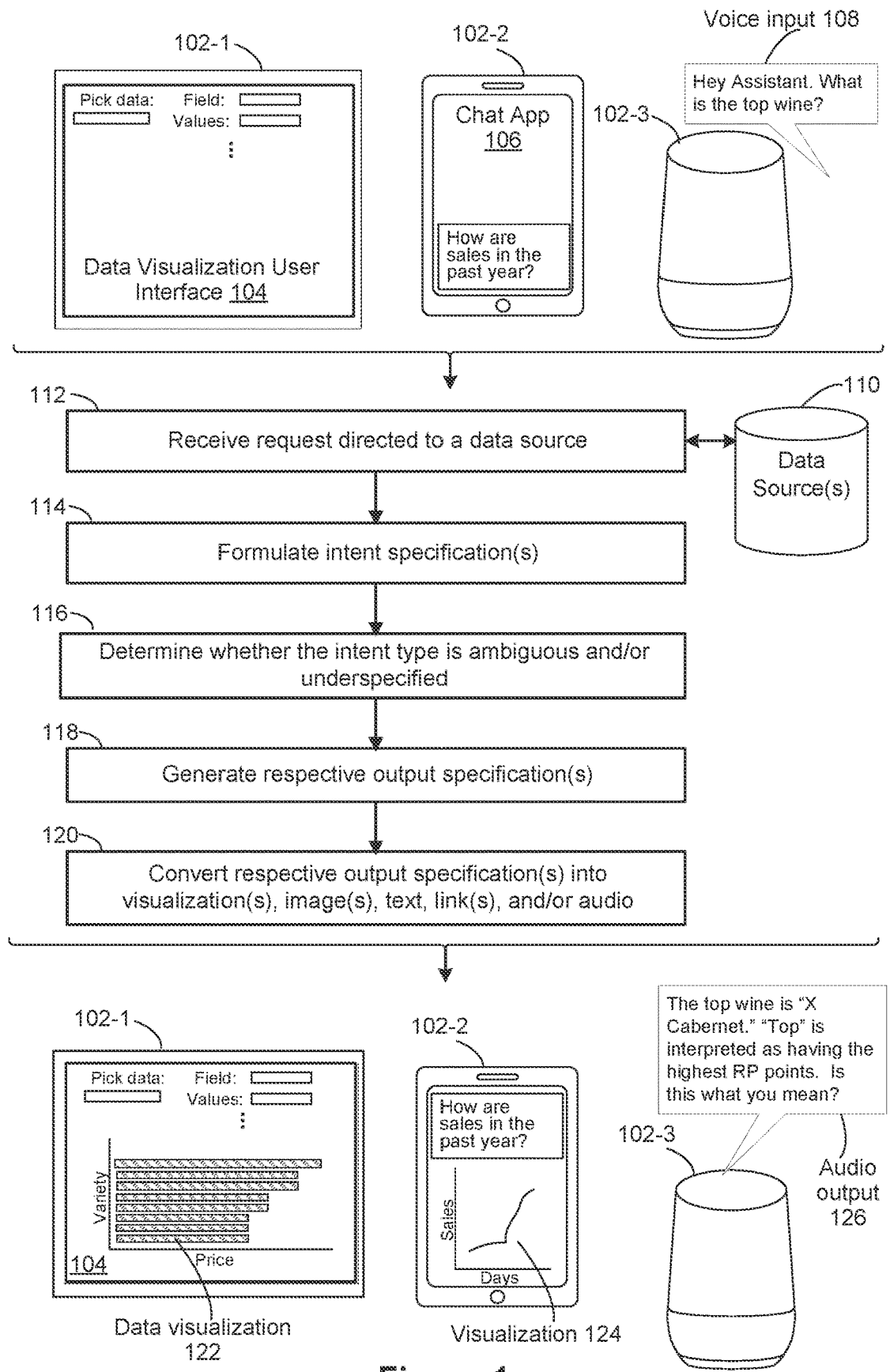
FIG. 1 illustrates conceptually a process of generating a data visualization by applying a visual analytics intent language in accordance with some implementations.

Some implementations of the present disclosure generate a data visualization by applying VAIL, as shown in FIG. 1. In accordance with some implementations of the present disclosure, VAIL can be downloaded from a server (e.g., a server system 300) and configured to execute on an electronic device 102 (e.g., as a visual analytics intent system 230, also referred to as VAIL engine). The visual analytics intent system 230 is used in conjunction with other visual analytics applications that are running on the electronic device 102.

FIG. 1 illustrates that VAIL can be executed on a plurality of electronic devices 102, such as a computing device 102-1, a mobile electronic device 102-2 (e.g., a mobile phone, a smart watch, or a tablet) with a display screen, and on a voice assistant device 102-3 (e.g., with or without a display screen). In this example, each of the electronic devices 102 has a distinct device type and includes a respective visual analytics application. For example, the computing device 102-1 includes a data visualization application having a data visualization user interface 104 (e.g., a graphical user interface). The electronic device 102-2 includes a chat application 106. The voice assistant device 102-3 includes a voice assistant application that receives a voice input 108 from a user. In some implementations, VAIL can also be used on recommendation systems or other smart tools for visual analysis.

In an exemplary usage scenario, an electronic device 102 executing VAIL receives (112), from an application on the electronic device 102 (e.g., client application 224, such as a data visualization application, a chat application, or a voice assistant application), a request directed to a data source 110. In accordance with the request, the electronic device 102 formulates (114) (e.g., using VAIL), for each of the intent types, a respective intent specification. As disclosed herein, VAIL defines a set of data properties for a respective intent specification having a respective intent type. VAIL also defines rules for editing intent and for inferring ambiguous or underspecified intent. By applying the rules established by VAIL, the electronic device 102 can determine (116) whether intent type is ambiguous and/or underspecified. For example, the electronic device 102 can determine that a respective intent type is ambiguous when the request specifies more than one attribute for a data property in the set of data properties or when the request includes a vague modifier such as "top" or best." As another example, the electronic device 102 can determine that a respective intent type is underspecified when the request specifies no attribute for at least one data property in the set of data properties. In some implementations, in accordance with a determination that the intent type is ambiguous or underspecified, VAIL infers information to resolve the ambiguous and/or underspecified intent according to the one or more rules, metadata for the data source and/or data fields specified in the request.

FIG. 1 depicts that in some implementations, the electronic device 102 generates (118) one or more respective output specifications corresponding to the intent type. VAIL has a general-purpose specification for describin-multiple possible outputs. For example, an output specification can include a respective recommended data visualization type and one or more respective data visualization parameters, such as encoding and data shape parameters, that specify how to render a data visualization of the respective recommended data visualization type. In cases where a respective intent type is underspecified or ambiguous and where information has been inferred, the output specification includes the inferred information. In some implementations, after the respective output specification has been generated, the electronic device 102 can convert (120) the respective output specification to a visual grammar such as VizQL or Vega-Lite or to a non-visual form such as text or audio.

FIG. 1 also illustrates the electronic device rendering data analytics responsive to the request. For example, the computing device 102-1 displays a data visualization 122 (e.g., a bar chart) in the data visualization user interface 104 in response to the request. The electronic device 102-2 displays a visualization 124 that comprises two line graphs in response to a query "How are sales in the past year?" In some implementations, the visualization 124 is an image file (e.g., having an image file format such as .jpg or .tif) that is generated by a data visualization module to render it compatible for display on the chat application. FIG. 1 also shows the voice assistant device 102-3 outputting a verbal (e.g., audio) response 126 in response to the voice input 108. In some implementations, the verbal response 126 can include a description of how an underspecified and/or ambiguous term has been interpreted (e.g., "Top" is interpreted as having the highest RP points). In some implementations, the electronic device 102 also follows up with additional questions or prompts to further clarify user intent.

II. Block Diagrams

Figure 2:
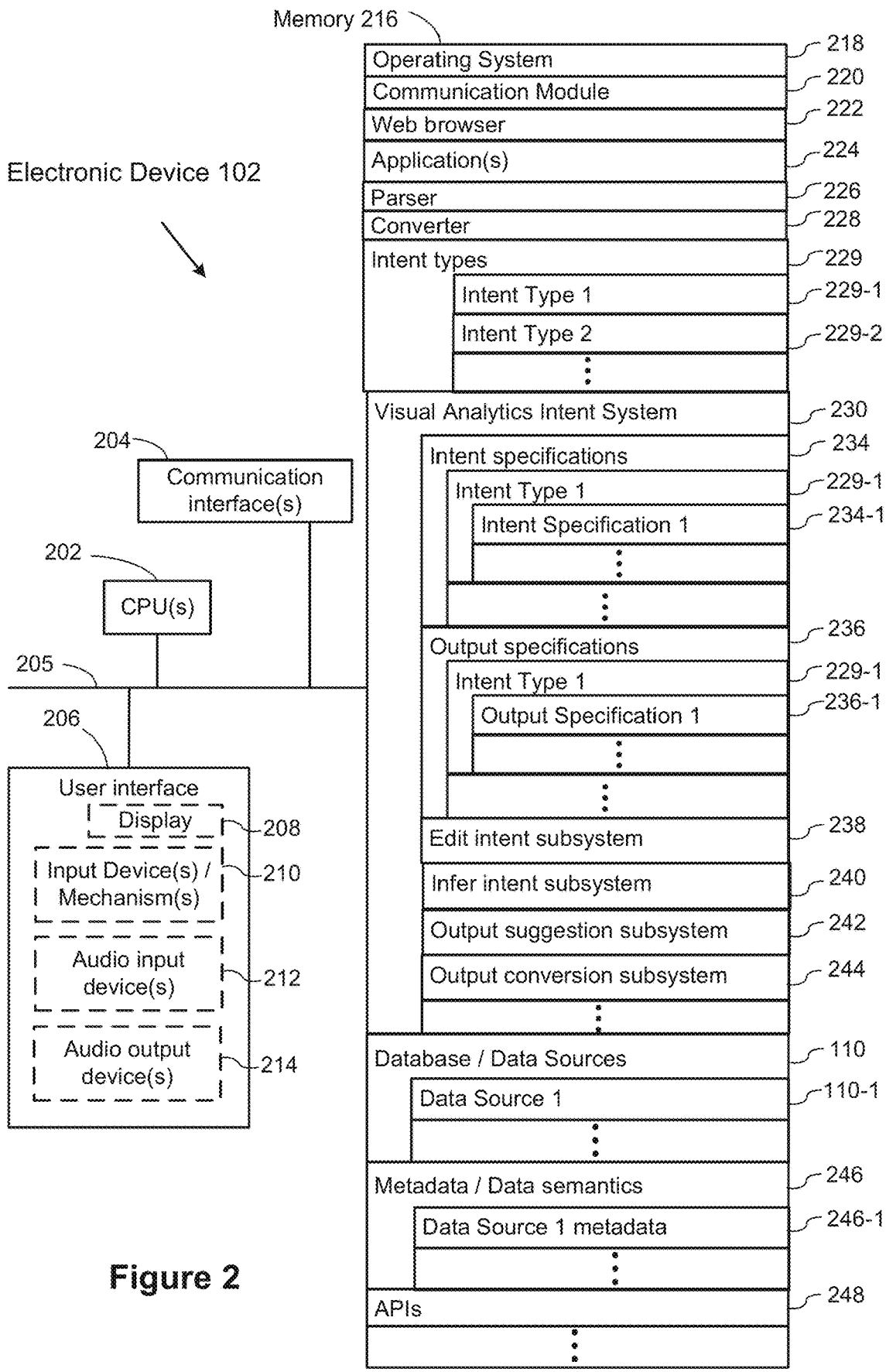
FIG. 2 is a block diagram of an electronic device according to some implementations.

FIG. 2 is a block diagram illustrating an electronic device 102 in accordance with some implementations. In some implementations, the electronic device 102 is also known as a computing device Various examples of the electronic device 102 include a desktop computer, a laptop computer, a tablet computer, a display assistant device, a mobile phone, and a voice assistant device.

The electronic device 102 typically includes one or more processing units (processors or cores) 202, one or more network or other communication interfaces 204, memory 216, and one or more communication buses 205 for interconnecting these components. In some implementations, the communication buses 205 include circuitry (sometimes called a chipset) that interconnects and controls communications between system components.

The electronic device 102 includes a user interface 206. The user interface 206 optionally includes a display 208. In some implementations, the electronic device 102 includes input device(s) and/or mechanisms 210 such as a keyboard, mouse, and/or other input button. Alternatively or in addition, in some implementations, the display 208 includes a touch-sensitive surface, in which case the display 208 is a touch-sensitive display. In some implementations, the touch-sensitive surface is configured to detect various swipe gestures (e.g., continuous gestures in vertical and/or horizontal directions) and/or other gestures (e.g., single/double tap). In electronic devices that have a touch-sensitive display 208, a physical keyboard is optional (e.g., a soft keyboard may be displayed when keyboard entry is needed). The user interface 206 also includes an audio output device 214, such as speakers or an audio output connection connected to speakers, earphones, or headphones. Furthermore, some electronic devices use a microphone and voice recognition to supplement or replace the keyboard. In some implementations, the electronic device 102 includes an audio input device 214 (e.g., a microphone) to capture audio (e.g., speech from a user).

In some implementations, the memory 216 includes high-speed random-access memory, such as DRAM, SRAM, DDR RAM, or other random-access solid-state memory devices. In some implementations, the memory 216 includes non-volatile memory, such as one or more magnetic disk storage devices, optical disk storage devices, flash memory devices, or other non-volatile solid-state storage devices. In some implementations, the memory 216 includes one or more storage devices remotely located from the processor(s) 202. The memory 216, or alternatively the non-volatile memory device(s) within the memory 216, includes a non-transitory computer-readable storage medium. In some implementations, the memory 216 or the computer-readable storage medium of the memory 206 stores the following programs, modules, and data structures, or a subset or superset thereof:

- an operating system 218, which includes procedures for handling various basic system services and for performing hardware dependent tasks;
- a communication module 220, which is used for connecting the electronic device 102 to other devices via the one or more communication network interfaces 204 (wired or wireless) and one or more communication networks, such as the Internet, other wide area networks, local area networks, metropolitan area networks, and so on;
- a web browser 222 (or other client application), which enables a user to communicate over a network with remote computers or devices;
- one or more client application(s) 224, such as a chat application, a messaging application, a data visualization application, a voice assistant application, and/or other applications for visual analytics. In some implementations, the client application 224 provides a graphical user interface (GUI) for a user to construct visual graphics (e.g., an individual data visualization or a dashboard with a plurality of related data visualizations) or to input intent types. In some implementations, the client application 224 includes a natural language user interface for a user to input natural language commands or queries. In some implementations, the client application 224 includes a voice assistant interface for a user to input verbal commands. In some implementations, the client application 224 executes as a standalone application. In some implementations, the client application 224 executes within the web browser 222 (e.g., as a web application 322). In some implementations, the client application 224 includes a data visualization generator, which automatically generates and displays a corresponding visual graphic (also referred to as a "data visualization" or a "data viz") using the user input (e.g., the natural language input) or according to an output specification 236 provided by a visual analytics intent system 230. In some implementations, the client application includes a widget generator, which generates widgets that include user-selectable options. For example, a "sort" widget is generated in response to a user selecting (e.g., hovering) over a sort field (e.g., a natural language term identified to be a sort field). The sort widget includes user-selectable options such as "ascending," "descending," and/or "alphabetical," so that the user can easily select, from the widget, how to sort the selected field.

a parser 226 for parsing a natural language command (e.g., into tokens). In some implementations, the parser 226 removes stop words and lemmatization to return the tokens. In some implementations, the parser 226 parses the natural language command according to a visual analytical intent language (VAIL) to form a request to a visual analytics intent system 230. In some implementations, the electronic device 102 determines an intent type 229 according to the parsing;

a converter 228 for converting output specifications 236 into a visual form (e.g., VizQL or Vega-lite) or to a non-visual form (e.g., text or audio);

intent types 229, which identify a type of user intent. In some implementations, the intent types 229 include one or more of: a focus intent, a trend intent, a correlation intent, a distribution intent, a geographic intent, an encoding intent, and a fields intent;

a visual analytics intent system 230 (e.g., VAIL engine), which comprises:
  one or more intent specifications 234, which are formulated by the visual analytics intent system 230. The intent specifications 234 capture information about one or more different types of intent expressed by the user. In some implementations, an intent specification 234 includes an intent type corresponding to the intent specification, a unique identifier, and a set of properties (e.g., corresponding to the intent type). In some implementations, the visual analytics intent system 230 formulates a respective intent specification according to a request (e.g., from the client application 224). In some implementations, formulating a respective intent specification includes determining one or more respective properties of the respective intent specification according to predefined attributes and/or data fields from a data source 110 that are specified in the request. In some implementations, formulating a respective intent specification includes inferring one or more properties (e.g., by applying one or more rules defined by the VAIL engine);
  one or more output specifications 236, which are generated by the visual analytics intent system 230. In some implementations, the visual analytics intent system 230 generates one or more output specifications 236 for each intent type that is included in the request;
  an edit intent subsystem 238 for adding, modifying, or deleting an intent specification;
  an infer intent subsystem 240 for inferring underspecified or ambiguous intent according to one or more rules corresponding to a respective intent type. In some implementations, the infer intent subsystem 240 leverages metadata (e.g., data semantics) 246 about a data source (e.g., metadata for a data table corresponding to the data source) and/or metadata for data fields specified in the request to infer underspecified and/or ambiguous intent;
  an output suggestion subsystem 242 for suggesting effective output for specified intents. In some implementations, VAIL defines rules for converting intent type to information in an output specification; and
  an output conversion subsystem 244 for converting an output specification 236 into a modality. Further details of the visual analytics intent system 230 and its uses are described in FIGS. 4 to 17;

zero or more databases or data sources 110 (e.g., a first data source 110-1), which are used by the application 224 and/or the visual analytics intent system 230. In some implementations, the data sources can be stored as spreadsheet files, CSV files, XML, files, flat files, JSON files, tables in a relational database, cloud databases, or statistical databases;

metadata/data semantics 246 of data sources (e.g., metadata/data semantics 246-1 corresponding to a first data source), which are used by the visual analytics intent system 230 to infer underspecified and/or ambiguous intent. In some implementations, the metadata 246 for the data source includes metadata for: semantics of data fields, data field types corresponding to the data fields, statistics of the data fields, derivations of the data fields, and/or default bin sizes corresponding to the data fields. Semantics of data fields of the data source, or data semantics, describe the specific set of data the user is interacting with. This includes the list of fields, their roles, and summary statistics. In some implementations, the data semantics can be retrieved from a database or curated by a user, to enable the visual analytics intent system 230 to better infer intent. In some implementations, the metadata 246 is leveraged by the infer intent subsystem 240 and the output suggestion subsystem 242 to infer ambiguous and/or underspecified intent and to suggest output; and APIs 248 for receiving API calls from one or more applications (e.g., web browser 222, client applications 224, and visual analytics intent system 230), translating the API calls into appropriate actions, and performing one or more actions.

Each of the above identified executable modules, applications, or set of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 216 stores a subset of the modules and data structures identified above. In some implementations, the memory 216 stores additional modules or data structures not described above.

Although FIG. 2 shows an electronic device 102, FIG. 2 is intended more as functional description of the various features that may be present rather than as a structural schematic of the implementations described herein. In practice, and as recognized by those of ordinary skill in the art, items shown separately could be combined and some items could be separated.

Figure 3:
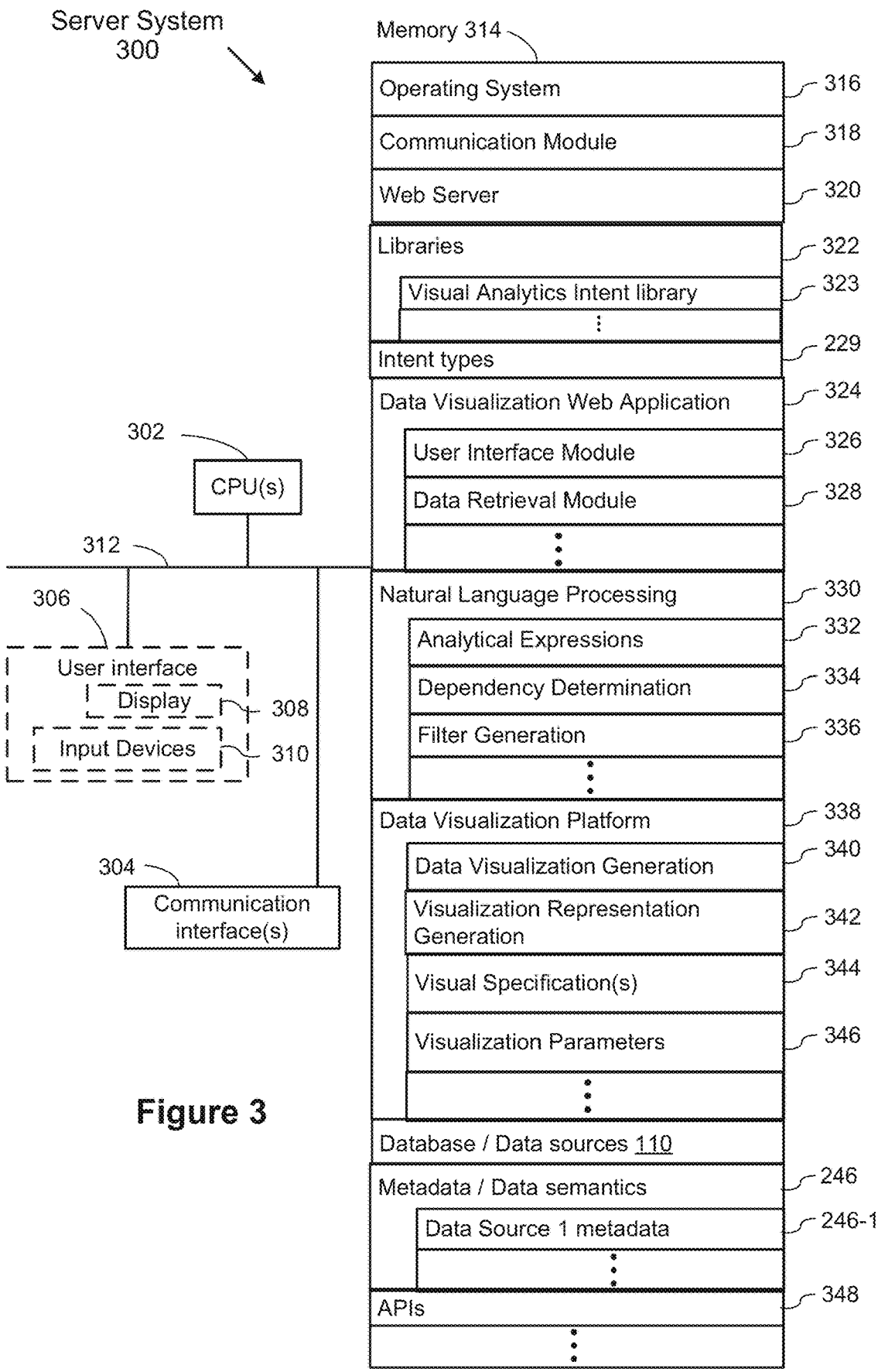
FIG. 3 is a block diagram of a server system according to some implementations.

FIG. 3 is a block diagram illustrating an example server system 300 in accordance with some implementations. In some implementations, the server system 300 is a data visualization server. In some implementations, the server system 300 may host one or more libraries 322, one or more databases/data sources 110, and/or metadata 246 corresponding to the data sources. In some implementations, the server system 300 may provide various executable applications or modules. The server system 300 typically includes one or more processing units/cores (CPUs) 302, one or more communication network interfaces 304, memory 314, and one or more communication buses 312 for interconnecting these components. In some implementations, the server system 300 includes a user interface 306, which includes a display device 308 and one or more input devices 310, such as a keyboard and a mouse. In some implementations, the communication buses 312 may include circuitry (sometimes called a chipset) that interconnects and controls communications between system components In some implementations, the memory 314 includes high-speed random access memory, such as DRAM, SRAM, DDR RAM, or other random access solid state memory devices, and may include non-volatile memory, such as one or more magnetic disk storage devices, optical disk storage devices, flash memory devices, or other non-volatile solid state storage devices. In some implementations, the memory 314 includes one or more storage devices remotely located from the CPU(s) 302. The memory 314, or alternately the non-volatile memory device(s) within the memory 314, comprises a non-transitory computer readable storage medium.

In some implementations, the memory 314 or the computer readable storage medium of the memory 314 stores the following programs, modules, and data structures, or a subset thereof:
- an operating system 316, which includes procedures for handling various basic system services and for performing hardware dependent tasks;
- a network communication module 318, which is used for connecting the server system to other computers or electronic devices (e.g., electronic devices 102) via the one or more communication network interfaces 304 (wired or wireless) and one or more communication networks, such as the Internet, other wide area networks, local area networks, metropolitan area networks, and so on;
- a web server 320 (such as an HTTP server), which receives web requests from users and responds by providing responsive web pages or other resources;
- libraries 322. In some implementations, the libraries 322 includes a visual analytics intent library 323, which can be downloaded onto and configured for use (e.g., as the visual analytics intent system 230 or VAIL) at an electronic device 102;
- intent types 229;
- a data visualization web application 324, which may be downloaded and executed by a web browser 428 on a user's electronic device 102. In general, the data visualization web application 324 has the same functionality as a desktop data visualization application (e.g., a data visualization application that includes a data visualization user interface 104), and as described in the patent applications that this application incorporates by reference), but provides the flexibility of access from any device at any location with network connectivity, and does not require installation and maintenance. In some implementations, the data visualization web application 324 includes various software modules to perform certain tasks. In some implementations, the web application 324 includes a user interface module 326, which provides the user interface for all aspects of the web application 324. In some implementations, the web application 324 includes a data retrieval module 328, which builds and executes queries to retrieve data from one or more data sources 110. The data sources 110 may be stored locally on the server system 300 or stored in an external database. In some implementations, data from two or more data sources may be blended. In some implementations, the data retrieval module 328 uses a visual specification 344 to build the queries. In some implementations, the data visualization web application 324 also includes a data visualization compiler and a data visualization virtual machine (not shown);
- a natural language processing interface 330, which receives and parses queries provided by a computer system or an electronic device 102 that includes natural language input functionalities. In some implementations, the queries include natural language inputs provided by a user of the electronic device 102 (e.g., via chat application 106). In some implementations, the natural language processing interface 330 may identify analytical expressions 332, such as aggregation expressions, group expressions, filter expressions, limit expressions, and/or sort expressions.
- the natural language processing interface 162 may also include a dependency determination module 334, which looks up dependencies in the database/data sources 110 to determine how particular terms and/or phrases are related (e.g., dependent);
- in some implementations, the natural language processing interface 162 includes a filter generation module 532, which determines if one or more filters are related to a field that has been modified by a user. The filter generation module 532 generates the one or more filters based on user selections;
- a data visualization platform 338, which includes:
  - a data visualization generation module 340, which automatically generates and displays a corresponding visual graphic (also referred to as a "data visualization" or a "data viz") using user inputs (e.g., natural language input)
  - a visual representation generation module 342 (optional), which generates representations of data visualizations and sending the generated representations to the electronic device 102. In some implementations, the representation of the data visualization is an image file of the data visualization (e.g., the image file is a .png, .tiff or .jpg file). In some implementations, the representation of the data visualization includes a link to an image. In some implementations, the representation of the data visualization is a link (e.g., a URL link) to the data visualization.
  - visual specifications 346, which are used to define characteristics of a desired data visualization. In some implementations, the information the electronic device 102 provides (e.g., via user input) is stored as a visual specification. In some implementations, the visual specifications 346 includes previous natural language commands received from a user or properties specified by the user through natural language commands. In some instances, a visual specification 346 includes two or more aggregations based on different levels of detail;
- zero or more databases or data sources 110. In some implementations, the data sources are stored as spreadsheet files, CSV files, XML files, flat files, or JSON files, or stored in a relational database. For example, a user selects one or more databases or data sources 110 (which may be stored on the server system 300 or stored remotely), selects data fields from the data source(s), and uses the selected fields to define a visual graphic;

metadata/data semantics 246 of data sources (e.g., metadata/data semantics 246-1 corresponding to a first data source), which are used by the server system 300 to infer underspecified and/or ambiguous intent. In some implementations, the metadata 246 for the data source includes metadata for: semantics of data fields, data field types corresponding to the data fields, statistics of the data fields, derivations of the data fields, and/or default bin sizes corresponding to the data fields; and APIs 348 for receiving API calls, translating the API calls into appropriate actions, and performing one or more actions.

In some implementations the server system 300 further includes an inferencing module (not shown), which is used to resolve underspecified (e.g., omitted information) or ambiguous (e.g., vague) natural language commands (e.g., expressions or utterances) directed to the databases or data sources 110, using one or more inferencing rules. In some implementations, the one or more inferencing rules are defined according to a visual analytical intent language (VAIL).

In some implementations, canonical representations are assigned to the analytical expressions 332 (e.g., by the natural language processing module 330) to address the problem of proliferation of ambiguous syntactic parses inherent to natural language querying. The canonical structures are unambiguous from the point of view of the parser and the natural language processing module 330 is able to choose quickly between multiple syntactic parses to form intermediate expressions.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 314 stores a subset of the modules and data structures identified above. In some implementations, the memory 314 stores additional modules or data structures not described above.

Although FIG. 3 shows a server system 300, FIG. 3 is intended more as a functional description of the various features that may be present rather than as a structural schematic of the implementations described herein. In practice, and as recognized by those of ordinary skill in the art, items shown separately could be combined and some items could be separated. In addition, some of the programs, functions, procedures, or data shown above with respect to a server 300 may be stored or executed on a computing device 102. In some implementations, the functionality and/or data may be allocated between a computing device 200 and one or more servers 300. Furthermore, one of skill in the art recognizes that FIG. 3 need not represent a single physical device. In some implementations, the server functionality is allocated across multiple physical devices that comprise a server system. As used herein, references to a "server" or "data visualization server" include various groups, collections, or arrays of servers that provide the described functionality, and the physical servers need not be physically collocated (e.g., the individual physical devices could be spread throughout the United States or throughout the world).

III. Visual Analytics Intent System

Figure 4:
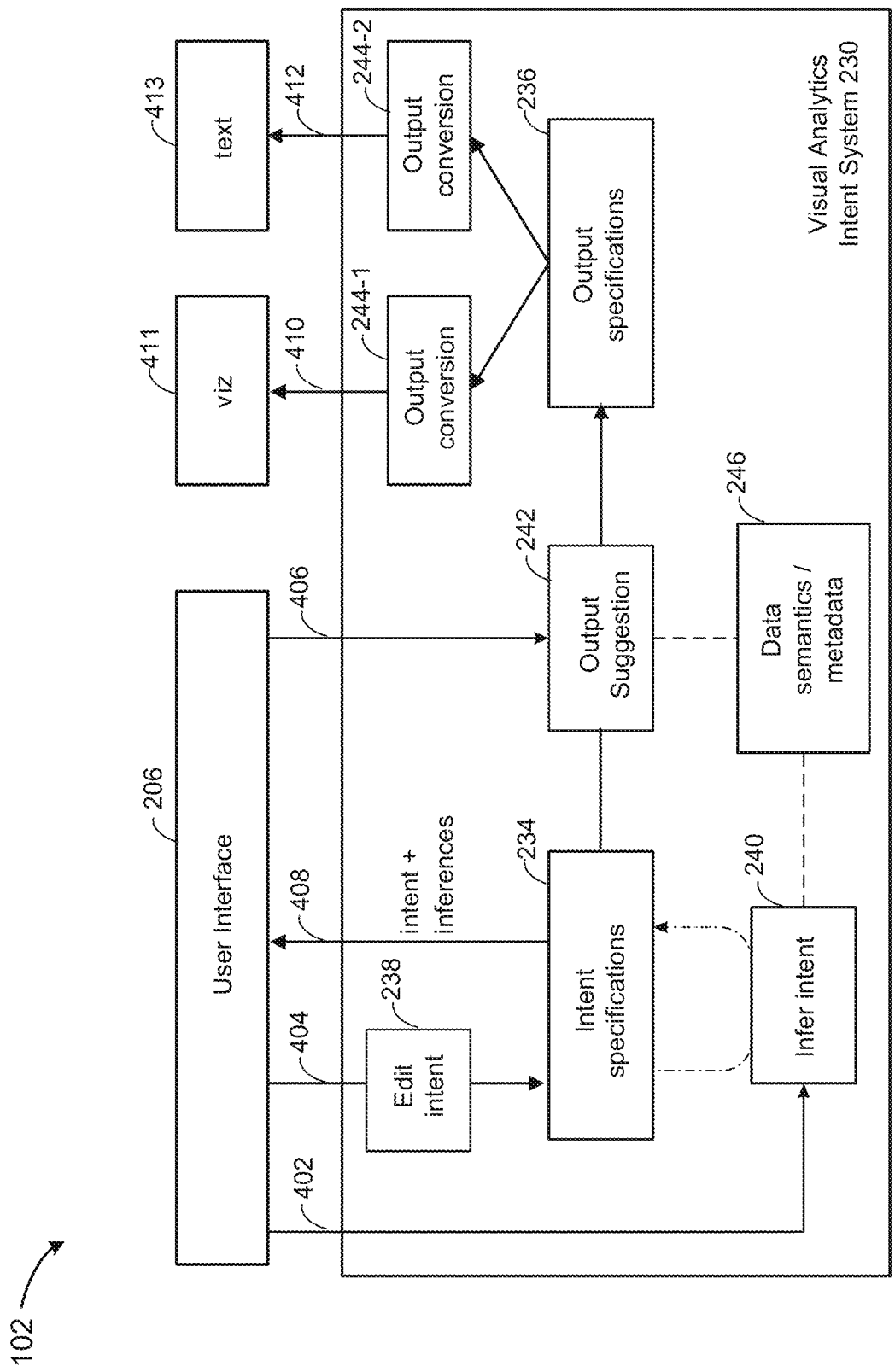
FIG. 4 illustrates a visual analytics intent system according to some implementations.

FIG. 4 illustrates a visual analytics intent system 230 (e.g., VAIL engine) and connections to a client application, in accordance with some implementations.

In FIG. 4, the arrows going into the visual analytics intent system 230 (e.g., arrows 402, 404, and 406) represent commands (e.g., requests or instructions) from the client application 224, while arrows going out of the visual analytics intent system 230 (e.g., the arrows 408, 410, and 412) represent specifications (e.g., generated by the visual intent analytics system 230 that the client application uses to present responses to a user.

In some implementations, the client application 224 comprises a user interface (e.g., user interface 206). In a typical cycle of interaction, the user interface 206 accepts input from a user. In accordance with the user input, the client application 224 issues a request (e.g., a command) that describes user intent to the visual analytics intent system 230. The request includes identification of one or more intent types. In accordance with the request, the visual analytics intent system 230 formulates (e.g., creates, updates, or delete) one or more intent specifications 234. In some implementations, the user intent can be underspecified and/or ambiguous. The visual analytics intent system 230 in missing details (e.g., attributes corresponding to properties) for an underspecified intent and resolves any ambiguities where the intent is ambiguous or vague.

In some implementations, after intent is inferred, the user interface asks the visual analytics intent system 230 to suggest output. The visual analytics intent system 230 then generates one or more output specifications 236, which can be converted (e.g., via output conversion subsystem 244) into various types of output that are compatible with the display modality of the client application 224 (and the electronic device 102). FIG. 4 shows that the output specifications 236 can be converted into various types of output, such as a visualization 411, text 413, audio or images, that the client application 224 can display to the user. In some circumstances, based on the inferred intent and the output response, the user may decide to modify their intent, repeating the cycle as they iterate in the analysis of their data.

In some implementations, the client application 224 and the visual analytics intent system 230 are part of one single application that includes several subsystems, and the interactions represent interactions within the subsystems.

As depicted in FIG. 4, the visual analytics intent system 230 comprises intent specifications 234, output specifications 236, data semantics/metadata 246 corresponding to one or more data sources 110, and subsystems for editing intent (e.g., edit intent subsystem 238), suggesting output (e.g., output suggestion subsystem 242), and converting output (e.g., output conversion subsystem 244). Each of these components is discussed below.

A. Fields

Many parts of the visual analytics intent system 230 reference data fields from a data source 110 (or a data table corresponding to a data source 100).

FIG. 5 illustrates a Backus-Naur Form (BNF) production to define a data field (e.g., field), in accordance with some implementations. A field reference either describes an explicit field-instance or a reference to a variable that refers to multiple possible field instances (e.g., var-name, [index]).

In some implementations, a field-instance includes a name (e.g., a field name) an optional derivation (e.g., an aggregation type such as sum or min, or a time derivation such as year or hour), and an optional bin-count, to be used when binning values.

A variable field (e.g., field-var) associates a variable field name (e.g., var-name) with a list of field instances (e.g., {field}), allowing that list to be referenced from various specifications. A field-var is referenced by name. The optional index value is used when more than one intent or output property references the field variable, yet each reference should be to a different field instance in the variable's list.

B. Intent Specifications 234

FIG. 6 illustrates a BNF production to define intent specifications according to some implementations.

A user's intent is described by vail-intent, which captures information about one or more different types of intent expressed by the user. In some implementations, the intent type is provided by the client application 224 (e.g., using the editing rules). As illustrated in FIG. 6, vail-intent is defined as the following tuple:

vail-intent:=(intents, field-vars)

A vail-intent contains a list of intent specifications and field-vars if any were created by inferencing rules of the visual analytics intent system 230. FIG. 6 illustrates a single intent is defined by the following tuple:

intent:=(id, inferred, specific-intent)

A single intent (e.g., a respective intent specification 234) includes a unique id, a list of properties that have been inferred, and a specific-intent. FIG. 6 shows that specific-intent can include a focus intent, a trend intent, a correlation intent, a distribution intent, a geographic intent, an encoding intent, or a fields intent. In some implementations, specific-intent is also referred to as an intent type (e.g., intent types 229).

In some implementations, a respective intent specification 234 has a corresponding set of properties that is based on the intent type to which the respective intent specification corresponds. This is illustrated in FIG. 6. For example, the correlation intent includes a first field property (e.g., [field1]) and a second field property (e.g., [field2]). The distribution intent includes a grouping field property (e.g., [bin-field]) and a bin size property (e.g., [bin-count]). The fields intent includes a field property (e.g., (field)).

In some implementations, the intent types include the focus intent. The focus intent can comprise a field property (e.g., [field]), a data value property (e.g., [values]), a sort-by field property (e.g., a data field for executing a sort operation) (e.g., [sortby-field]), an adjective (e.g., [adjective]), a quantity (e.g., [quantity]), and a focus strategy property (e.g., [strategy]).

In some implementations, the intent types include the trend intent. The trend intent can include a measure data field property (e.g., ([measure-field]) and a time field property (or a date/time field property) (e.g., [time-field]).

In some implementations, the visual analytics intent system 230 receives a request that includes an intent type, in which not all properties have been specified in the request. The visual analytics intent system 230 has rules for filling in under-specified or missing properties, which are described below.

C. Metadata/Data Semantics 246

In some implementations, the visual analytics intent system 230 applies rules that leverage metadata (e.g., data semantics) 246 about a data source (e.g., a data table corresponding to a data source, such as data source 110), to infer information for the ambiguous or underspecified intent. The metadata 246 for the data source can include metadata for: semantics of data fields, data field types corresponding to the data fields, statistics of the data fields, derivations of the data fields, and/or default bin sizes corresponding to the data fields. In some implementations, the metadata 246 is provided by the client application 224.

In some implementations, metadata for a data source is described using data-semantics. FIG. 7 illustrates a BNF production to define data-semantics according to some implementations.

FIG. 7 shows that data-semantics contains a list of field names with associated information about the fields (e.g., {(name, field-info)}). field-info comprises field-type, which encapsulates important semantics about the field, a default derivation, a default binning size (e.g., [bin-count]), and statistics (e.g., [stats]) of the field. The field-type includes: a categorical field type, a time field type, a geographical field type, a currency field type, a quantitative dependent field type, a quantitative independent field type, a latitude field type, and/or a longitude field type. In some implementations, the visual analytics intent system 230 uses the default derivation and/or bin size properties if these are not specified in the request. The statistics (e.g., [stats]) of the field includes a data type and a corresponding domain of the data field (e.g., (data-type, domain)). In some implementations, the data-type includes text or numeric.

In some implementations, the metadata 238 is stored on the electronic device 102 and all the VAIL engine processes are executed locally on the electronic device 102, thereby avoiding the need to transmit information to and/or run queries on a server system, thereby making data analytics performant on large datasets. In some implementations, the metadata 246 is stored on the server system 300) and is retrieved by the visual analytics intent system 230 on-the-fly in accordance with the request.

D. Output specifications 236

VAIL has a general-purpose specification for describin-multiple possible outputs. The output specifications 236 describe how data should be presented to the user and is not bound to a specific output modality. In some implementations, the visual analytics intent system 230 generates one or more respective output specifications 236 corresponding to each intent type. The output specifications 236 are generated from vail-intent through suggest-output rules, as described below. The output specifications 236 can be converted to a visual grammar such as VizQL or Vega-lite or to a non-visual form such as text, verbal, or audio.

In accordance with some implementation, the output specifications 236 (e.g., vail-output) is defined as the following tuple:

vail-output:=(output-sorted, output-by-id, field-vars)

The output-sorted contains a list of output specifications, with the most highly recommended output listed first, while output-by-id provides a look-up from intent id to the different output specifications generated from the corresponding intent. field-vars contains any field variables referenced by the output specification.

FIG. 8 illustrates a BNF production to define a single output specification (e.g., output) according to some implementations.

In some implementations, and as illustrated in FIG. 8, a single output specification includes a weight, intent-ids, encoding, and data-shape.

In some implementations, an output specification (e.g., output) contains a weight from 0 to 100, where higher numbers are more highly recommended. intent-ids contains the ids of all the intents used to generate the output. An encoding contains a viz-type and a collection of different encoding properties. An encoding can list zero or more fields and does not include explicit details for mark color, size, or shape, as it leaves these decisions to the output implementation. In some implementations, the encoding types are simply suggestions and may not be relevant. For example, an output implementation that generates text may choose to use the encodings simply to inform how to shape the data rather than how to encode it.

In some implementations, the entire list of encoding fields is used to determine the aggregation and level of detail of the data to be used for output. For example, consider a data table with the data fields points, price, name, and variety, where every row describes a different wine. If encodings only contain average price and variety, we should only include the price and variety fields, with one row per variety containing an aggregated average price.

data-shape describes how to further modify the source data before being used. As further illustrated in FIG. 8, data-shape includes focus and sort. focus describes which portion of the data to focus on.

In some implementations, focus includes a recommended strategy for how to focus, such as filter or highlight. output-adjective has several values with special semantics that allow the visual analytics intent system 230 to specify vague ranges without having to query the data. "top" and "bottom" indicate that the output implementation should just focus on a single value, while "high" and "low" indicate that the visual analytics intent system 230 should focus on a range of the highest or lowest values. The sort shaping property describes which fields to use to sort the data.

E. Output Conversion 244

In some implementations, the visual analytics intent system 230 comprises an output conversion subsystem 244, for converting the output specification 236 into a visual grammar such as VizQL or Vega-lite or to a non-visual form such as text, audio, or verbal output.

F. Edit Intent Subsystem 238

VAIL defines rules for editing vail-intent, inferring ambiguous or missing intent, and suggesting vail-output based on the intent. These rules leverage information contained in data-semantics (e.g., metadata 246), which describes the semantics of the data fields in a data source 110 (or of a data table of the data source).

In some implementations, the visual analytics intent system 230 comprises an edit intent subsystem 238, which applies one or more rules defined by VAIL to edit an intent specification.

FIG. 9 illustrates a BNF production rule for editing an intent specification (e.g., set-intent) according to some implementations.

As discussed earlier, vail-intent can contain multiple intent specifications. A specific intent can be added or changed with the set-intent rule, or removed with the remove-intent rule. In some implementations, these rules use id to identify the specific intent. All occurrences of a field instance in a vail-intent can be swapped out for another field instance using replace-field, thereby allowing a user to iterate on their intent.

G. Infer Intent Subsystem 240

In some implementations, the visual analytics intent system 230 comprises an infer intent subsystem 240, which applies one or more rules defined by VAIL for inferring ambiguous or underspecified (e.g., missing) intent.

In some implementations, there is a set of data properties corresponding to a respective intent specification for a respective intent type. The visual analytics intent system 230 can determine a respective intent type as ambiguous when a request specifies more than one attribute for a data property in the set of data properties. A respective intent type can also be ambiguous when a request specifies a measurable adjective (e.g., "top") but does not specify a quantity. In some implementations, the visual analytics intent system 230 can determine a respective intent type to be underspecified when a request specifies no attribute for at least one data property in the set of data properties. In some implementations, when a request specifies exactly one attribute for each data property of the set of data properties, the visual analytics intent system 230 establishes that the intent type is fully specified.

Many intent types have rules for how to infer missing or ambiguous intent properties. The rules examine the data-semantics to make informed decisions. In some implementations, if the visual analytics intent system 230 finds exactly one possible field for an unspecified property, it fills it in directly. In some implementations, if the visual analytics intent system 230 finds multiple possible fields for an unspecified property, it creates a field-var to contain the list and references that from the intent property.

FIG. 10 illustrates a BNF production rule for inferring information to resolve an underspecified focus intent according to some implementations.

The focus intent relates to directing one's analysis to a subset of data values. As explained earlier in FIG. 6, an input specification for the focus intent type can comprise a field property (e.g., [field]), a data value property (e.g., [values]), a data field for executing a sort operation (e.g., [sortby-field]), an adjective (e.g., [adjective]), a quantity property (e.g., [quantity]), and a focus strategy property (e.g., [strategy]).

The strategy property has to do with approaches for directing a user's attention on a subset of data values. FIG. 10 illustrates that in some implementations, in accordance with a determination that the request does not specify a strategy property (e.g., the request does not contain the term "filter," "highlight," or "zoom"), the visual analytics intent system 230 can select (e.g., infer) highlight to be the default strategy property, because studies have shown that showing data in context is often important. In some implementations, in accordance with the "highlight" strategy, the visual analytics intent system 230 generates an output specification that includes one or more recommended operations to highlight values described by dataShape.focus in the output specification. For example, the recommended operations can include a sort operation that arranges data rows from a data table of the data source in an ascending or a descending order according to data values of a data field in the data table, and a highlight operation that highlights a specified number of the data values based on ranking of the data values.

In some implementations, in accordance with a determination that the focus intent does not specify a strategy property, the visual analytics intent system 230 can select "zoom" as the strategy property. In some implementations, in accordance with the "zoom" strategy, the visual analytics intent system 230 generates an output specification that includes a recommended operation to zoom into values described by dataShape.focus in the output specification.

In some implementations, in accordance with a determination that the focus intent does not specify a strategy property, the visual analytics intent system 230 can select "filter" as the strategy property. In some implementations, in accordance with the "filter" strategy, the visual analytics intent system 230 generates an output specification that includes a recommended filter operation, to filters the data rows of the data source to a subset of data rows for which a specific data field has a specific data value.

Referring again to FIG. 10, in some implementations, in accordance with a determination that the field property (e.g., field) is not specified in the request, the visual analytics intent system 230 can select a data field, from the data source, having a text data type and having a domain that is greater than or equal to larger than a quantity specified in the request. In some implementations, in accordance with a determination that the field property (e.g., field) is not specified, the visual analytics intent system 230 can select a data field whose domain includes a data value that is specified in the request. In some implementations, when sort-by is not specified, the visual analytics intent system 230 can use all data fields in the data source having a currency data type (e.g., CCurrency) if the request includes an adjective that refers to price (e.g., "cheap" or "expensive"). In some implementations, in accordance with determination that the data source does not include a data field having a currency field type, the visual analytics intent system 230 will infer the sort-by field by selecting all numeric data fields.

FIG. 11 illustrates a BNF production rule for inferring information to resolve an underspecified correlation intent according to some implementations.

The correlation intent describes a desire by the user to understand the correlation between data fields. An exemplary request corresponding to a correlation intent can be "Show the correlation between horsepower and MPG," in which the two data fields are "horsepower" and "MPG." As noted in FIG. 6, the correlation intent includes a first field property (e.g., [field1]) and a second field property (e.g., [field2]). In some implementations, a correlation intent is underspecified at least one of the two field properties is not specified in the request.

In some implementations, in accordance with a determination that the correlation intent is underspecified, the visual analytics intent system 230 identifies a list of all numeric fields in the data source 110. Here, the variable "list" in FIG. 11 is an array. That is to say, the visual analytics intent system 230 creates an array that is a list of all the numeric data fields. Then, within the intent specification, if the first data field is not specified (i.e., "if !i.field1"), the visual analytics intent system 230 fills in this field with element 0 from the list (i.e., the first field in the field list). If the second field has not been specified, the visual analytics intent system 230 fills in the field with element 1 from the list (the second numeric data field). If both field properties are not specified, the visual analytics intent system 230 sets the index in the field1 and field2 properties to indicate that they should refer to the same field variable but different fields in the list.

FIG. 12 illustrates a BNF production rule for inferring information to resolve an underspecified distribution intent according to some implementations. The distribution intent describes a desire by the user to see the spread of values for a data field. An exemplary request corresponding to a distribution intent is "Show the distribution of wine prices." As described in FIG. 6, in some implementations, the distribution intent includes a grouping field property (e.g., [bin-field]) and a bin size property (e.g., [bin-count]).

In some implementations, in accordance with a determination that the request does not specify the grouping field property, the visual analytics intent system 230 searches for all quantitative fields (e.g., Qi, Qd, or CCurrency). In some implementations, in accordance with a determination that the request specifies a bin size, the visual analytics intent system 230 overrides (e.g., replaces) bin-size information (e.g., [bin-count]) specified in data-semantics with the bin size that is specified in the request.

FIG. 13 illustrates a BNF production rule for inferring information to resolve an underspecified trend intent according to some implementations.

The trend intent is used to describe a user's desire to see the values of a field over time. An example request that includes the trend intent comprise a statement such as "Show the trend of COVID cases" or a question such as "What is the price of a one-bedroom apartment in San Francisco over the past five years?"

As noted in FIG. 6, the trend intent includes a measure data field property (e.g., ([measure-field]) and a time field property (or a date/time field property) (e.g., [time-field]) in accordance with some implementations. In some implementations, in accordance with a determination that the request does not include a measure field, the visual analytics intent system 230 finds all quantitative dependent fields (e.g., Qd) in the data source, creates a field-var to contain all the quantitative dependent fields, and references that from the measure-field property. In some implementations, in accordance with a determination that the request does not specify a time field property, the visual analytics intent system 230 identifies all time fields in the data source, creates a field-var to contain all the time fields, and references that from the time-field property.

In some implementations, the intent type includes a geographic intent. An exemplary request that includes a geographic intent is "Where are my sales?" In some implementations, the inferencing rules for an underspecified geographic intent are similar to those for an underspecified trend intent as described above, except that inferencing rules for geographic intents involve finding fields of type CGeo, QLat, and QLon.

In some implementations, the intent types include an encoding intent. The encoding intent represents a desire to modify the output or a prior intent. An example request that includes an encoding intent is "Color by X" (where X is a field)). In some implementations, VAIL does not define inferencing rules for the encoding intent.

In some implementations, the request includes an encoding intent and specifies a first data field. In accordance with the request, the visual analytics intent system 230 generates the respective output specification by adding an encoding parameter that specifies rendering the data visualization according to the first data field. In some implementations, the visual analytics intent system 230 generates the respective output specification overriding an existing encoding parameter for the data visualization according to the first data field.

In some implementations, the intent types include a fields intent. The fields intent represents an interest in fields without an explicitly defined analytical intent. An example request that includes the fields intent is "Show Sales and Profit." In some implementations, VAIL does not define inferencing rules for the fields intent.

In some implementations, the request includes the fields intent and specifies a first data field. In accordance with the request, the visual analytics intent system 230 generates the respective output specification by applying one or more inferencing rules based on semantic constraints imposed by the first data field.

H. Output Suggestion Subsystem 242

In some implementations, the visual analytics intent system 230 comprises an output suggestion subsystem 242, which applies one or more rules for suggesting vail-output based on the intent.

To suggest effective output for a user's specified intents, VAIL defines rules for converting each intent type to information in an output specification. In some implementations, the visual analytics intent system 230 creates a new output specification from correlation, distribution, trend, geographic, and fields intents.

In some implementations, the correlation intent is used to generate a scatter plot:

vizType: "scatterPlot", x: i.field1, y: i.field2

In some implementations, the distribution intent is used to generate a histogram.

In some implementations, the trend intent creates a line chart.

In some implementations, the encoding and focus intents modify the output specifications generated by prior intents. If there are no output specifications corresponding to these intent types, the fields from these intents can be extracted and supplied to suggest-output rules for a fields intent, inviting further refinement from the user.

The encoding intent type is used to modify the encoding of other output specifications, adding or overriding existing encodings. The focus intent type is used to modify the data-shape of other output specifications. It uses field, adjective, values, and quantity to create an output.data-shape.focus specification (e.g., "show the top 10 COVID case [counts]"). It uses field, sort-by, and adjective to create an output.data-shape.sort specification.

Output rules for the fields intent rely on the data-semantics of the intent's fields since less is known about the user's objective. This can leverage a system like Show Me or Voyager, which are designed to use field semantics to generate effective visualizations.

I. Extensibility and Customization

In some implementations, the visual analytics intent system 230 can also be customized according to the needs of the user. For example, developers can add their own custom intents to tailor to domain-specific concepts such as "best neighborhood" or technical jargons that are specific in a business context. This entails providing rules for inferring missing or ambiguous properties, along with rules for generating corresponding output specifications. Intent properties can be inferred through an understanding of an intent type (e.g., a specific intent), such as knowing the type of field that should be used and identifying information about the data source to find an appropriate match (e.g., finding all the fields representing time).

In some implementations, an intent specification corresponding to a specific intent type can be extended to add new properties. For example, in the focus intent, since there are many alternatives for describing-high or low numeric values, the attributes in the adjective property can be expanded to include new adjectives. Additionally or alternatively, the infer-intent rule corresponding to the focus intent can be adjusted to include new options. As an example, in some implementations, in order to allow a focus intent to indicate zooming into the data, a developer can add a new strategy called zoom, then add custom logic to their output specification handler to zoom into the values described by dataShape.focus in the output specifications 236.

In some implementations, the visual analytics intent system 230 can be extended by adding new possibilities to vail-output to leverage from suggest-output rules. For example, if a developer wants to create an infer-intent rule that created a treemap visualization, the developer could add a new viz-type to the output specification, and leverage existing encoding properties to describe how the visualization should be constructed.

In light of these principles, we know turn to certain implementations.

IV. Implementations

In some implementations, the visual analytics intent system 230 (e.g., VAIL engine) is written in TypeScript and compiles to JavaScript.

In some implementations, visual analytics intent system 230 includes a graphical user interface (GUI) built using React components that can be used to enter and modify its built-in intent specifications.

In some implementations, the client application 224 can interact with visual analytics intent system 230 through input commands and output specifications, as well as provide their own data sources. Input is through VAIL commands to tell the engine to set intent, infer missing and ambiguous intent, and suggest output. The client application 224 can choose to show the user the inferred intent that the visual analytics intent system 230 sends back, optionally providing a way for the analyst to refine the intent.

In some implementations, the output specification can be interpreted in a client-specific way. The visual analytics intent system 230 also includes a built-in Vega-lite converter, which can be used in place of (or in addition to) client-specific interpretations. Data sources can be hand-curated to improve the ability of the visual analytics intent system 230 to properly infer intent and suggest effective output. Each field can specify a type such as currency or time, an optional preferred derivation such as average or sum, and an optional bin size.

In some implementations, as a performance consideration, the visual analytical intent system 230 only looks at metadata 246 about the fields rather than running live queries.

A. GUI-based application

FIGS. 14A-14J provide a series of screen shots for interactions with a graphical user interface-based application 224 that uses VAIL, in accordance with some implementations.

Figure 14A:
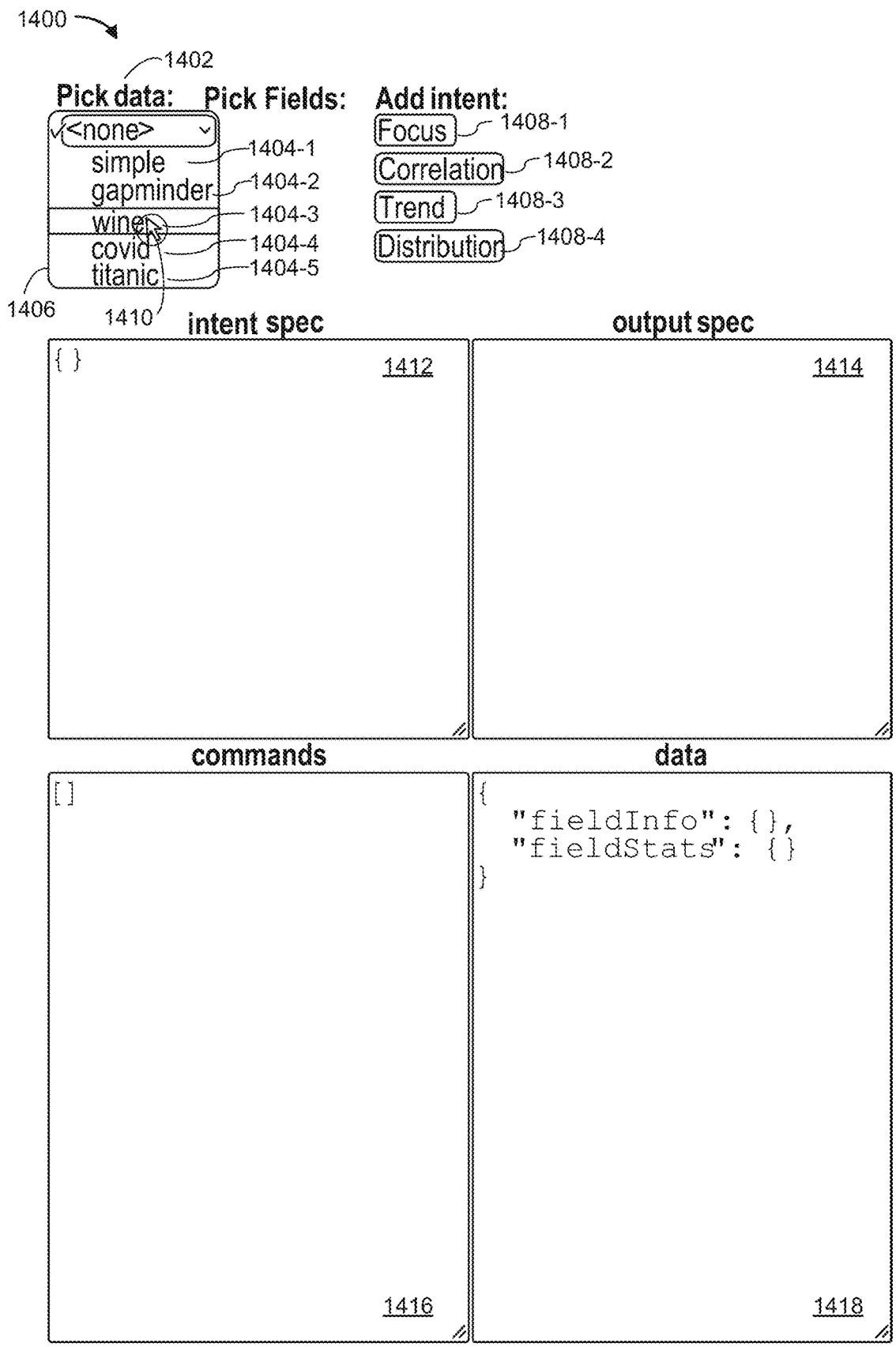

FIG. 14A illustrates a graphical user interface 1400, of the application 224, that is displayed on an electronic device 102. The graphical user interface 1400 includes a graphical control element 1402 (e.g., a "Pick data" affordance) that, when selected by a user, causes a list of datasets 1404 (e.g., datasets corresponding to respective data sources 110) be displayed as a dropdown menu 1406. The graphical user interface 1400 also includes graphical control elements 1408 (e.g., a "Add Intent" affordance) that, when selected by a user, identifies one or more respective intent types (e.g., intent types 229 in FIG. 2 and specific-intents in FIG. 6). In the example of FIG. 6, the affordances 1408 includes a focus intent affordance 1408-1, a correlation intent affordance 1408-2, a trend intent affordance 1408-3, and a distribution intent affordance 1408-4.

In some implementations, and as illustrated in FIG. 14A, the graphical user interface 1400 includes an intent specification region 1412 for displaying one or more intent specifications formulated by VAIL in accordance with user interactions. The graphical user interface 1400 includes an output specification region 1414 for displaying one or more output specifications that are generated by VAIL. The graphical user interface 1400 also includes a commands region 1416 for displaying one or more commands (e.g., from the client application 224). The graphical user interface 1400 also includes a data region 1418 for displaying data (e.g., properties) that are specified by the user.

FIG. 14A illustrates a user interaction with the graphical user interface 1400. In this example, the user selects (1410) a dataset 1404-3 corresponding to "Wine." The user also selects the focus intent affordance 1408-1.

Figure 14B:
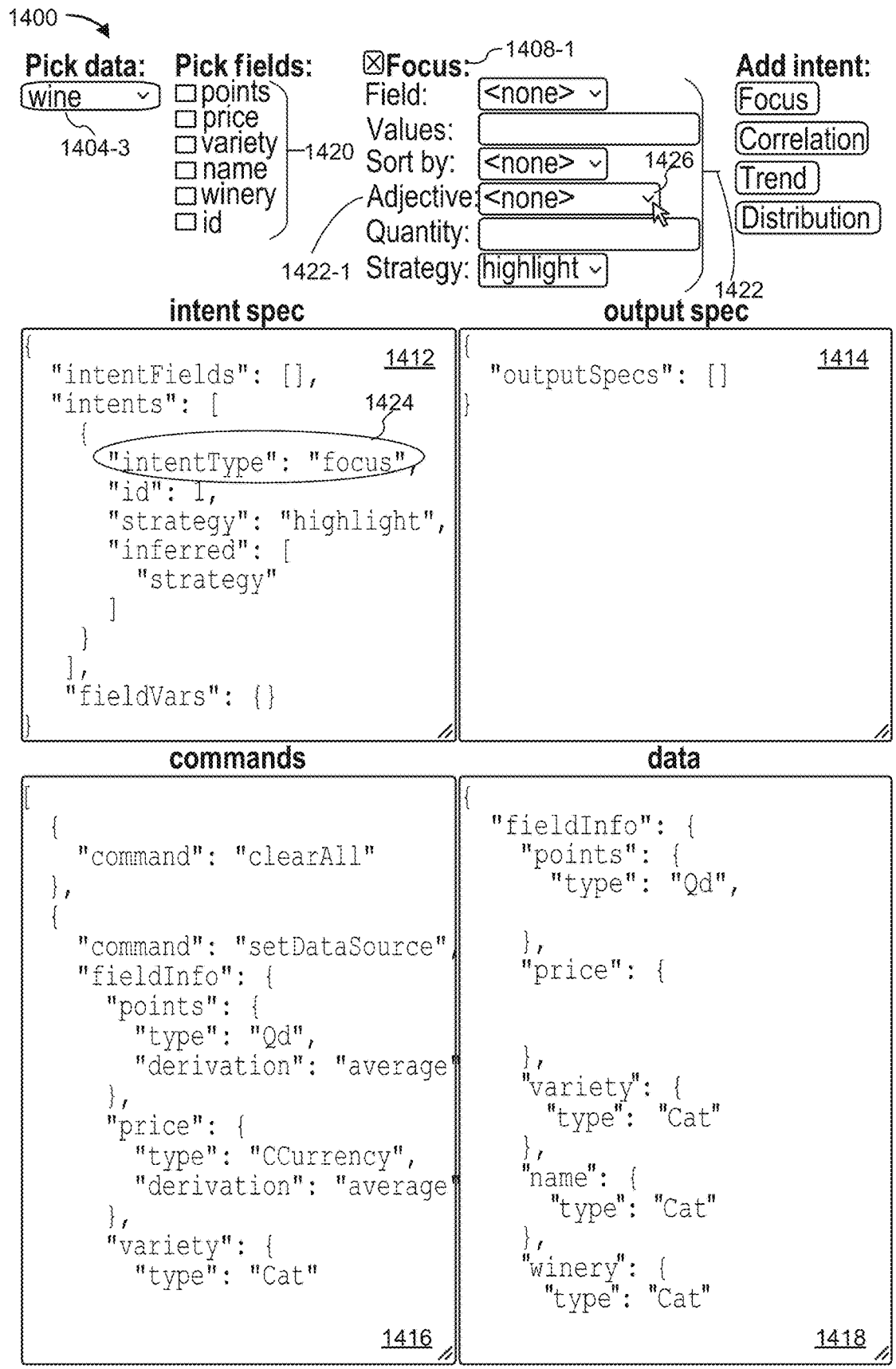

FIG. 14B illustrates in response to the user selection of the "Wines" dataset, the graphical user interface 1400 displays graphical control elements 1420 (e.g., "Pick fields" affordances). Each of the elements 1420 corresponds to a respective data field in the "Wine" data source.

FIG. 14B also illustrates in response to the user selection of the "Focus" intent, the graphical user interface 1400 displays a set of properties 1422 corresponding to the focus intent. In this example, the properties 1422 include a "field" property, a "values" property, a "sort by" property, an "adjective" property, a "quantity" property, and a focus strategy property. The intent specification region 1412 displays (1424) the selected intent type.

FIG. 14C illustrates in response to user selection of a dropdown button 1426 next to the "adjective" property 1422-1 in FIG. 14B, the graphical user interface 1400 displays a dropdown menu 1428 that includes a list of adjectives (e.g., measurable adjectives). The user selects (1430) a first adjective (e.g., "expensive") from the list.

Figure 14D:
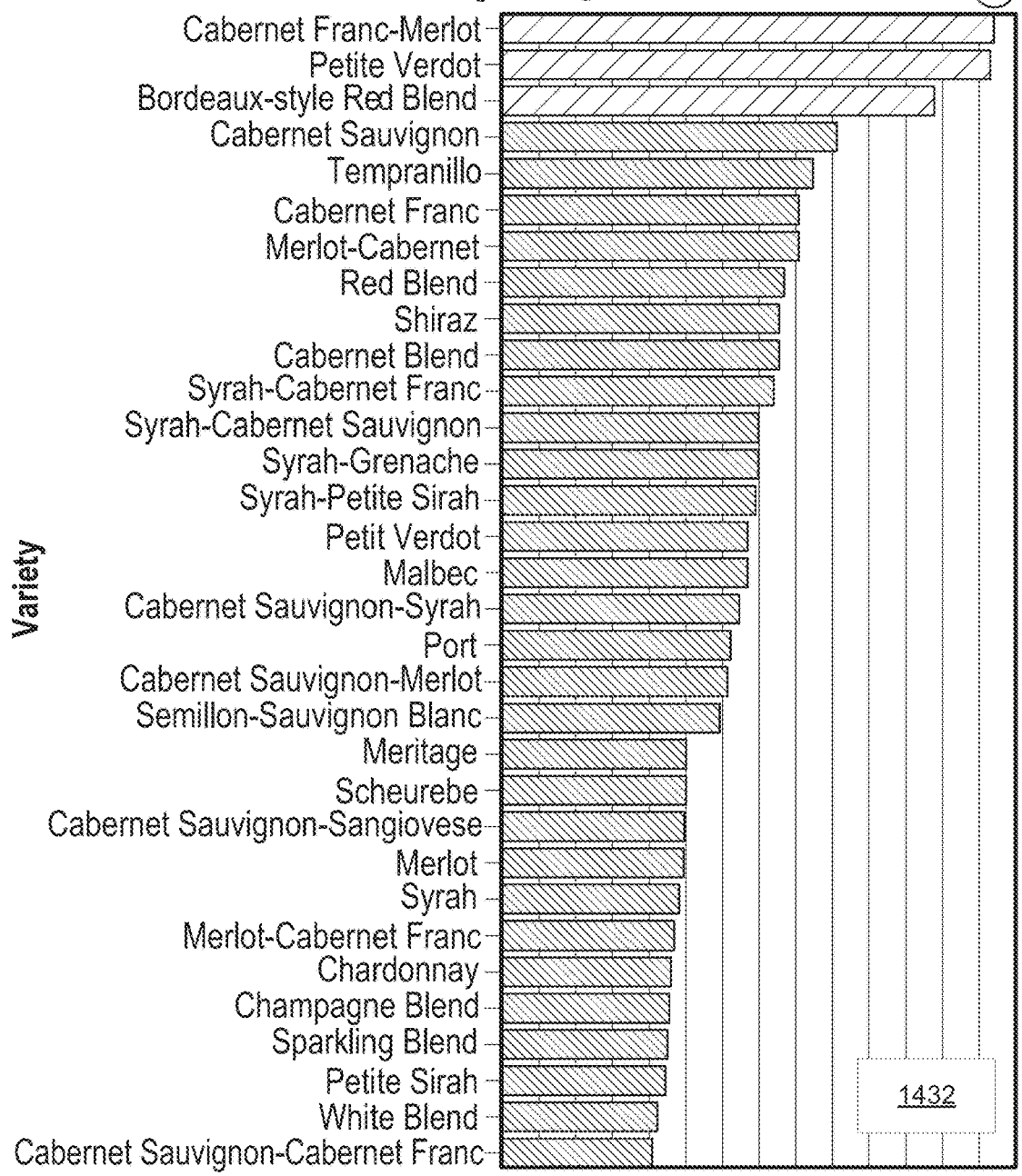

FIG. 14D illustrates the graphical user interface 1400 displays a data visualization 1432 (e.g., a bar graph) in response to user selection (e.g., user specification) of the adjective "expensive." Each of the bars in the bar graph corresponds to a wine variety. The data bars are sorted (e.g., arranged) in a descending order, and the top three rows are displayed in a visually distinct manner from other rows in the bar graph. In this example, the visual analytics intent system 230 infers a currency attribute "price" in accordance with user selection of the adjective "expensive." It then produces an output specification for generating a bar chart, highlighting a top range of price values. FIG. 14 also shows that the data field "variety" is the inferred field for the "field" property 1422-2, and the strategy "highlight" has been inferred as the strategy property.

Figure 14E:
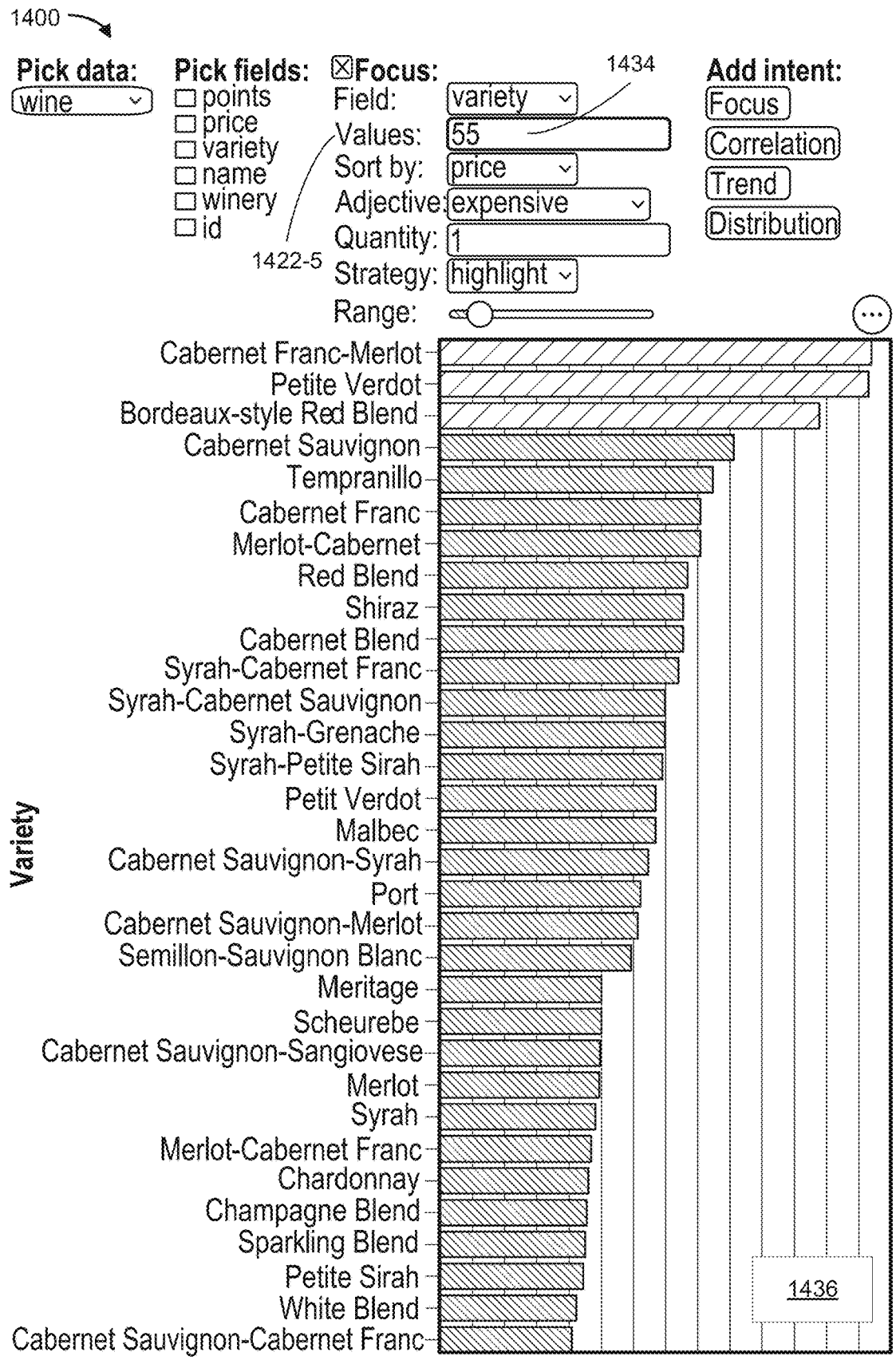
Figure 14F:
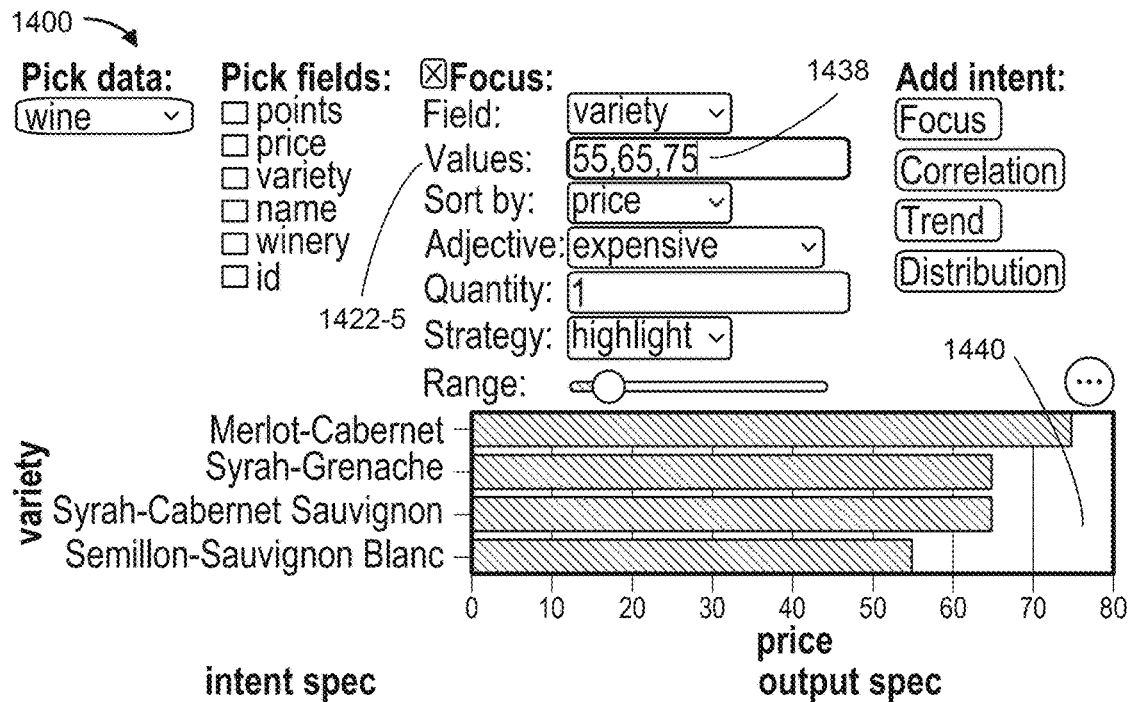

FIGS. 14E and 14F illustrate user interactions with the graphical user interface 1400. In FIG. 14E, the user inputs (e.g., specifies) a first value 1434 (e.g., "55") for the "values" property 1422-5. In response to the user input, the graphical user interface 1400 displays an updated data visualization 1436 (e.g., a bar graph) with data bars corresponding to wine varieties having a price of at least $55. FIG. 14F illustrates the user specifying second values 1438 (e.g., "55, 65, 75"). In this example, VAIL interprets the input "55, 65, 75" as a user intent to filter the view based on specific values "55", "65", and "75." The visual analytics intent system 230 can apply this new intent on the existing context, filtering to the specific values "55", "65", and "75." It then generates an output specification that includes a filter operation that filters data rows to a subset of data rows whose values for price are "55", "65", and "75." The graphical user interface 1400 displays an updated data visualization 1440 that reflects the output specification.

Figure 14H:
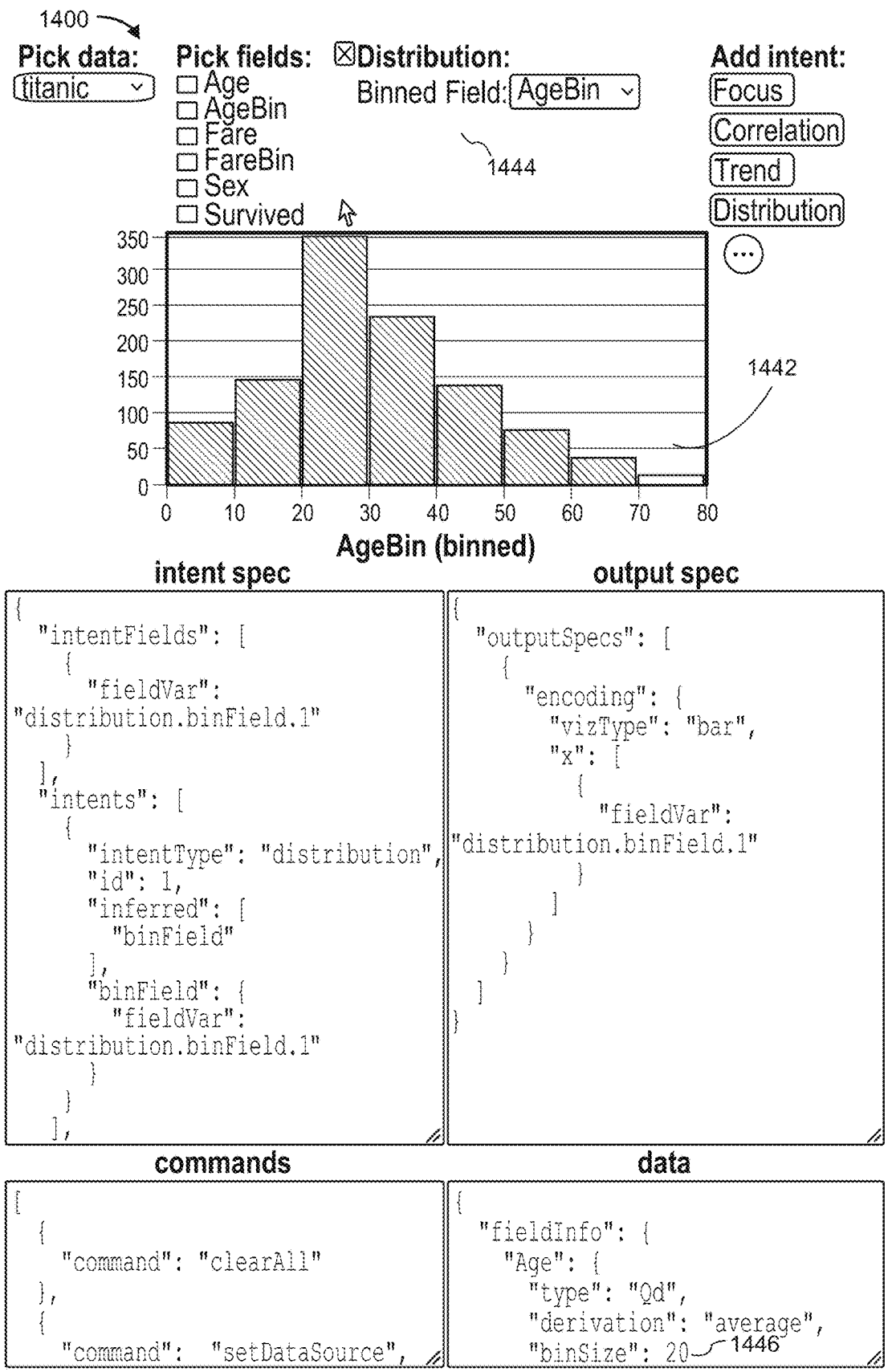

FIG. 14G illustrates user selection of the "Titanic" data source 1404-5 and user selection of the "Distribution" intent type 1408-4. FIG. 14H illustrates in response to the user selection, the visual analytics intent system 230 automatically infers the data field "age" in the data source 1404-5 as the binned field 1444 (e.g., grouping field property or [bin-field]), and displays a histogram 1442. In some implementations, the visual analytics intent system 230 also picks a bin size 1446 (e.g., bin interval or [bin-count]) that is custom-defined for the dataset.

FIG. 14I illustrates user selection of a "Covid" data source 1404-4, corresponding to Covid-19 cases for California. FIG. 14I also illustrates user selection of a "Trend" intent type 1408-3.

Figure 14J:
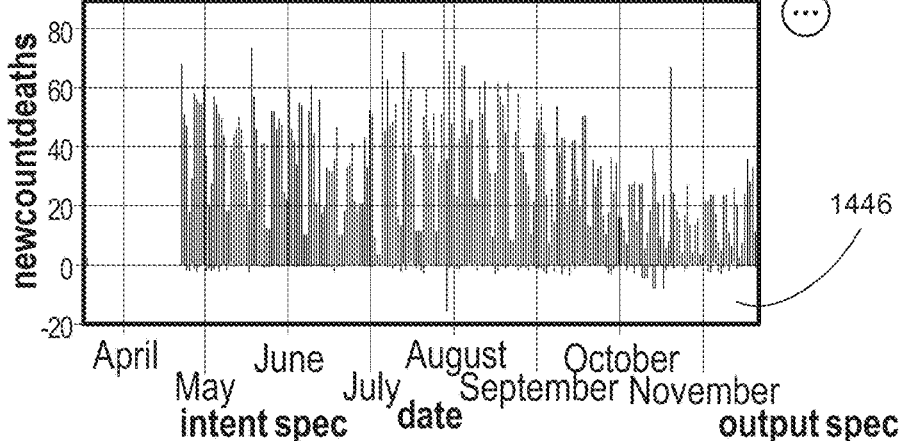

FIG. 14J illustrates in response to the user selection, the graphical user interface 1400 displays a time series 1446 showing a count of new Covid deaths over time (e.g., by date). As described in FIG. 6, the trend intent includes a measure data field property and a time field property. Here, the visual analytics intent system 230 infers the measure field "new counts of death" as the measure data field property and infers the field "date" as the time field property.

B. Slackbot application

In accordance with some implementations of the present disclosure, VAIL can support natural language intent in a Slack application (e.g., client application 224 or a chat application).

Figure 15:
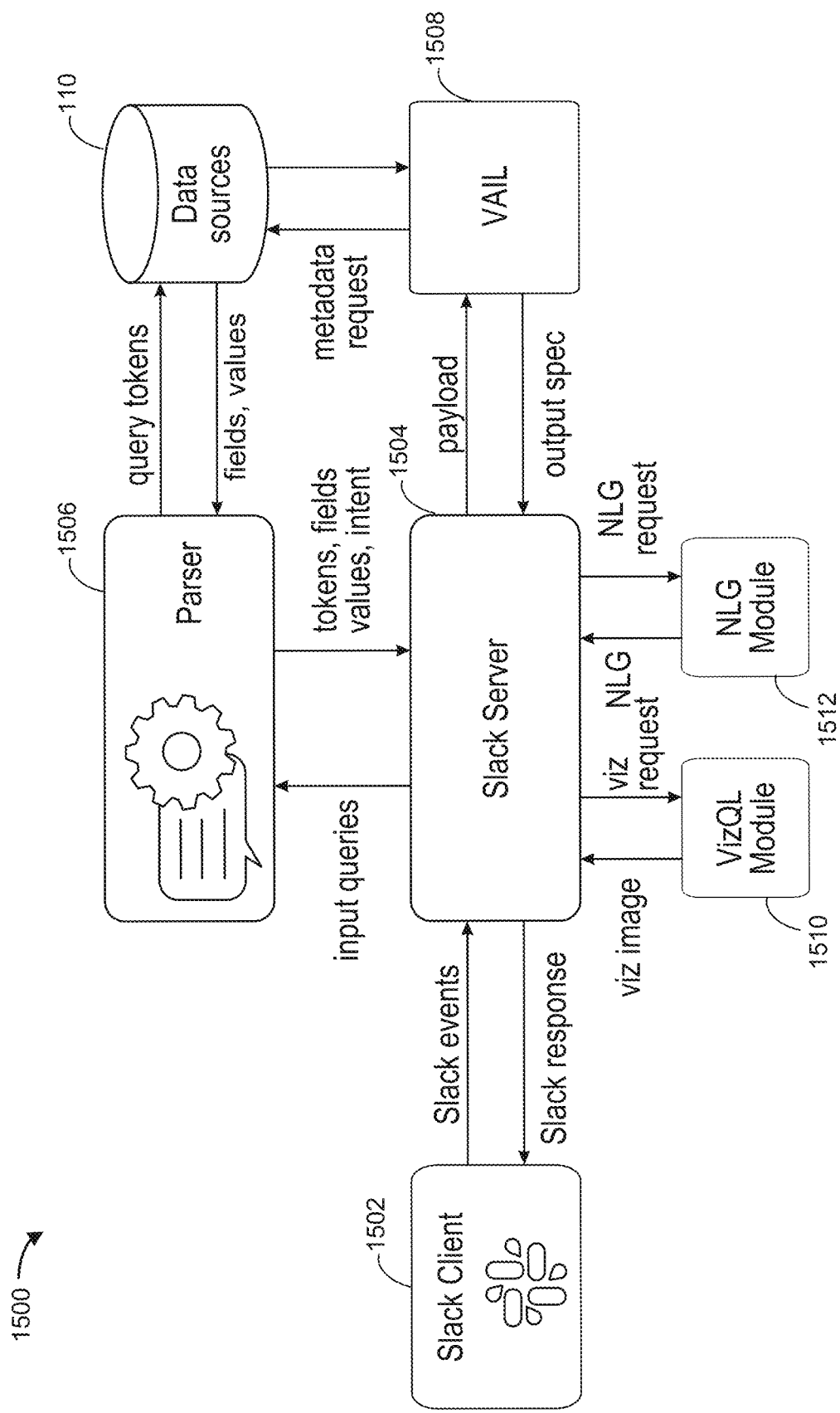
FIG. 15 provides a system overview 1500 of a Slackbot application that uses VAIL, in accordance with some implementations.

FIG. 15 illustrates a system overview 1500 of a Slackbot application that uses VAIL, in accordance with some implementations.

The Slack application comprises a Slack chatbot, which employs a node.js client-server architecture. In some implementations, and as illustrated in FIG. 15, the Slack chatbot comprises the following components:

Slack client 1502. In some implementations, the Slack client 1502 listens to user interaction events in the Slack interface and message events from the Slack Server. In some implementations, the Slack client 1502 includes a user interface that also displays native interactive widgets for surfacing ambiguity, as illustrated in FIG. 16.

Slack Server 1504. In some implementations, the Slack server 1504 is the main application-specific server that bridges between the Slack client 1502 and the other components of the Slack application. The Slack server 1504 translates input client events (e.g. slack messages) into appropriate API requests, and similarly translates API responses into the correct format of responses to send to the client.

Parser 1506 (e.g., parser 226, FIG. 2). In some implementations, the parser 1506 parses natural language input queries into tokens based on a context free grammar (e.g., as implemented in Eviza). These tokens are resolved as data attributes and values (with information from the data source), or intent lexicons such as 'trend' or 'best.'

VAIL engine 1508 (e.g., visual analytics intent system 230). VAIL 1508 handles intent handling and infers underspecified or ambiguous information. The server passes the parsed tokens to VAIL, which in turn generates one or more intent specifications and one or more output specifications, as discussed with respect to FIGS. 1, 2, and 4-13.

VizQL Module 1510. The VizQL Module 1510 generates images of data visualization results based on information such as chart type, intent strategy, data attributes, and values using Tableau's VizQL commands. In some implementations the VizQL module 1510 converts a data visualization into a format (e.g., jpg, tif, png, gif, bmp, pdf format etc.) that is compatible for display on the Slack client 1502.

Natural language generation (NLG) module 1512. The NLG module 1512 uses simple language templates for NLG with pre-defined text and placeholders to insert information from the Output Specification. The grammar rules from the Parser 1506 are further used to aid linguistic realization, FIGS. 16A-16G provide a series of screen shots for interactions with a Slack chatbot (e.g., Slackbot) in accordance with some implementations. In this example, a Slack chatbot uses VAIL to answer questions about a "Wines" dataset (e.g., data source 110).

Figure 16A:
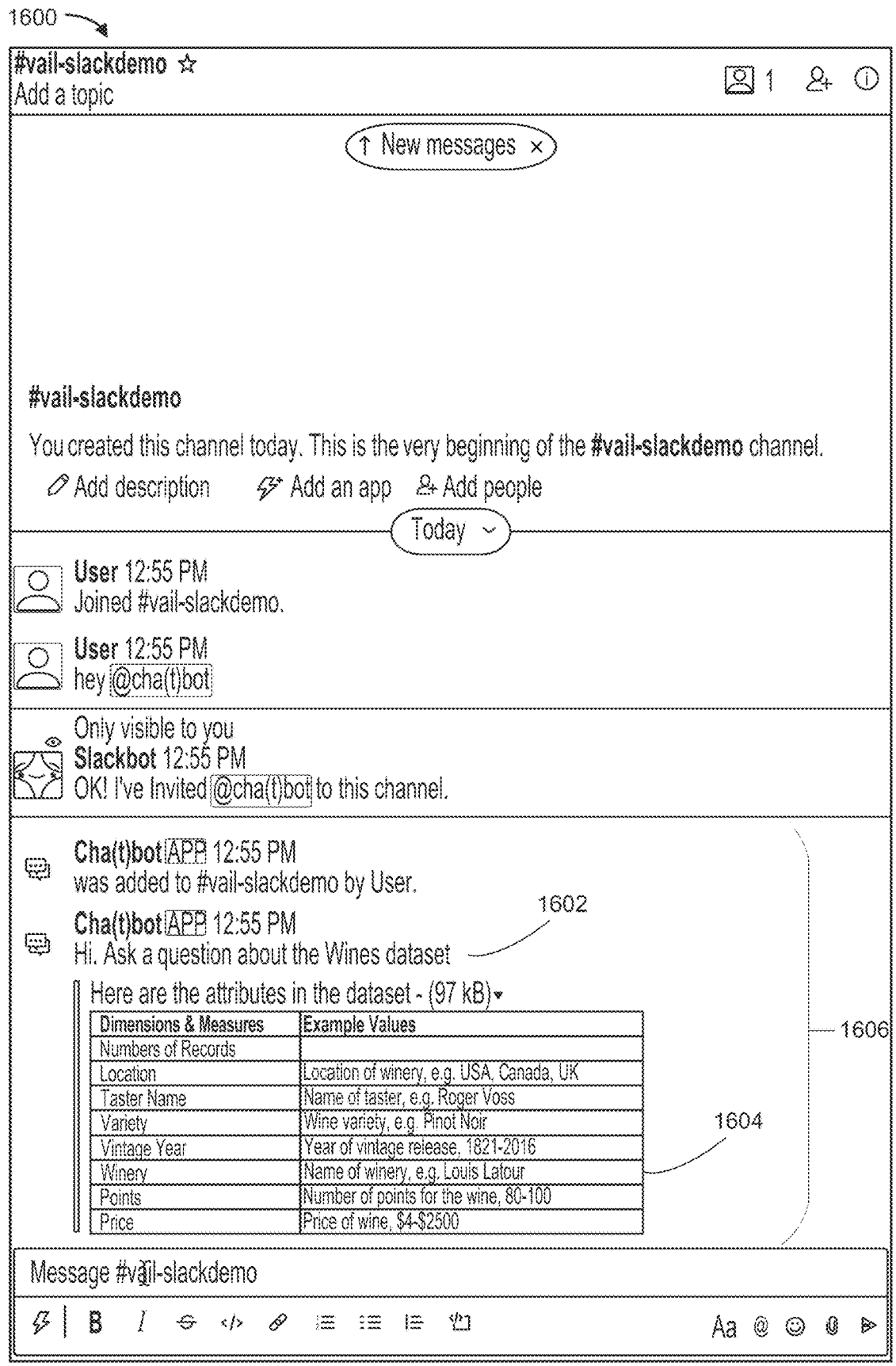

FIG. 16A illustrates an exemplary graphical user interface 1600 of a Slack application that is displayed on an electronic device 102.

In some implementations, in accordance with user identification (e.g., user specification or user selection) of the "Wines" data source, the Slack application generates and displays a message 1602 on the graphical user interface 1600 to invite the user to ask a question about the data source. In some implementations, the Slack application also displays a representation 1604 (e.g., an image file, such as a .png, .tiff, .bmp, or .jpg file) showing attributes of data fields in the data source. In the example of FIG. 16A, the user is interacting with the Slack application for the first time and thus the user selection of the "Wines" data source initiates a new conversation thread 1606.

Figure 16B:
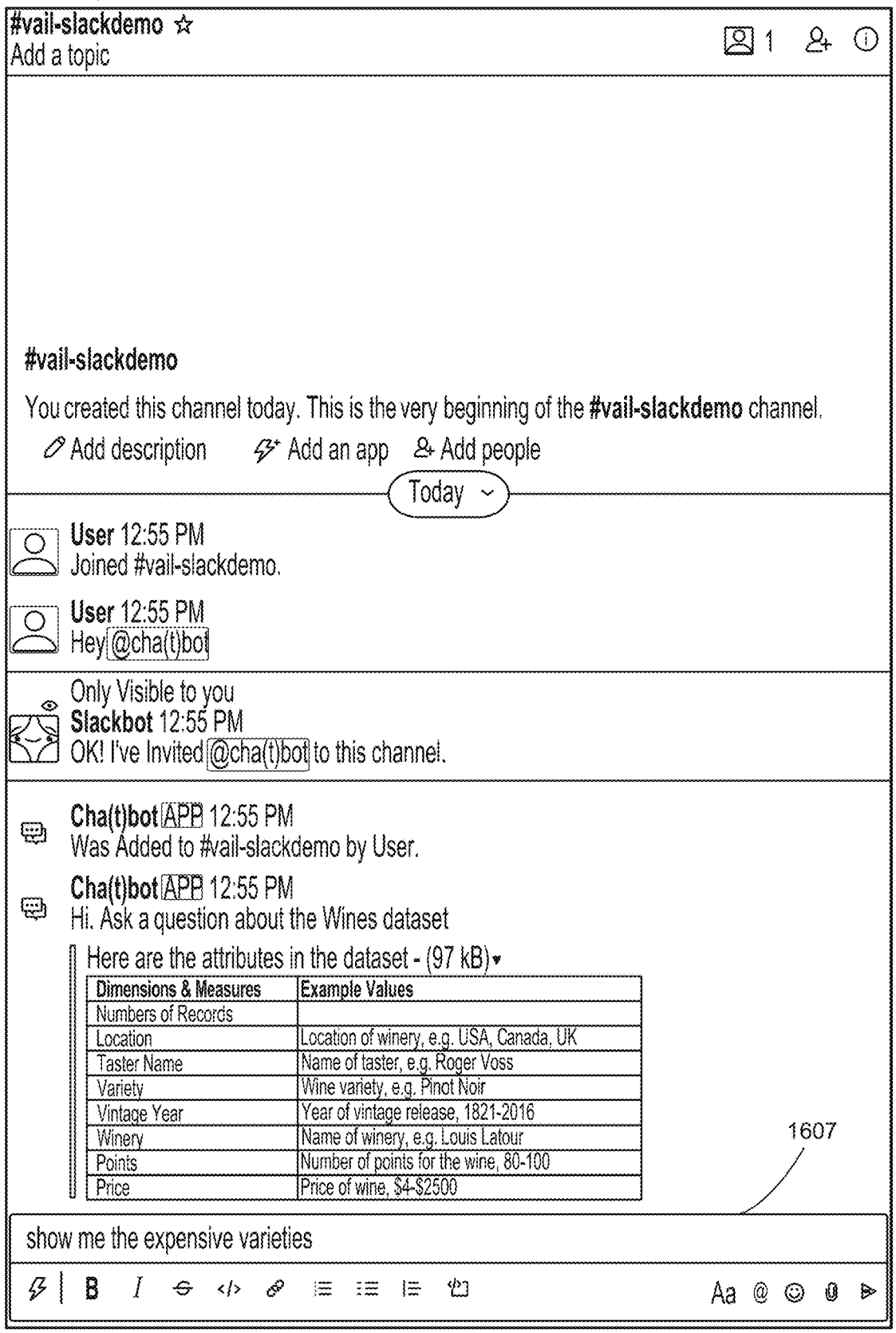

FIG. 16B illustrates a user interaction with the graphical user interface 1600 according to some implementations. In this example, the user interacts with the user interface 1600 by composing (e.g., typing) a message into an input box 1607 In some implementations, the user may also indirectly interact with the input box 1607 by speaking into a microphone of the electronic device 102 (e.g., audio input device(s) 212) to provide natural language commands. In the example of FIG. 16B, the user inputs a natural language command (e.g., a natural language expression) "show me the expensive varieties." Here, "expensive varieties" comprises an ambiguous intent because the user mentions "expensive" but does not define how many of the expensive varieties they are interested in.

In some implementations, in accordance with the user input, a Slack event with the command (e.g., query) is passed to the Slack server 1504. The Slack server 1504 recognizes the event to be that of a query type and passes the query to the parser 1506 for tokenization. In some implementations, in response to receiving the query, the parser 1506 remove stop words and lemmatization (e.g., "show" and "me") to return the tokens ['expensive', 'variety'] to the Slack server 1504. The Slack server 1504 then passes the tokenized parser output to the VAIL engine 1508 (e.g., visual analytics intent system 230). In this example, the VAIL engine 1508 infers that 'expensive' would resolve to variety sorted by a currency attribute price, with the strategy indicating to highlight the top three items. The VAIL engine 1508 then generates an intent specification 1608 that is illustrated in FIG. 16C. The VAIL engine 1508 also generates an output specification 1610 that is illustrated in FIG. 16D. In some implementations, after generating the output specification, the VAIL engine 1508 passes the output specification to the VizQL Module 1510 and NLG module 1512, which generate a visualization and a text response.

FIG. 16E illustrates an updated view of the user interface 1600 in response to the user input. In this example, the conversation thread 1606 has been updated to include a representation 1610 of the visualization (e.g., a bar graph with data bars arranged in a descending order) and a text response 1612 (e.g., "The Top 3 varieties are Cabernet Franc Merlot, Petite Verdot, and Bordeaux-style Red Blend. 'Expensive' is interpreted as an average price of $109 or greater.").

In some implementations, the Slack application applies a relevant template based on the output specification. In the example of FIG. 16, the relevant template is: "The [N] [modifier] [dimension] are [data-values]. [modifier] is interpreted as [filter-value]," corresponding to the text response "The 3 ("[N]") expensive ("[modifier]") varieties ("[dimension]") are Cabernet Franc Merlot ("[data-value1]"), Petite Verdot ("[data-value2]"), and Bordeaux-style Red Blend ("[data-value3]"). 'Expensive' ("[modifier]") is interpreted as an average Price of $109 and greater ("[filter-value ])."

As described in FIG. 16B, the phrase "expensive varieties" comprises an ambiguous intent because the user mentions "expensive" but does not define how many of the expensive varieties they are interested in. In this example, the VAIL engine 1508 infers a quantity "3" as the number of data values to highlight based on ranking of the data values (e.g., in a descending order). The representation 1610 in FIG. 16E shows that the top three data rows 1614 of the bar graph are displayed in a visually distinctive manner from other data rows 1616 of the bar graph (e.g., the top three data rows 1614 are highlighted whereas the other data rows are not). In some implementations, the inferred information (e.g., "Top N") is displayed as a data widget 1618 that the user can interact with to refine and update the response.

As an example, suppose the user selects the data widget 1618 in FIG. 16E to change the filter from "Top 3" to "Top 5." In some implementations, in response (2042) to the user selection, VAIL edits the respective intent specification by changing the [quantity] property from the inferred value "3" to the user-specified value "5." VAIL updates the respective output specification in accordance with the respective edited intent specification. The client application 224 generates (2048) and visually renders updated data analytics in accordance with the respective output specification. For example, the user interface 1600 can display an updated image of a bar graph in which the top 5 data bars are highlighted.

FIG. 16F illustrates another user interaction with the user interface 1600 according to some implementations. In this example, the user interacts with the user interface 1600 by typing a message (e.g., "What about the best wines") into the input box 1607. In this example, the term "best" is ambiguous because "best" can be defined in terms of, for example, the number of wines sold, the highest average customer review score, or the amount of revenue generated. The term "wines" is also ambiguous because it can mean a type of wine, such as Chardonnay or Cabernet, or a winery.

Figure 16G:
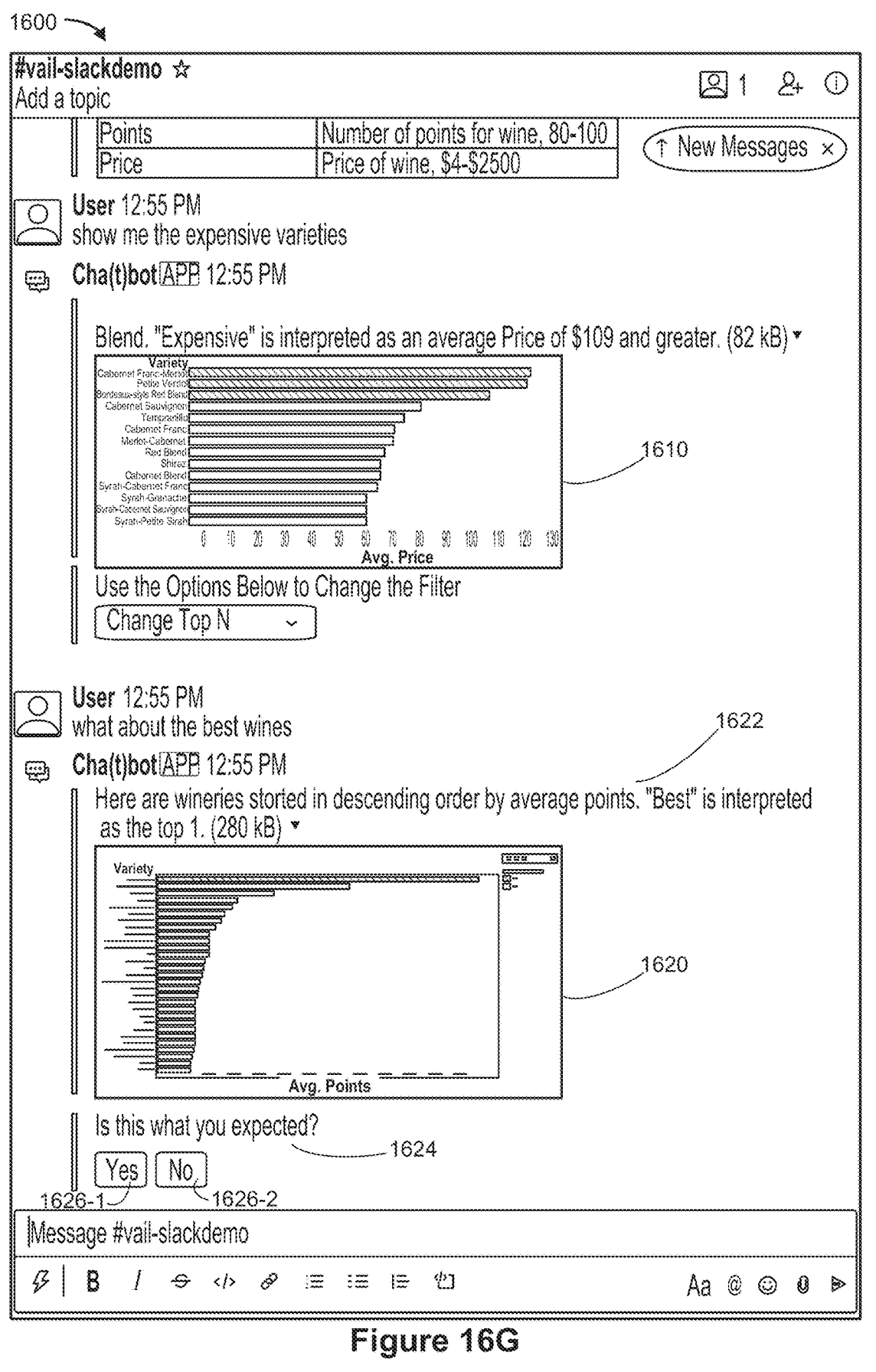

FIG. 16G illustrates an updated view of the user interface 1600 in response to the user input. In this example, the user interface 1600 displays a representation 1620 of a visualization (e.g., a bar graph with data bars arranged in a descending order) and a text response 1622 (e.g., "Here are wineries sorted in descending order by average points. 'Best' is interpreted as the top 1."). In this example, the response 1622 includes a description of the representation 1620 and a description of how an ambiguous term (e.g., "Best") has been interpreted. In some implementations, the user interface 1600 can display a follow-up question 1624 (e.g., "Is this what you expected?") that includes user-selectable feedback buttons 1626 (e.g., interface elements 1626. In some implementations, user selection of one of the buttons 1626 can cause the Slack application to suggest related follow-up questions, thereby providing possibilities for potentially undiscovered analytical capabilities.

C. Voice-Enabled Smart Assistant Chatbot

In accordance with some implementations of the present disclosure, VAIL can be used with a voice assistant device running voice assistant application (e.g., a voice chatbot application). In some implementations, the voice assistant device includes a display screen. In some implementations, the voice assistant device does not include a display screen.

Figure 17A:
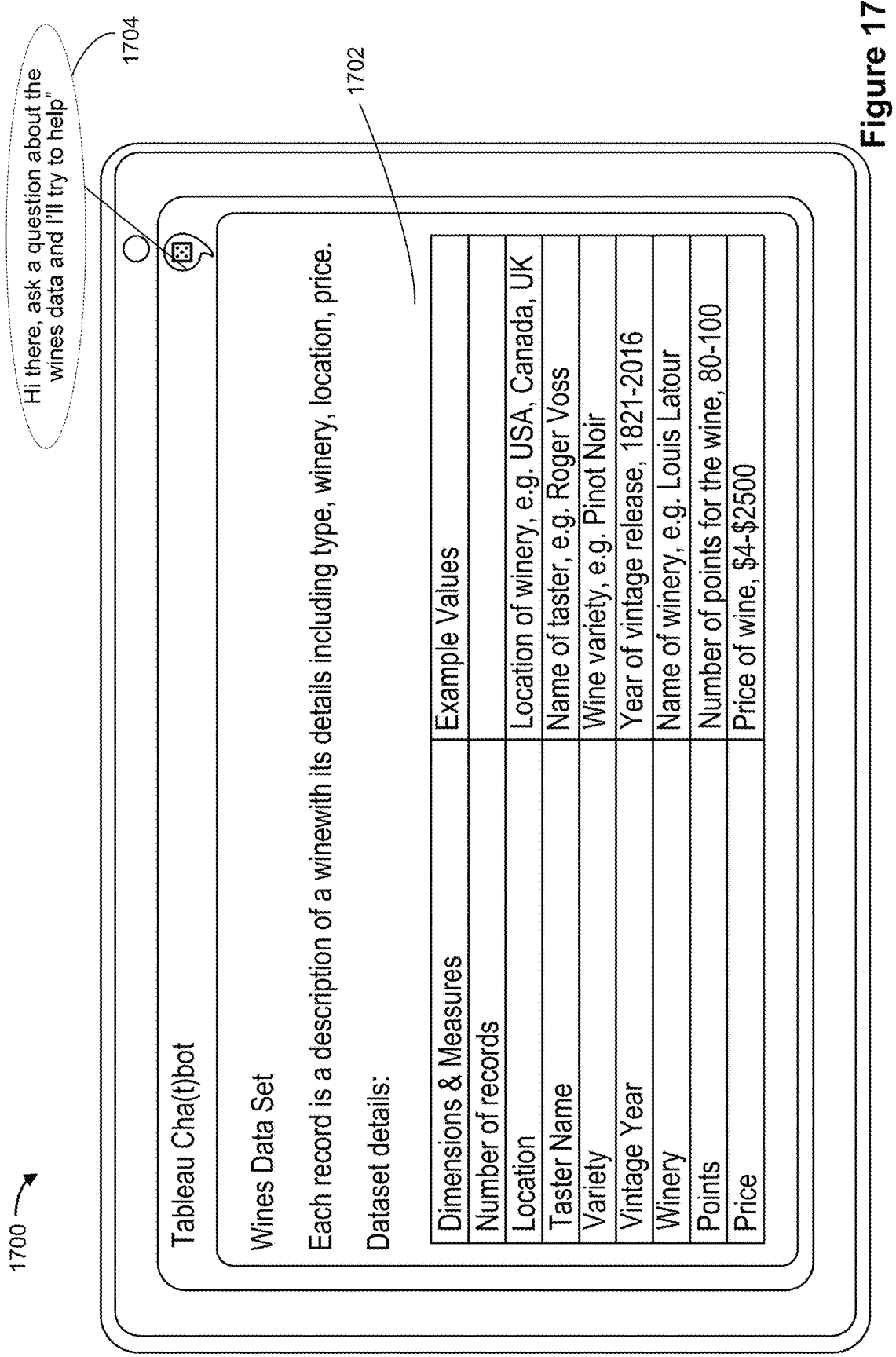
Figure 17B:
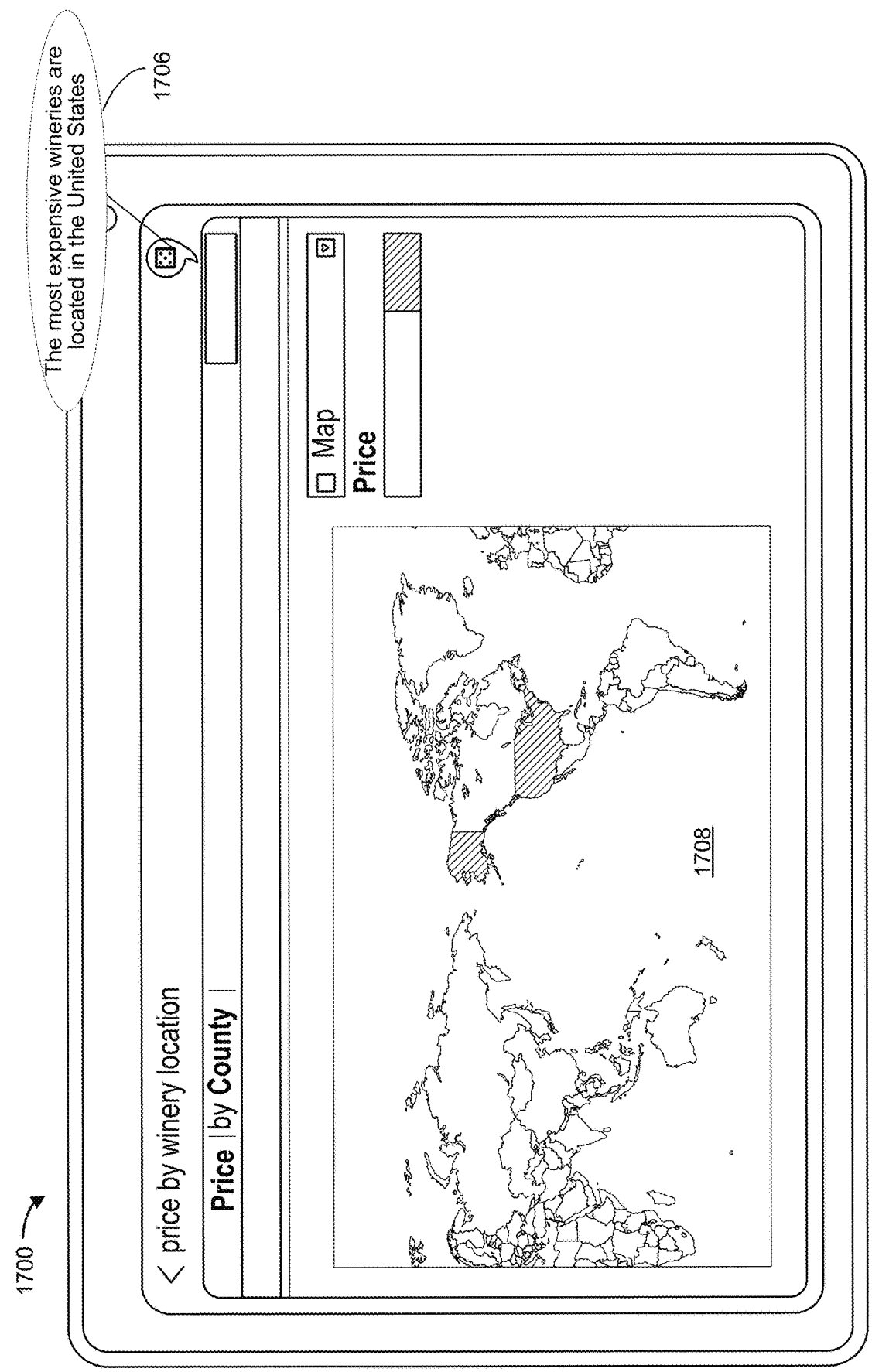
Figure 17C:
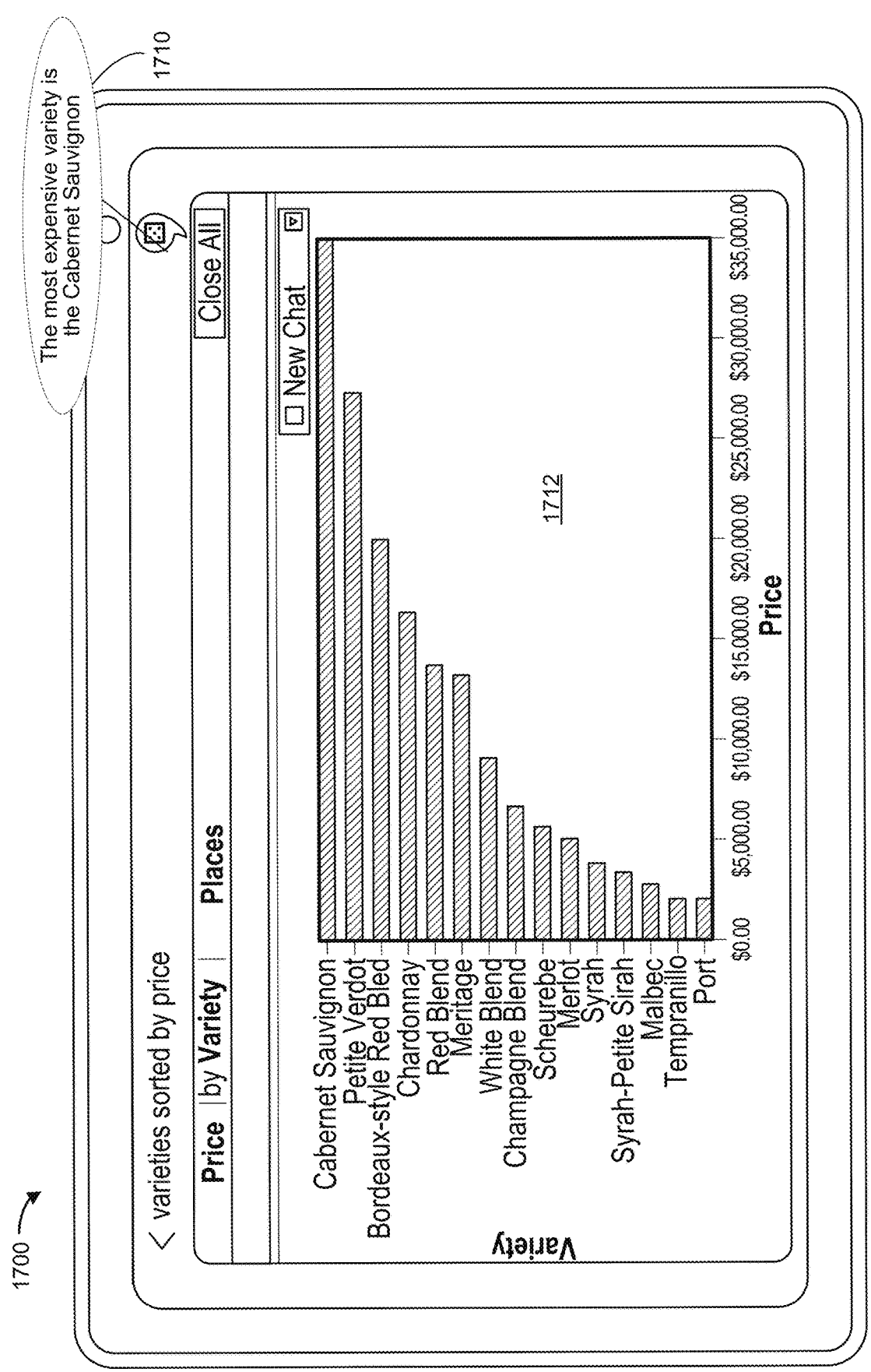
Figure 18A:
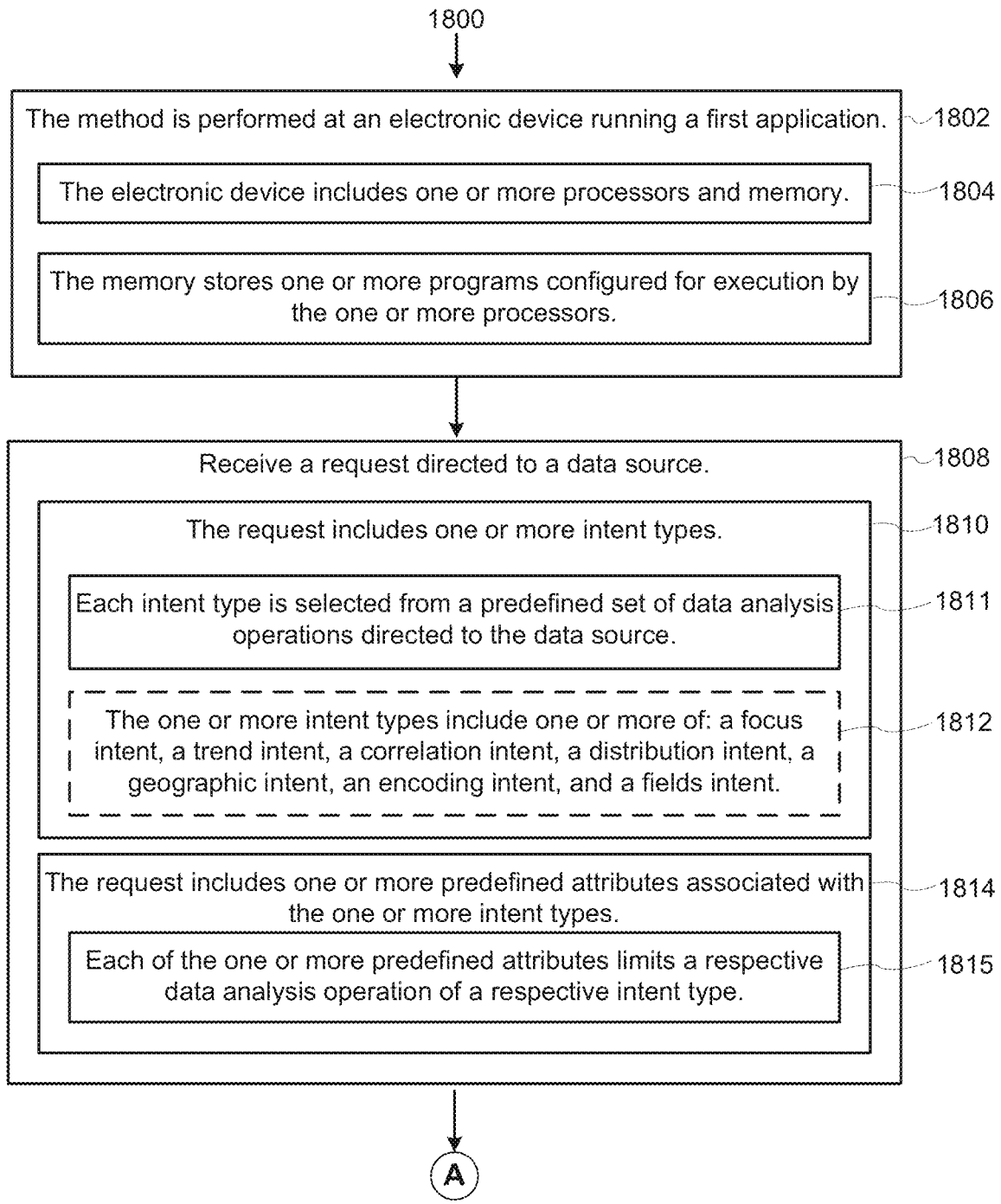
FIGS. 18A-18E provide a flowchart of a method performed at an electronic device according to some implementations.
Figure 18B:
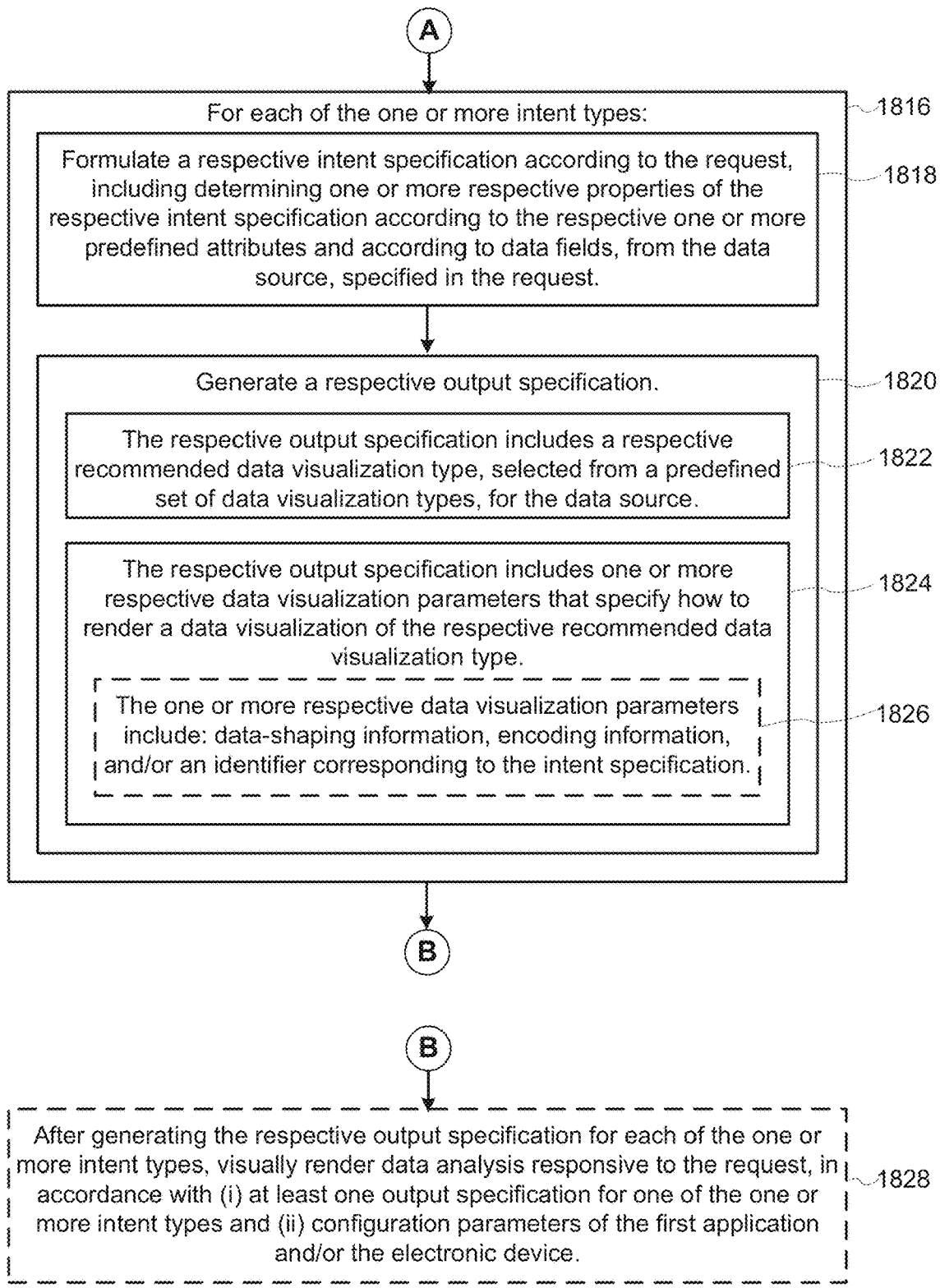
Figure 18C:
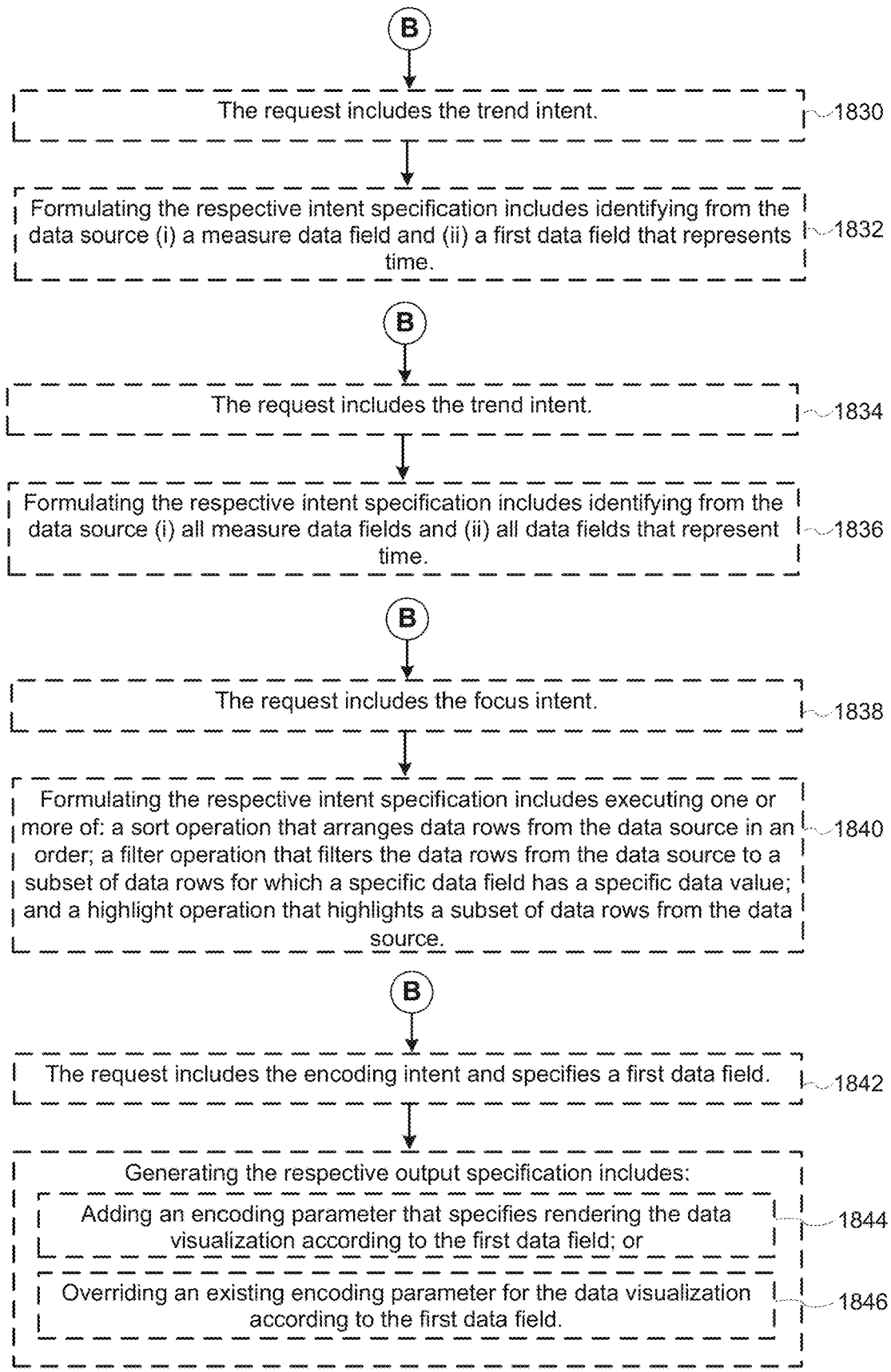
Figure 18D:
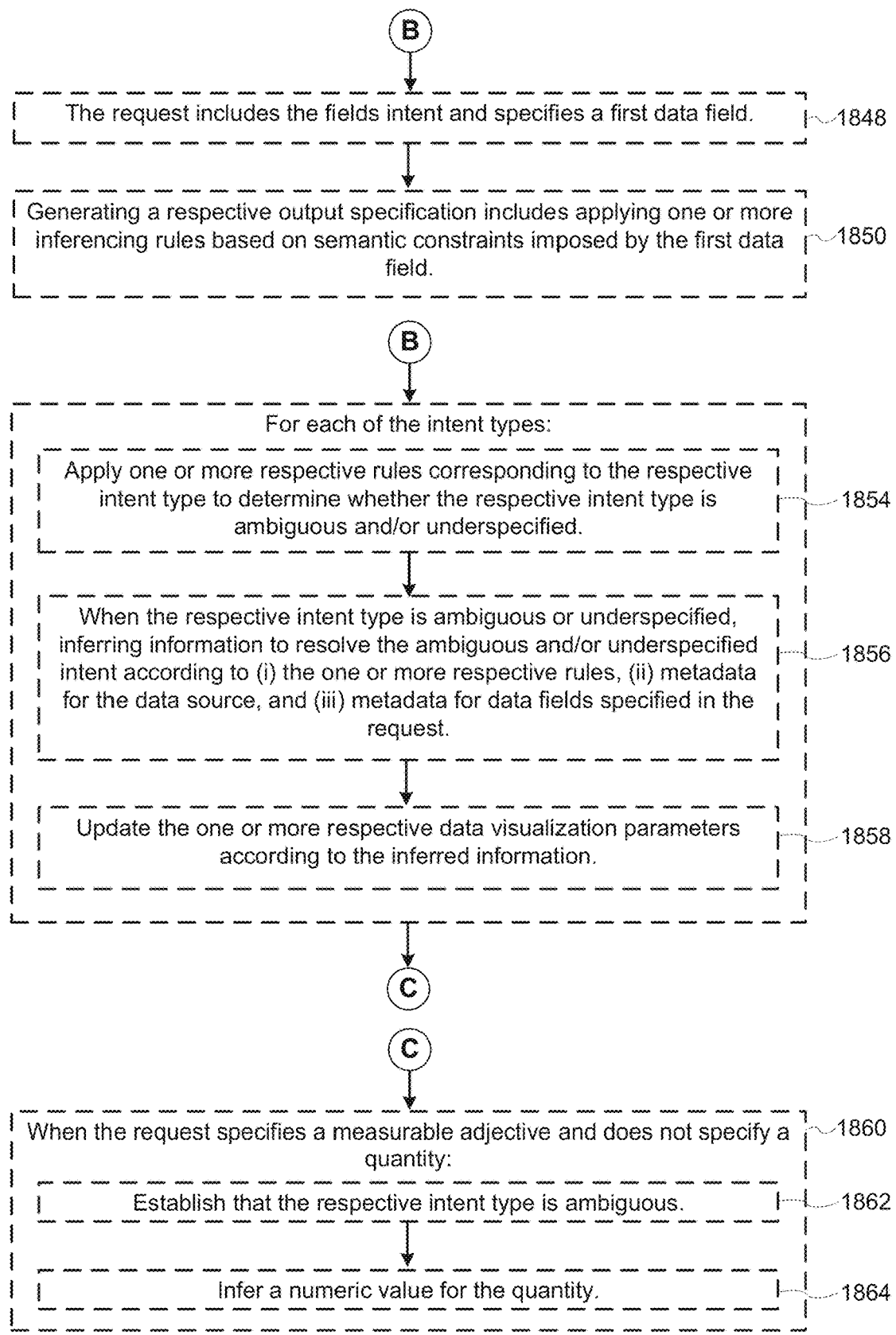
Figure 18E:
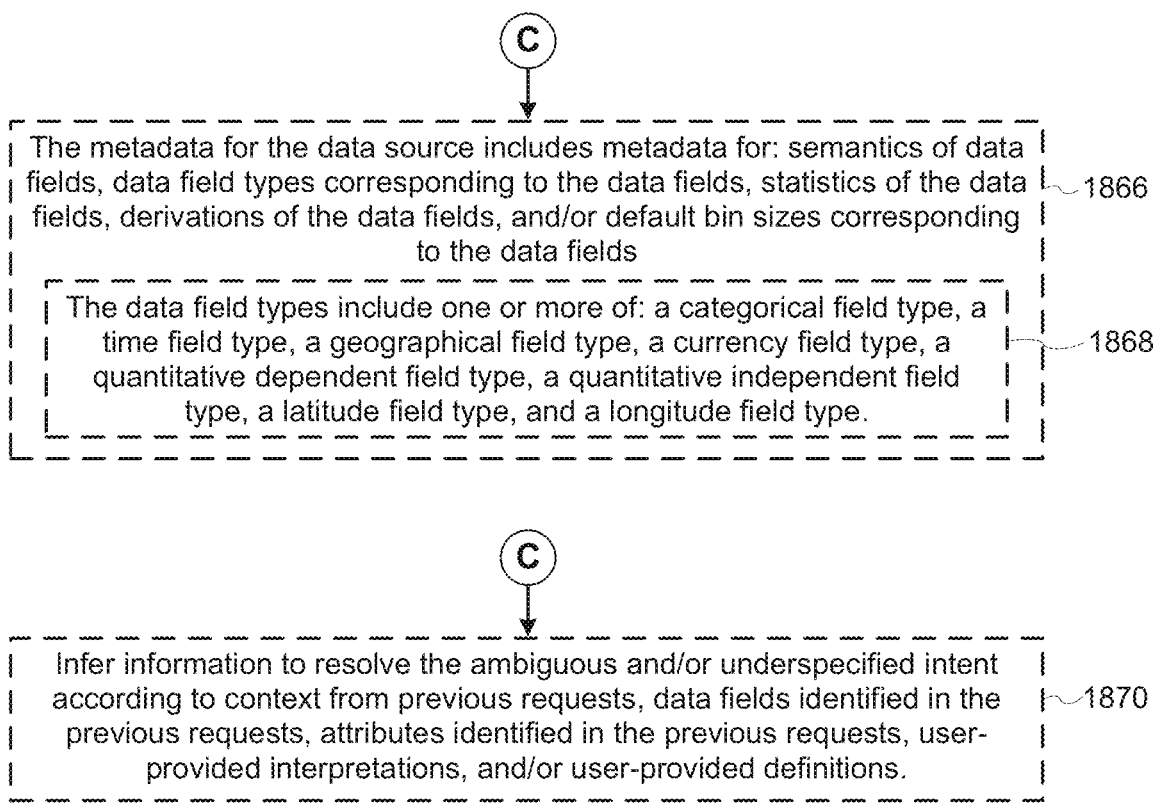
Figure 19A:
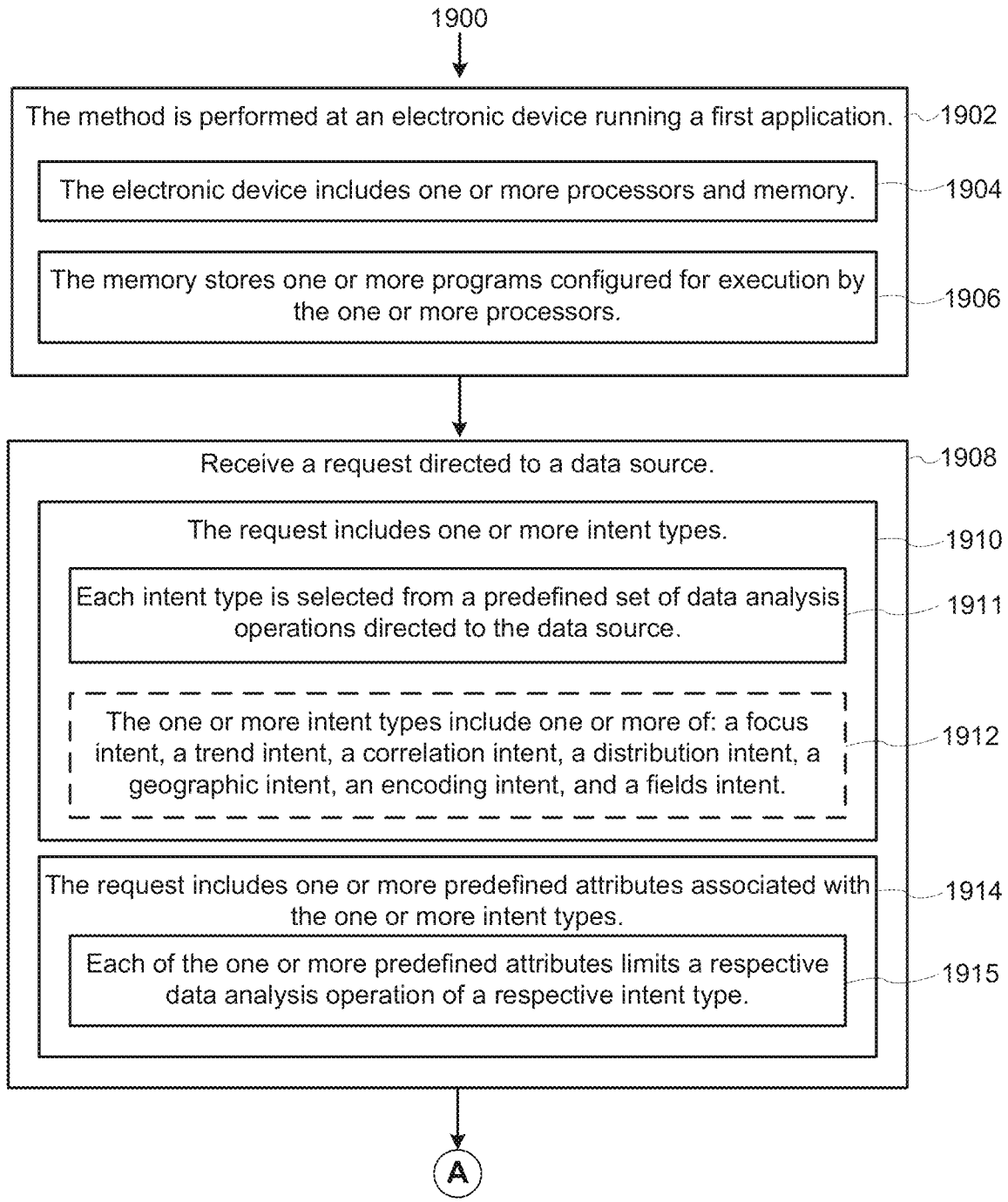
FIGS. 19A-19G provide a flowchart of a method performed at an electronic device according to some implementations.
Figure 19B:
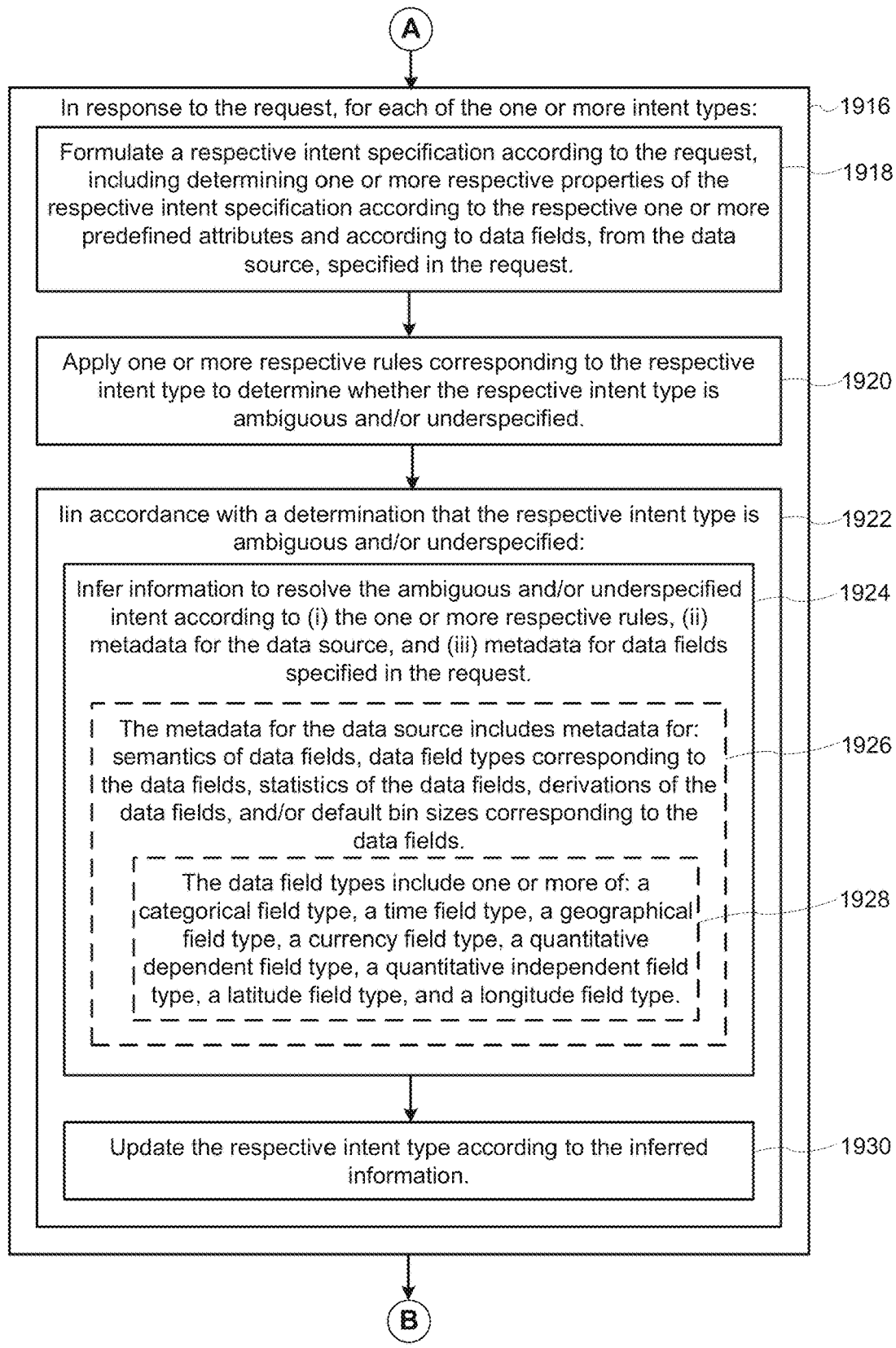
Figure 19C:
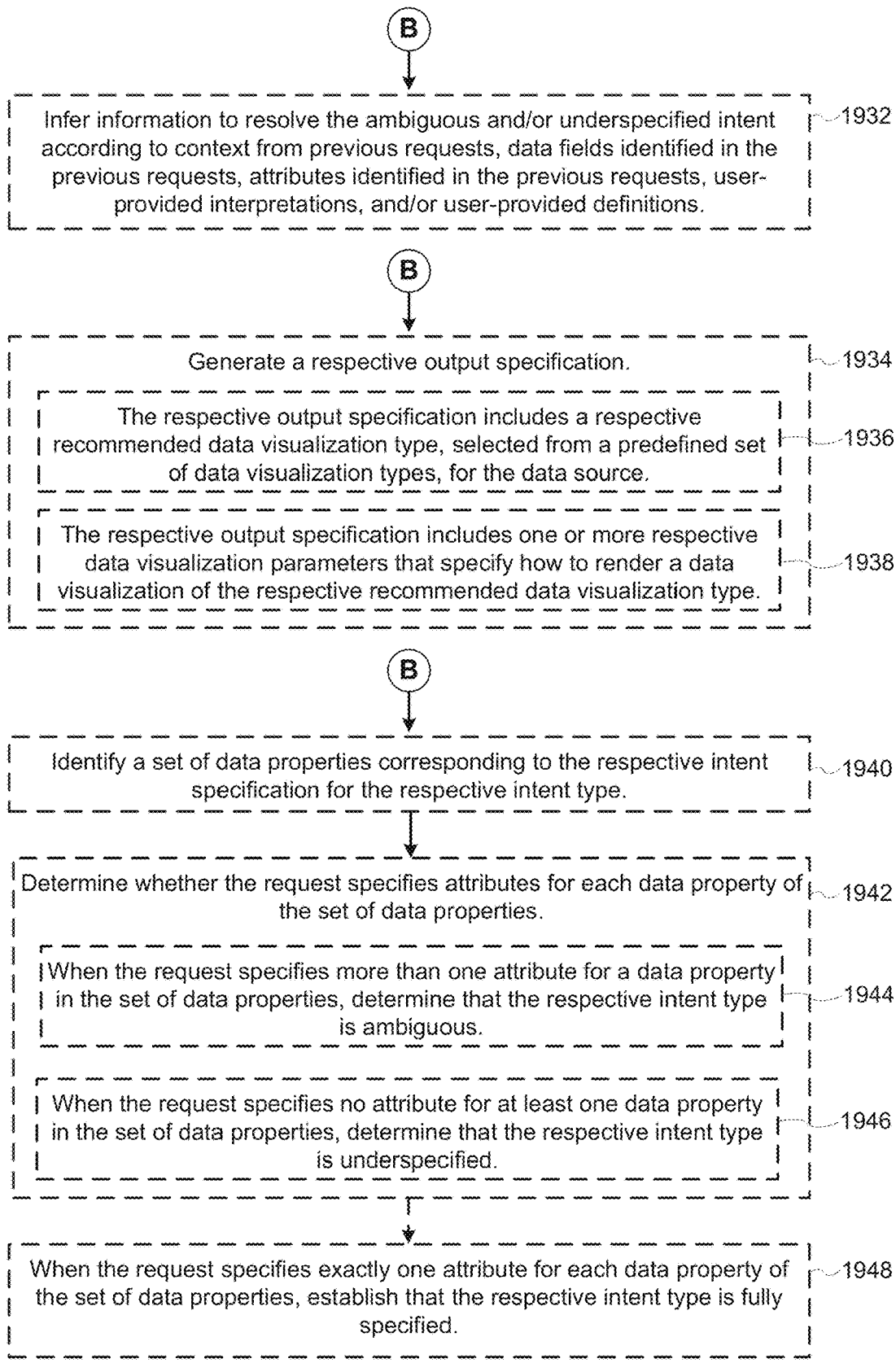
Figure 19D:
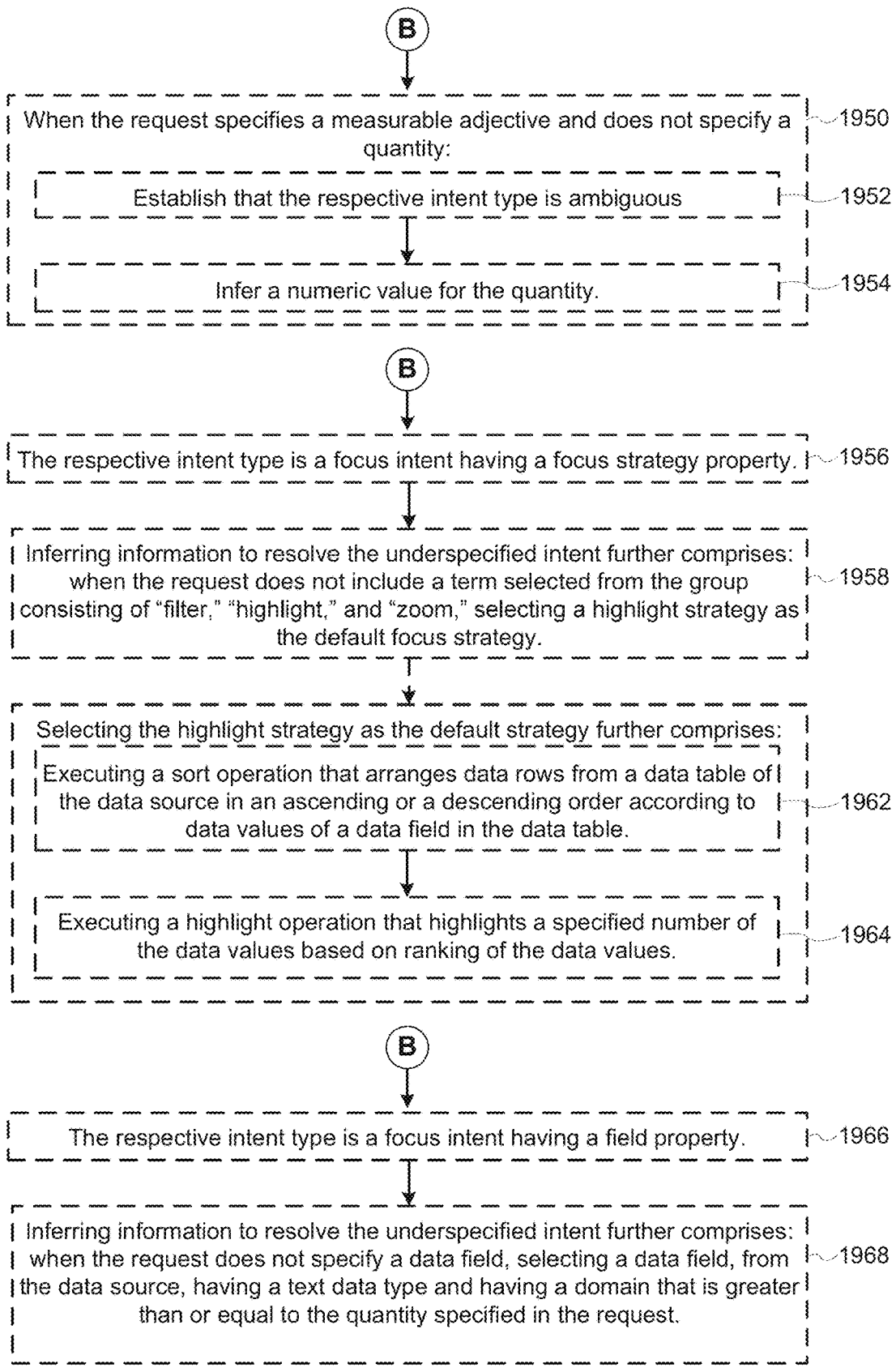
Figure 19E:
Figure 19F:
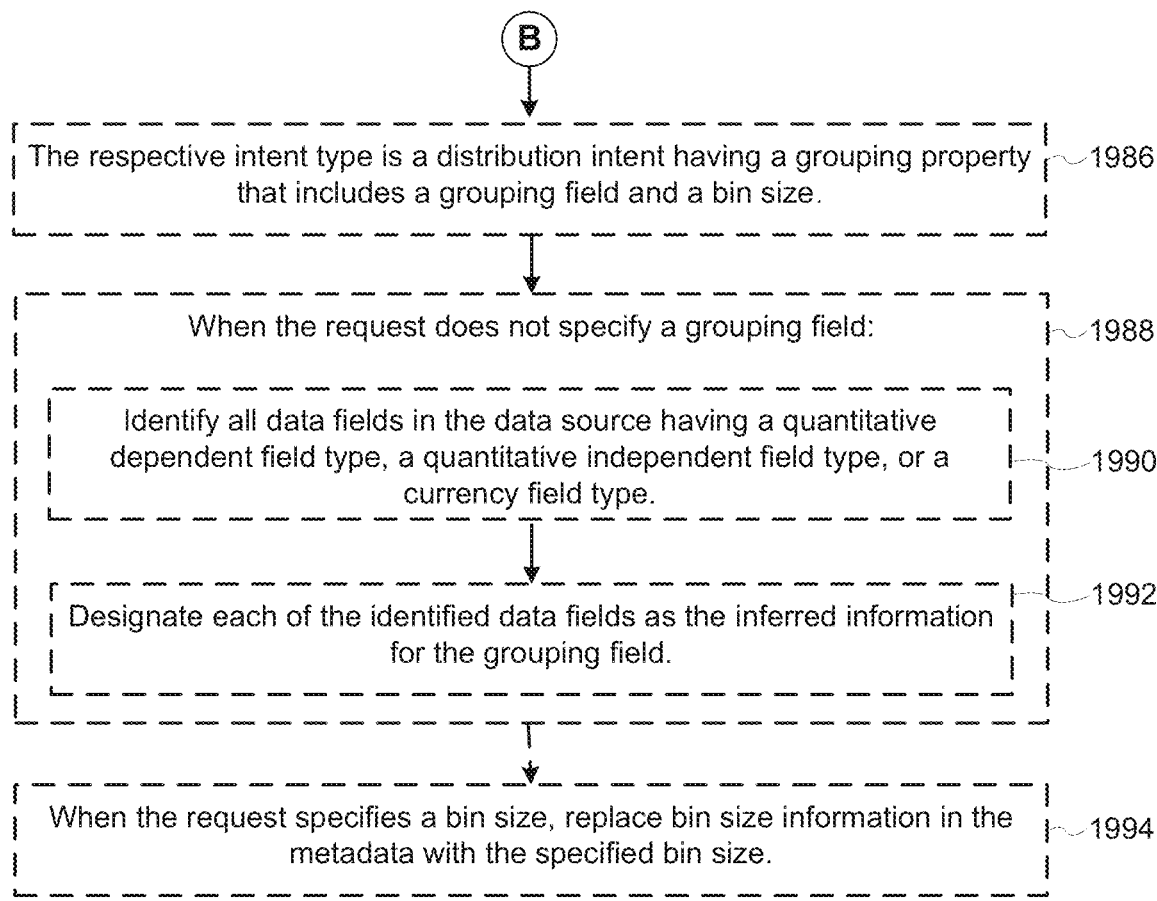
Figure 19G:
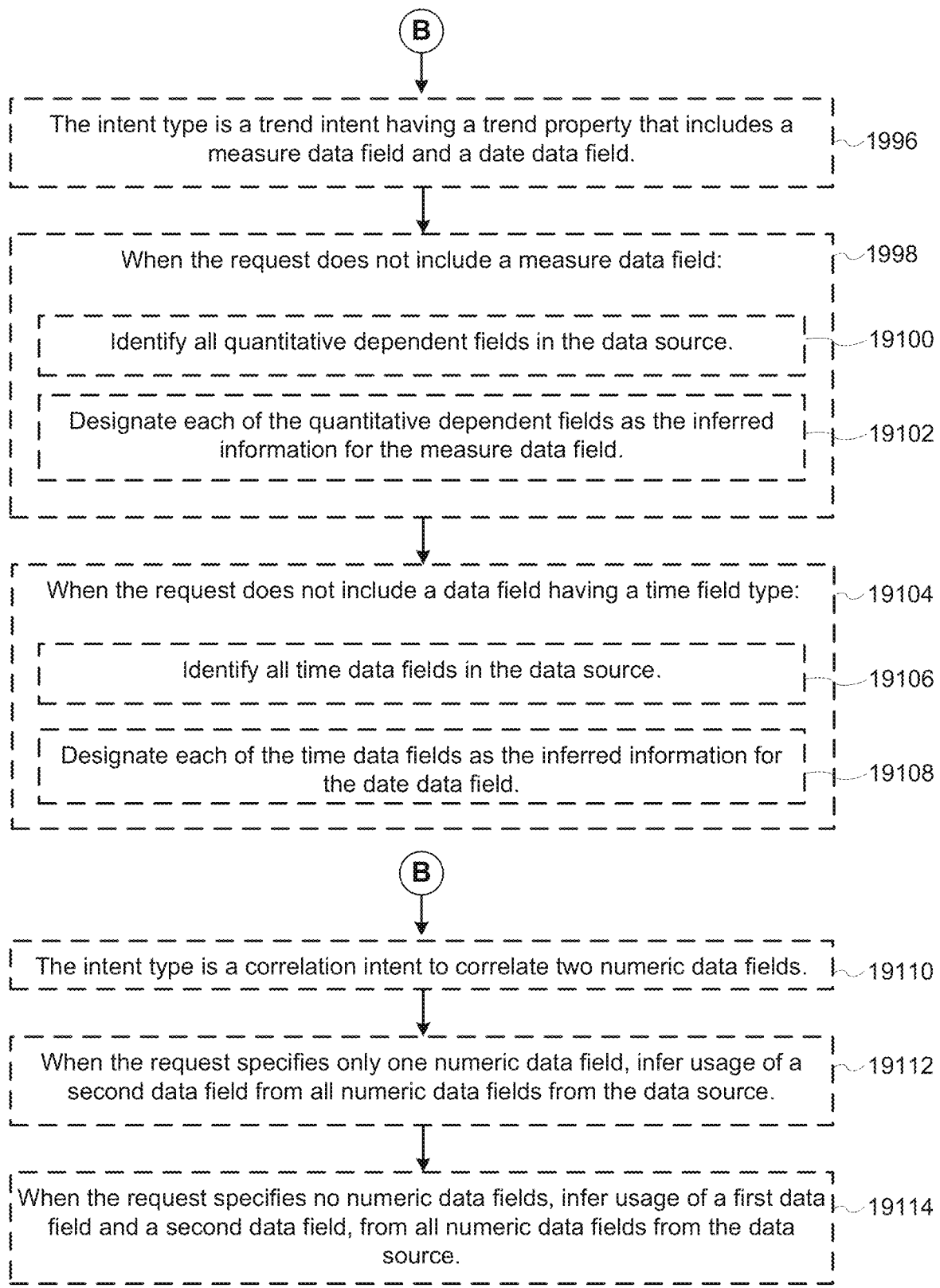
Figure 20A:
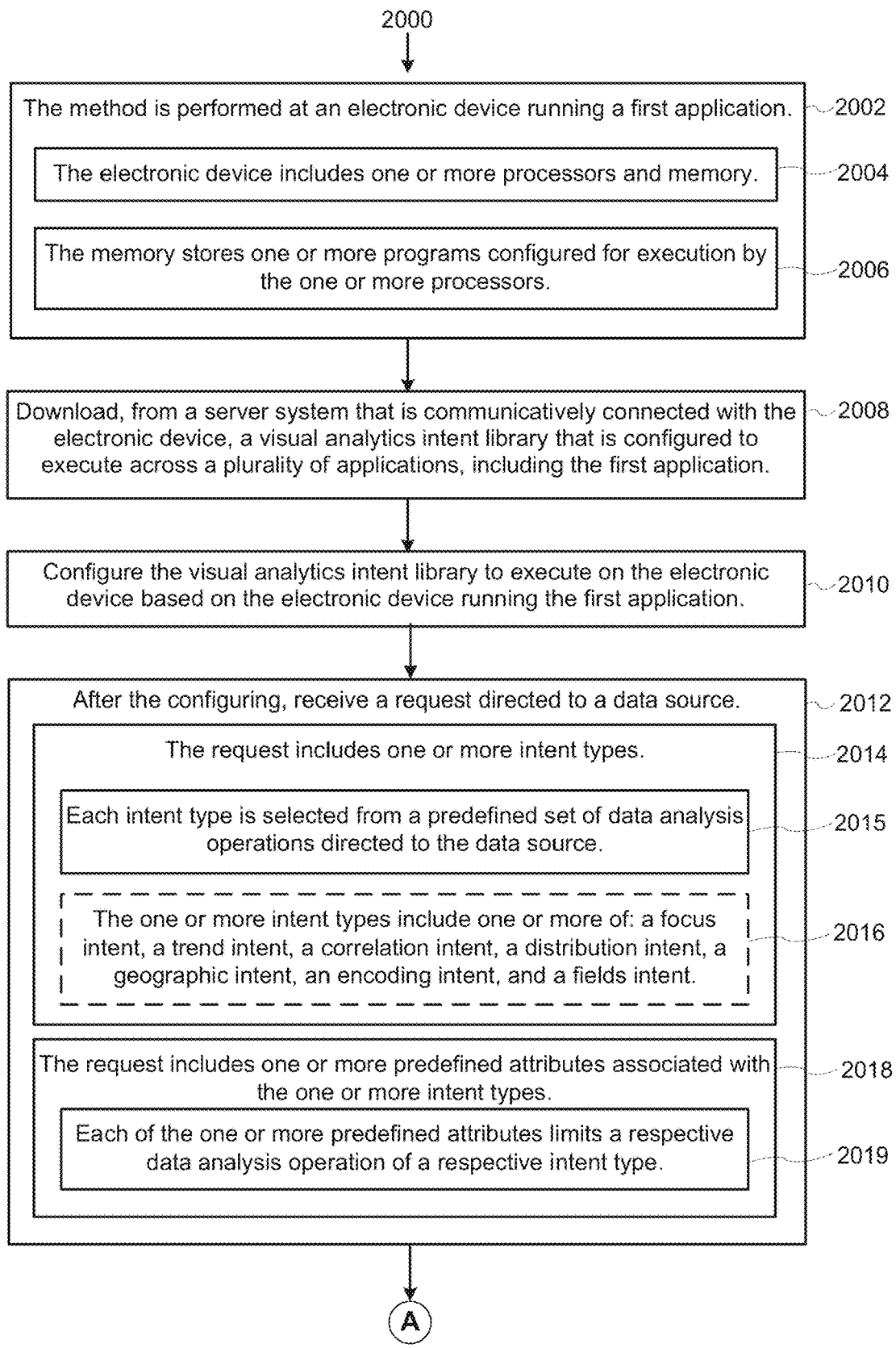
FIGS. 20A-20F provide a flowchart of a method performed at an electronic device according to some implementations.
Figure 20B:
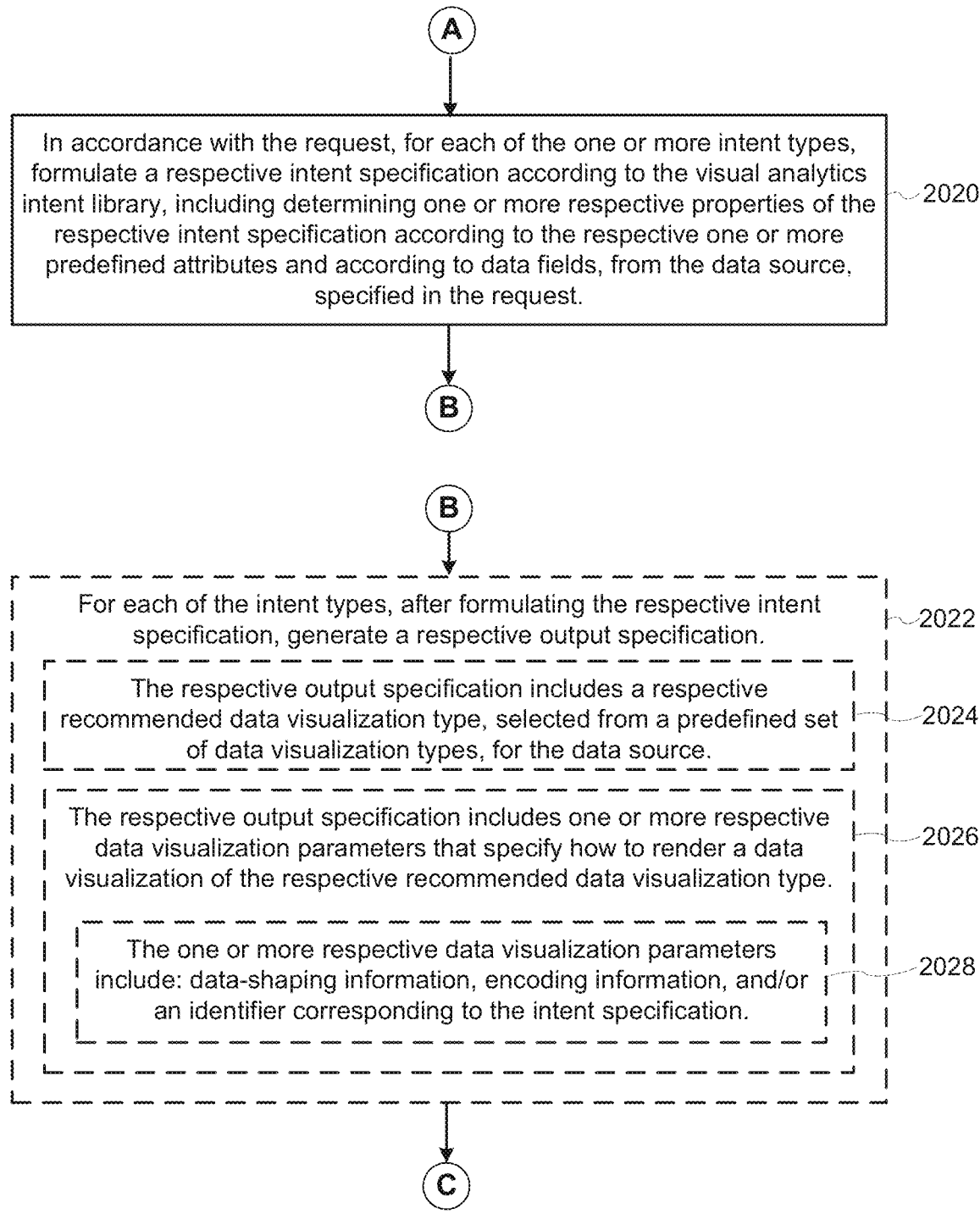
Figure 20C:
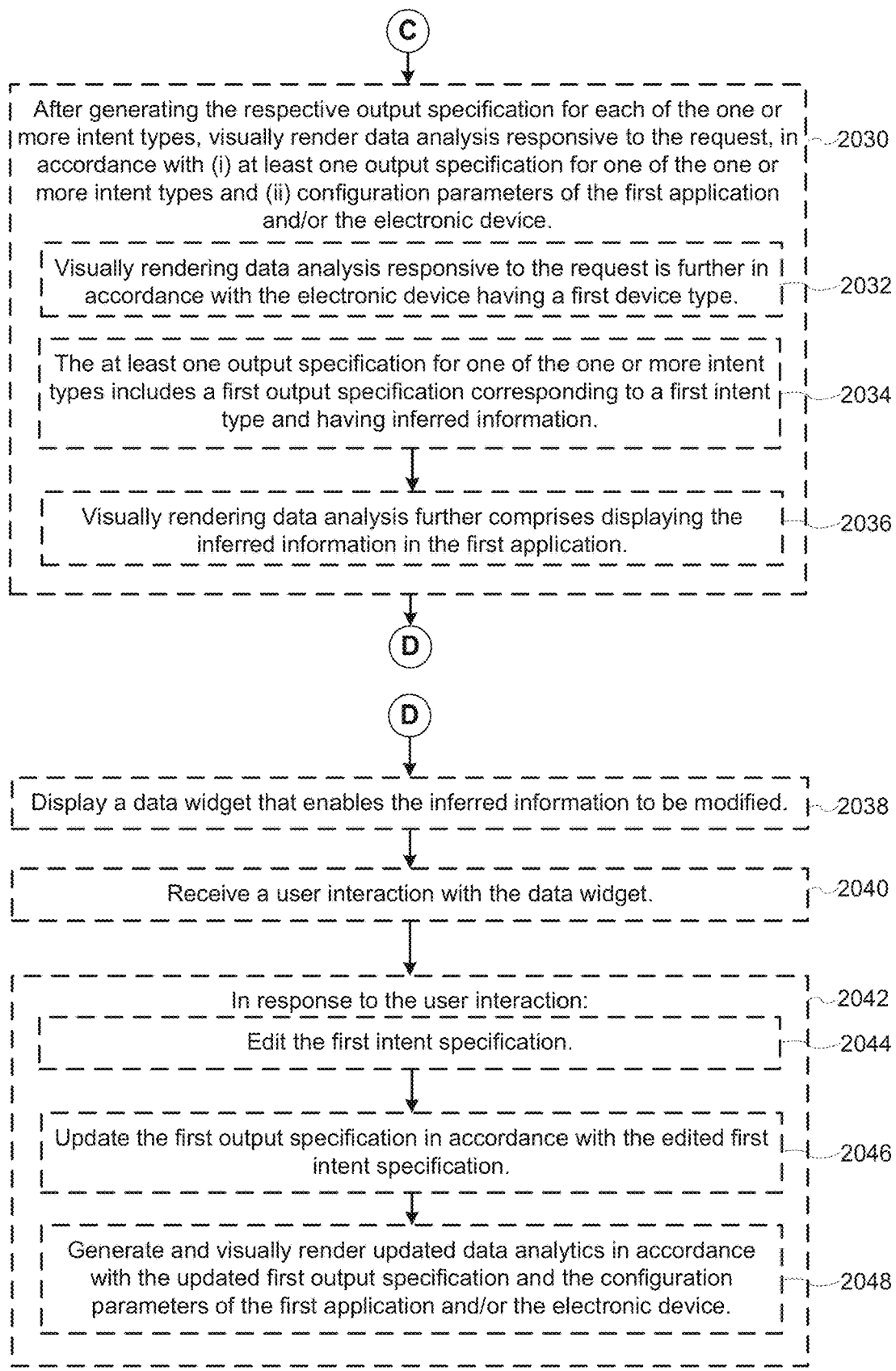
Figure 20D:
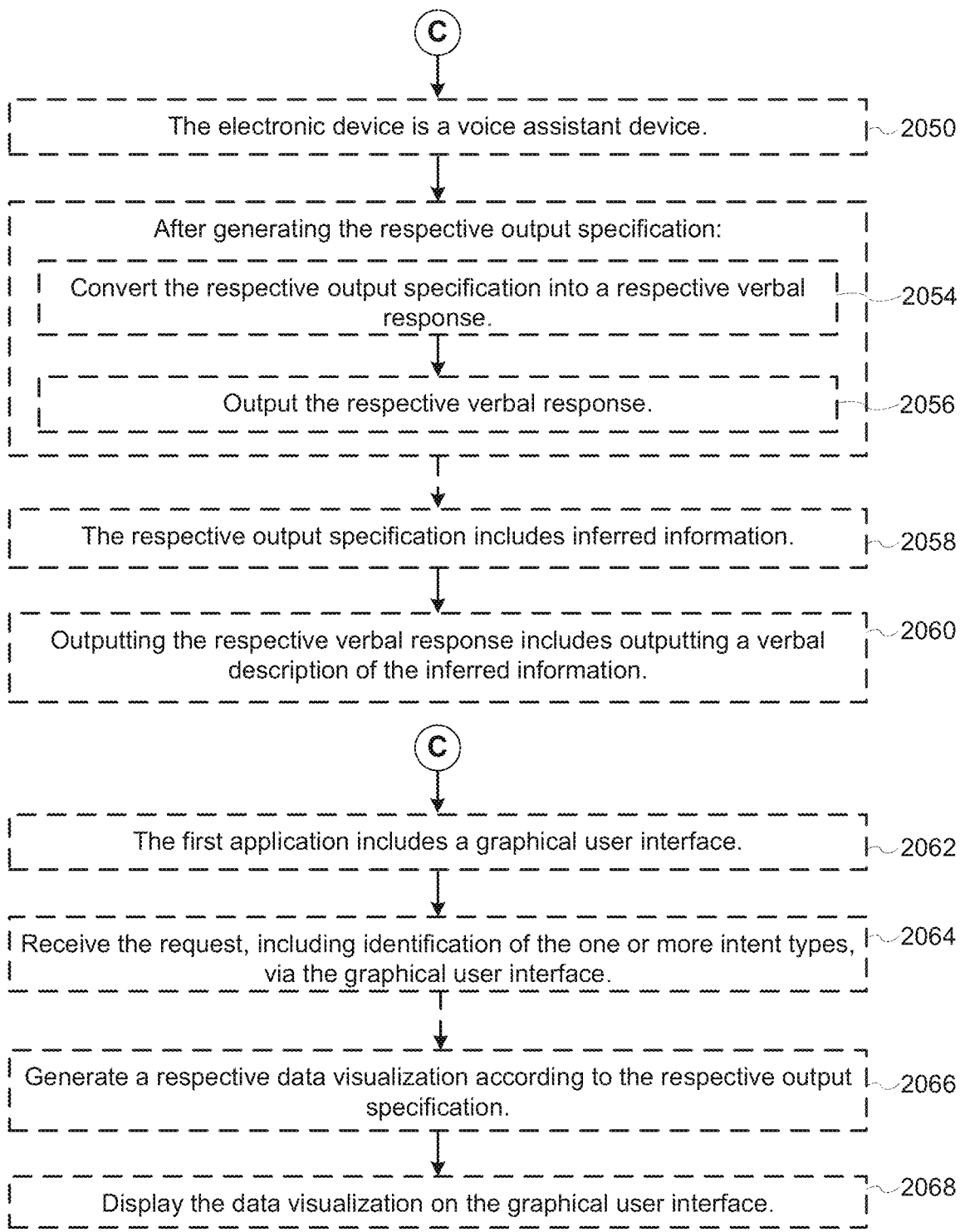
Figure 20E:
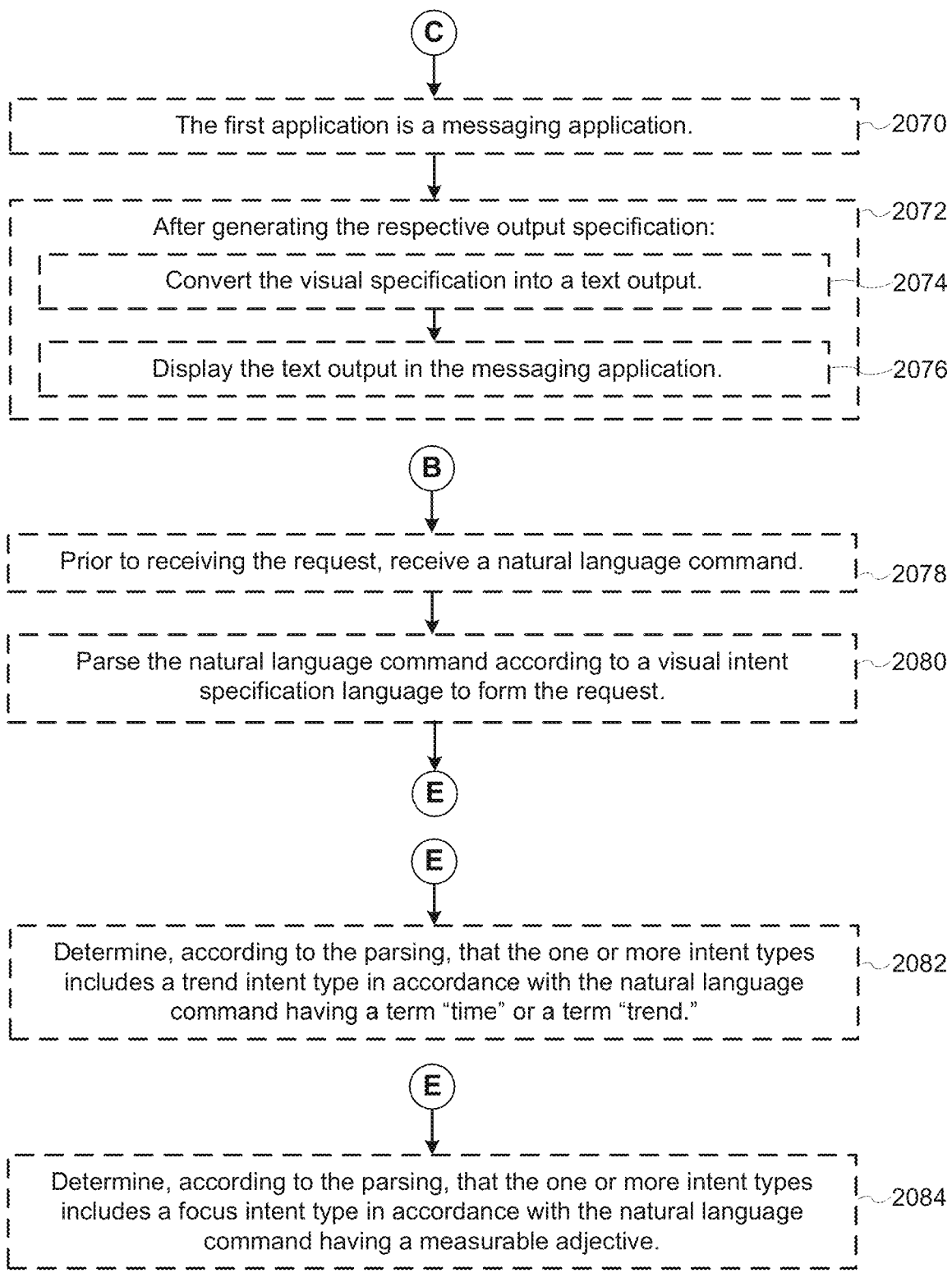
Figure 20F:
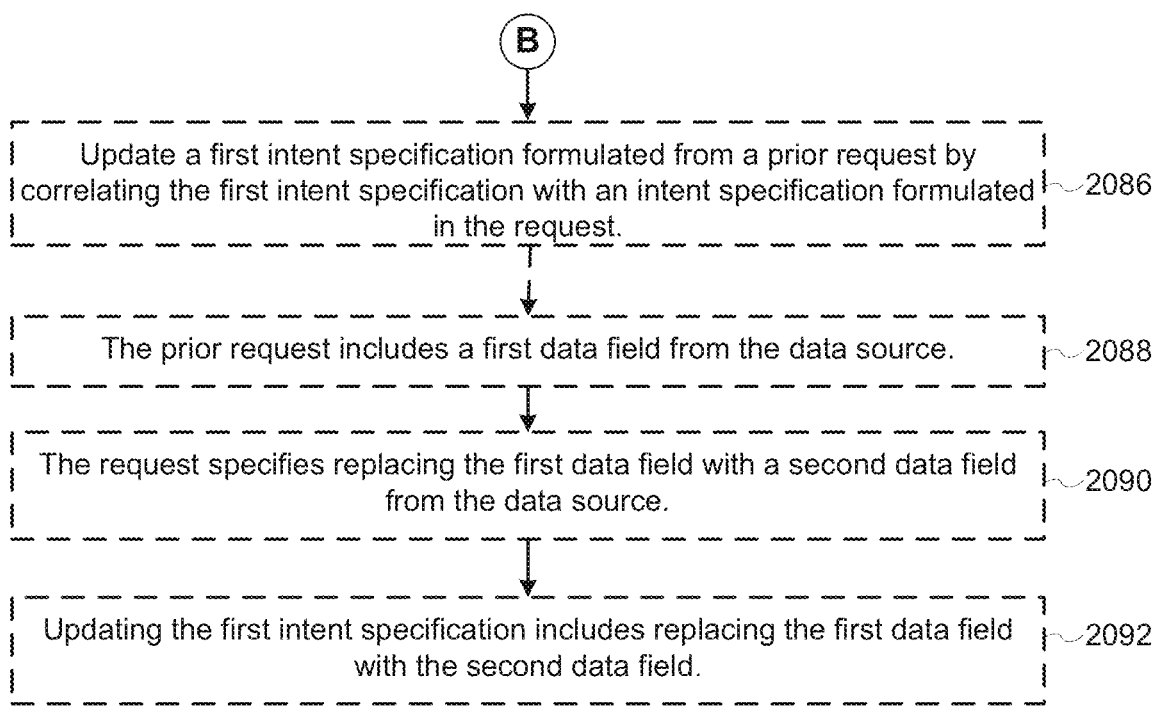

FIGS. 17A-17C provide a series of screen shots for interactions with a voice assistant device that includes a display screen 1700 according to some implementations. In this example, in response to user selection of a "Wines" dataset (e.g., verbally or via a touchscreen), the voice assistant device displays attributes 1702 of data fields in the dataset. FIG. 17A also illustrates the voice assistant device outputting a verbal response 1704 (e.g., via audio output device(s) 214) (e.g., "Hi there, ask a question about the wines data and I'll try to help.").

FIG. 17B illustrates a user interaction with the voice assistant device. In this example, the user provides a voice command "Show me the wines by location."

In some implementations, the voice assistant application is similar to the Slackbot application that is described in FIGS. 16A to 16G in terms of its implementation architecture. However, rather than using a bespoke parser and NLG module, the voice assistant application uses Alexa API for implementing conversational interactions in some implementations. The voice assistant application uses the output specification to determine the primary response and any follow-up responses, and ignores the specific visual encodings contained in the output specification.

Referring back to the example of FIG. 17B, in some implementations, in response to the voice command, the voice assistant device outputs a verbal response 1706 (e.g., "The most expensive wineries are located in the United States.") according to an output specification that is generated by VAIL. FIG. 17B shows the display screen 1700 displaying a visualization 1708 (e.g., a map) that includes shaded regions, corresponding to countries in which the most expensive wineries are located.

FIG. 17C illustrates a user interaction with the voice assistant device. In this example, the user provides a voice command "show me the most expensive varieties." In some implementations, in response to the voice command, VAIL updates an intent specification and generates an updated output specification in accordance with the updated intent specification. The voice assistant device outputs a verbal response 1710 (e.g., "The most expensive variety is the Cabernet Sauvignon."). FIG. 17C also shows the display screen 1700 displaying an updated visualization 1712 (e.g., a bar graph).

V. Flowcharts

FIGS. 18A-18E provide a flowchart of a method 1800. The method 1800 is also called a process.

The method 1800 is performed (1802) at an electronic device 102 running a first application (e.g., client application 224).

The electronic device 102 includes (1804) one or more processors 202 and memory 216. The memory stores (1806) one or more programs for execution by the one or more processors. In some implementations, the operations shown in FIGS. 4 to 17 correspond to instructions stored in the memory 216 or other non-transitory computer-readable storage medium. The computer-readable storage medium may include a magnetic or optical disk storage device, solid state storage devices such as Flash memory, or other non-volatile memory device or devices. The instructions stored on the computer-readable storage medium may include one or more of: source code, assembly language code, object code, or other instruction format that is interpreted by one or more processors. Some operations in the method 1800 may be combined and/or the order of some operations may be changed.

The electronic device 102 receives (1808) a request directed to a data source (e.g., data source 110). The request includes (1810) one or more intent types (e.g., intent types 229). Each intent type is selected (1811) from a predefined set of data analysis operations directed to the data source.

In some implementations, the one or more intent types include (1812) one or more of: a focus intent (e.g., focusing on a subset of data points), a trend intent, a correlation intent, a distribution intent, a geographic intent, an encoding intent, and a fields intent. This is illustrated in FIG. 6.

The request also includes (1814) one or more predefined attributes associated with the one or more intent types. Each of the one or more predefined attributes limits (1815) a respective data analysis operation of a respective intent type.

For each of the one or more intent types, the electronic device 102 formulates (1818) a respective intent specification (e.g., intent specifications 234) according to the request, including determining one or more respective properties of the respective intent specification according to the respective one or more predefined attributes and according to data fields, from the data source, specified in the request.

For each of the one or more intent types, the electronic device 102 also generates (1820) a respective output specification (e.g., output specifications 236). The respective output specification includes (1822) a respective recommended data visualization type, selected from a predefined set of data visualization types, for the data source, The respective output specification also includes (1824) one or more respective data visualization parameters that specify how to render a data visualization of the respective recommended data visualization type. This is illustrated in FIG. 8.

In some implementations, the one or more respective data visualization parameters include (1826): data-shaping information, encoding information, and/or an identifier corresponding to the intent specification. For example, data shaping includes information that modifies the data source (e.g., sorting or filtering) before it is being used. Encoding information lists a recommended type of visualization (e.g., bar chart or scatter plot) and recommended visual encodings for each of the fields to be displayed (e.g., x, y, color, and size). This is illustrated in FIG. 8.

In some implementations, after generating the respective output specification for each of the one or more intent types, the electronic device 102 visually renders (1828) data analysis responsive to the request, in accordance with (i) at least one output specification for one of the one or more intent types and (ii) configuration parameters of the first application and/or the electronic device.

In some instances, the request includes (1830) the trend intent. Formulating the respective intent specification includes identifying (1832) from the data source (i) a measure data field and (ii) a first data field that represents time. This is illustrated in FIG. 6. In some implementations, the first data field can be a time field, date field or a date/time field.

In some instances, the request includes (1834) the trend intent. Formulating the respective intent specification includes identifying (1836) from the data source (i) all measure data fields and (ii) all data fields that represent time.

In some instances, the request includes (1838) the focus intent. Formulating the respective intent specification includes executing (1840) one or more of: (1) a sort operation that arranges data rows from the data source in an order; (2) a filter operation that filters the data rows from the data source to a subset of data rows for which a specific data field has a specific data value; and (3) a highlight operation that highlights a subset of data rows (e.g., top row, top 3 rows, etc.).

In some implementations, the request includes the focus intent. Formulating the respective intent specification includes executing a "zoom" operation that zooms in (e.g., emphasizes, magnifies, directs the user's attention to) a subset of data rows.

In some instances, the request includes (1842) the encoding intent and specifies a first data field. Generating the respective output specification includes adding (1844) an encoding parameter that specifies rendering the data visualization according to the first data field; or overriding (1846) an existing encoding parameter for the data visualization according to the first data field.

In some instances, the request includes (1848) the fields intent and specifies a first data field. Generating a respective output specification includes applying (1850) one or more inferencing rules based on semantic constraints imposed by the first data field.

In some implementations, the method 1800 further comprises: for each of the one or more intent types, applying (1854) one or more respective rules corresponding to the respective intent type to determine whether the respective intent type is ambiguous and/or underspecified. In accordance with a determination that the respective intent type is ambiguous or underspecified, the electronic device 102 infers (1856) information to resolve the ambiguous and/or underspecified intent according to (i) the one or more respective rules (e.g., rules defined by the visual analytics in tent system 230, and described in FIGS. 4 to 13), (ii) metadata for the data source (e.g., metadata 246), and (iii) metadata for data fields specified in the request. The electronic device 102 updates (1858) the one or more respective data visualization parameters according to the inferred information.

In some instances, applying the one or more respective rules to determine whether the respective intent type is ambiguous and/or underspecified further comprises: in accordance with a determination (1860) that the request specifies a measurable adjective and does not specify a quantity (e.g., the request specifies "top" but does not specify a number), establishing (1862) that the respective intent type is ambiguous; and inferring (1864) a numeric value for the quantity.

In some instances, the metadata for the data source includes (1866) metadata for: semantics of data fields, data field types corresponding to the data fields, statistics of the data fields, derivations of the data fields, and/or default bin sizes corresponding to the data fields.

In some implementations, semantics of data fields of the data source, or data semantics, describe the specific set of data the user is interacting with. This includes a list of fields, their roles, and summary statistics. In some implementations, the data semantics can be retrieved from a database or curated by a user, to enable the visual analytics intent system 230 to better infer intent.

In some instances, the data field types include (1868) one or more of: a categorical field type, a time field type, a geographical field type, a currency field type, a quantitative dependent field type, a quantitative independent field type, a latitude field type, and a longitude field type.

In some implementations, the electronic device 102 infers (1870) information to resolve the ambiguous and/or underspecified intent according to context from previous requests, data fields identified in the previous requests, attributes identified in the previous requests, user-provided interpretations, and/or user-provided definitions.

FIGS. 19A-19G provide a flowchart of a method 1900. The method 1900 is also called a process.

The method 1900 is performed (1902) at an electronic device 102 running a first application (e.g., client application 224).

The electronic device 102 includes (1904) one or more processors 202 and memory 216. The memory stores (1906) one or more programs configured for execution by the one or more processors 202. In some implementations, the operations shown in FIGS. 4 to 17 correspond to instructions stored in the memory 216 or other non-transitory computer-readable storage medium. The computer-readable storage medium may include a magnetic or optical disk storage device, solid state storage devices such as Flash memory, or other non-volatile memory device or devices. The instructions stored on the computer-readable storage medium may include one or more of: source code, assembly language code, object code, or other instruction format that is interpreted by one or more processors. Some operations in the method 1800 may be combined and/or the order of some operations may be changed.

The electronic device 102 receives (1908) a request directed to a data source (e.g., data source 110). The request includes (1910) one or more intent types (e.g., intent types 229). Each intent type is selected (1911) from a predefined set of data analysis operations directed to the data source.

In some implementations, the one or more intent types include (1912) one or more of: a focus intent, a trend intent, a correlation intent, a distribution intent, a geographic intent, an encoding intent, and a fields intent. This is illustrated in FIG. 6.

In some implementations, the request also includes (1914) one or more predefined attributes associated with the one or more intent types. Each of the one or more predefined attributes limits (1915) a respective data analysis operation of a respective intent type.

In response to (1916) the request, for each of the one or more intent types, the electronic device 102 formulates (1918) a respective intent specification according to the request, including determining one or more respective properties of the respective intent specification according to the respective one or more predefined attributes and according to data fields, from the data source, specified in the request.

The electronic device 102 applies (1920) one or more respective rules corresponding to the respective intent type to determine whether the respective intent type is ambiguous and/or underspecified.

In accordance with a determination (1922) that the respective intent type is ambiguous and/or underspecified, the electronic device 102 infers (1924) information to resolve the ambiguous and/or underspecified intent according to (i) the one or more respective rules, (ii) metadata for the data source, and (iii) metadata for data fields specified in the request.

In some implementations, the metadata for the data source includes (1926) metadata for: semantics of data fields, data field types corresponding to the data fields, statistics of the data fields, derivations of the data fields, and/or default bin sizes corresponding to the data fields.

In some instances, the data field types include (1928) one or more of: a categorical field type, a time field type, a geographical field type, a currency field type, a quantitative dependent field type, a quantitative independent field type, a latitude field type, and a longitude field type.

The electronic device 102 updates (1930) the respective intent type according to the inferred information.

In some implementations, the method 1900 further comprises inferring (1932) information to resolve the ambiguous and/or underspecified intent according to context from previous requests, data fields identified in the previous requests, attributes identified in the previous requests, user-provided interpretations, and/or user-provided definitions. For example, the user can curate content to be appended in a data table of the data source. In some implementations, the user can also include as metadata definitions such as "this data field XX can be interpreted as a currency field."

In some implementations, the electronic device 102 (1934) generates a respective output specification. The respective output specification includes (1936) a respective recommended data visualization type, selected from a predefined set of data visualization types, for the data source. The respective output specification includes (1938) one or more respective data visualization parameters that (1) include the inferred information and (2) specify how to render a data visualization of the respective recommended data visualization type.

In some implementations, applying one or more respective rules to determine whether the respective intent type is ambiguous and/or underspecified further comprises: identifying (1940) a set of data properties corresponding to the respective intent specification for the respective intent type and determining (1942) whether the request specifies attributes for each data property of the set of data properties. In some implementations, when the request specifies more than one attribute for a data property in the set of data properties, the electronic device 102 determines (1944) that the respective intent type is ambiguous. In some implementations, when the request specifies no attribute for at least one data property in the set of data properties, the electronic device 102 determines (1946) that the respective intent type is underspecified In some instances, in accordance with a determination that the request specifies exactly one attribute for each data property of the set of data properties, the electronic device 102 establishes (1948) that the respective intent type is fully specified.

In some implementations, applying one or more respective rules to determine whether the respective intent type is ambiguous and/or underspecified further comprises: in accordance with a determination that the request specifies (1950) a measurable adjective and does not specify a quantity, the electronic device 102 establishes (1952) that the respective intent type is ambiguous. The electronic device 102 infers (1954) a numeric value for the quantity.

In some implementations, the respective intent type is (1956) a focus intent having a focus strategy property, Inferring information to resolve the underspecified intent further comprises: in accordance with a determination that the request does not include a first term selected from the group consisting of "filter," "highlight," and "zoom," selecting (1958) a highlight strategy as the default focus strategy.

In some instances, selecting the highlight strategy as the default strategy further comprises: executing (1962) a sort operation that arranges data rows from a data table of the data source in an ascending or a descending order according to data values of a data field in the data table; and executing (1964) a highlight operation that highlights a specified number of the data values based on ranking of the data values.

In some implementations, the respective intent type is (1966) a focus intent having a field property. Inferring information to resolve the underspecified intent further comprises: in accordance with a determination that the request does not specify a data field, selecting (1968) a data field, from the data source (e.g., based on the metadata), having a text data type and having a domain that is greater than or equal to a quantity specified in the request. In some implementations, the domain can be the same as the quantity specified in the request. In some implementations, if the quantity specified in the request is larger than the domain, the electronic device 102 can modify the quantity in the request to be the size of the domain.

In some implementations, the respective intent type is (1970) a focus intent having a field property, Inferring information to resolve the underspecified intent further comprises: in accordance with a determination that the data source does not include a data field with a text data type and a domain that is greater than or equal to a quantity specified, selecting (1972) a data field, from the data source, whose domain contains a data value that is specified in the request.

In some implementations, the respective intent type is (1974) a focus intent. The method 1900 further comprises: in accordance with a determination that the request includes an adjective for price (e.g., the adjective includes "cheap," "expensive," "most expensive," "cheapest," "extravagant" etc.), determining (1976) (e.g., based at least in part on the metadata) whether the data source includes a data field having a currency field type. In some implementations, in accordance with a determination that the data source includes a data field having a currency field type, the electronic device 102 executes (1978) a sort operation on the data field. In some implementations, in accordance with a determination (1980) that the data source does not include a data field having a currency field type, the electronic device 102 identifies (1982) all numeric data fields (e.g., measure fields) in the data source. The electronic device 102 executes (1984) a respective sort operation on each of the numeric data fields.

In some implementations, the respective intent type is (1986) a distribution intent having a grouping property that includes a grouping field and a bin size. Inferring information to resolve the underspecified intent further comprises: in accordance with a determination (1988) that the request does not specify a grouping field, (1) identifying (1990) all data fields in the data source having a quantitative dependent field type, a quantitative independent field type, or a currency field type; and (2) designating (1992) each of the identified data fields as the inferred information for the grouping field.

In some instances, in accordance with a determination that the request specifies a bin size, the electronic device 102 replaces (1994) bin size information in the metadata with the specified bin size.

In some implementations, the intent type is (1996) a trend intent having a trend property that includes a measure data field and a date data field. Inferring information to resolve the underspecified intent further comprises: in accordance with a determination (1998) that the request does not include a measure data field, (1) identifying (19100) all quantitative dependent fields in the data source; and (2) designating (19102) each of the quantitative dependent fields as the inferred information for the measure data field. In some implementations, inferring information to resolve the underspecified intent further comprises: in accordance with a determination (19104) that the request does not include a data field having a time field type: (1) identifying (19106) all time data fields in the data source; and (2) designating (19108) each of the time data fields as the inferred information for the date data field.

In some implementations, the intent type is (19110) a correlation intent to correlate two numeric data fields. Inferring information to resolve the underspecified intent further comprises: (1) when the request specifies only one numeric data field, inferring (19112) usage of a second data field from all numeric data fields from the data source; and (2) when the request specifies no numeric data fields, inferring (19114) usage of a first data field and a second data field, from all numeric data fields from the data source.

FIGS. 20A-20F provide a flowchart of a method 2000. The method 2000 is also called a process.

The method 2000 is performed (2002) at an electronic device 102 running a first application (e.g., client application 224).

The electronic device 102 includes (2004) one or more processors 202 and memory 216. The memory stores (2006) one or more programs configured for execution by the one or more processors 202. In some implementations, the operations shown in FIGS. 4 to 17 correspond to instructions stored in the memory 216 or other non-transitory computer-readable storage medium. The computer-readable storage medium may include a magnetic or optical disk storage device, solid state storage devices such as Flash memory, or other non-volatile memory device or devices. The instructions stored on the computer-readable storage medium may include one or more of: source code, assembly language code, object code, or other instruction format that is interpreted by one or more processors. Some operations in the method 1800 may be combined and/or the order of some operations may be changed.

The electronic device downloads (2008), from a server system (e.g., server system 300) that is communicatively connected with the electronic device, a visual analytics intent library (e.g., visual analytics intent library 323) that is configured to execute across a plurality of applications, including the first application.

The electronic device 102 configures (2010) the visual analytics intent library to execute on the electronic device based on the electronic device running the first application.

After the configuring, the electronic device 102 receives (2012) a request directed to a data source. The request includes (2014) one or more intent types. Each of the intent types is selected (2015) from a predefined set of data analysis operations directed to the data source.

In some implementations, the one or more intent types include (2016) one or more of: a focus intent, a trend intent, a correlation intent, a distribution intent, a geographic intent, an encoding intent, and a fields intent.

The request also includes (2018) one or more predefined attributes associated with the one or more intent types. Each of the one or more predefined attributes limits (2019) a respective data analysis operation of a respective intent type.

In accordance with the request, for each of the one or more intent types, the electronic device 102 formulates (2020) a respective intent specification according to the visual analytics intent library, including determining one or more respective properties of the respective intent specification according to the respective one or more predefined attributes and according to data fields, from the data source, specified in the request.

In some implementations, the electronic device has a first device type. In some implementations, the visual analytics intent library is configured to execute across a plurality of device types, including the first device type.

In some implementations, for each of the intent types, after formulating the respective intent specification, the electronic device 102 generates (2022) a respective output specification according to the visual analytics intent library. The respective output specification includes (2024) a respective recommended data visualization type, selected from a predefined set of data visualization types, for the data source. The respective output specification also includes (2026) one or more respective data visualization parameters that specify how to render a data visualization of the respective recommended data visualization type.

In some implementations, the one or more respective data visualization parameters include (2028): data-shaping information, encoding information, and/or an identifier corresponding to the intent specification.

In some implementations, after generating the respective output specification for each of the one or more intent types, the electronic device 102 visually renders (2030) data analysis responsive to the request, in accordance with (i) at least one output specification for one of the one or more intent types and (ii) configuration parameters of the first application and/or the electronic device.

In some implementations, visually rendering data analysis responsive to the request is further in accordance with (2032) the electronic device 102 having a first device type. For example, in some implementations, visually rendering data analysis responsive to the request is further in accordance with the electronic device having a display screen, or a size of the display screen), or peripherals such as audio input and output devices.

In some instances, the at least one output specification for one of the one or more intent types includes (2034) a first output specification corresponding to a first intent type and having inferred information. Visually rendering data analysis further comprises displaying (2036) the inferred information in the first application.

In some implementations, the electronic device 102 displays the inferred information in a visually distinct manner from information that is included in the request. In some implementations, displaying the inferred information includes displaying an identification of the data field(s) have been inferred. In some implementations, displaying the inferred information can include providing a description of how a term in the term in the request been interpreted.

In some instances, the electronic device 102 displays (2038) a data widget (e.g., data widget 1618, FIG. 16E) that enables the inferred information to be modified. The electronic device 102 receives (2040) a user interaction with the data widget. In response (2042) to the user interaction, the electronic device 102 edits (2044) the first intent specification. The electronic device 102 updates (2046) the first output specification in accordance with the edited first intent specification. The electronic device 102 generates (2048) and visually renders updated data analytics in accordance with the updated first output specification and the configuration parameters of the first application and/or the electronic device.

In some implementations, the electronic device 102 is (2050) a voice assistant device (e.g., voice assistant device 102-3 in FIG. 1 that does not include a display screen, or voice assistant device in FIG. 17, which includes a display screen 1700). The method 2000 further comprises: after generating the respective output specification, converting (2054) the respective output specification into a respective verbal response and outputting (2056) the respective verbal response.

For example, FIG. 17C illustrates in response to a user request to "Show me the most expensive varieties), the electronic device converts the output specification to a respective verbal response and outputs the verbal response 1710 "The most expensive variety is the Cabernet Sauvignon."

In some implementations, the verbal response can comprise a response that verbally describes a visualization. In some implementations, the verbal response can comprise a response that verbally describes how an ambiguous term in the request has been inferred.

In some instances, the respective output specification includes (2058) inferred information. Outputting the respective verbal response includes outputting (2060) a verbal description (e.g., explanation, clarification, etc.) of the inferred information.

In some implementations, after outputting the response, the voice assistant device can manifest a follow-up question to the user, to clarify or confirm that the inferred information is consistent with the user request.

In some implementations, the first application includes (2062) a graphical user interface. The method 2000 further comprises receiving (2064) the request, including identification of the one or more intent types, via the graphical user interface.

For example, as illustrated in FIGS. 14A to 14J, the first application 224 includes a graphical user interface 1400. The method further comprises receiving the request, including identification of the one or more intent types 1408, via the graphical user interface 1400.

In some instances, the electronic device 102 generates (2066) a respective data visualization according to the respective output specification. The electronic device 102 displays (2068) the data visualization on the graphical user interface. This is illustrated in FIGS. 14D, 14E, 14F, and 14H.

In some implementations, the first application is (2070) a messaging application. The method 2000 further comprising after generating (2072) the respective output specification: (1) converting (2074) the visual specification into a text output; and (2) displaying (2076) the text output in the messaging application.

For example, in some implementations, the first application is a messaging application such as the chat application 106 in FIG. 1 or the Slackbot application in FIGS. 15 and 16). The method further comprising after generating the respective output specification: converting the visual specification into a text output, such as text output 1612 in FIG. 16E or text output 1622 in FIG. 16G. The method also comprises displaying the text output in a user interface 1600 of the messaging application.

In some implementations, prior to receiving the request, the electronic device 102 receives (2078) a natural language command. The electronic device 102 parses (2080) the natural language command (e.g., using parser 226 or parser 1506) according to a visual intent specification language to form the request.

In some instances, the electronic device 102 determines (2082), according to the parsing, that the one or more intent types includes a trend intent type in accordance with the natural language command having a term "time" or a term "trend."

In some instances, the electronic device 102 determines (2084), according to the parsing, that the one or more intent types includes a focus intent type in accordance with the natural language command having a measurable adjective (e.g., an adjective such as "best," "worst," "high," "low," or "most expensive."). In some implementations, a measurable adjective refers to an adjective having attributes that can be quantified numerically, ranked, or arranged in a particular order.

In some implementations, the method 2000 further comprises updating (2086) a first intent specification formulated from a prior request by correlating the first intent specification with an intent specification formulated in the request.

In some instances, the prior request includes (2088) a first data field from the data source. The request specifies replacing (2090) the first data field with a second data field from the data source. Updating the first intent specification includes replacing (2092) the first data field with the second data field.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 216 stores a subset of the modules and data structures identified above. Furthermore, the memory 216 may store additional modules or data structures not described above.

The terminology used in the description of the invention herein is for the purpose of describin-particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method, comprising:
   at an electronic device running a first application, the electronic device including one or more processors and memory storing one or more programs for execution by the one or more processors:
   receiving a request directed to a data source, the request including (i) one or more intent types, each intent type selected from a predefined set of data analysis operations directed to the data source and (ii) one or more predefined attributes associated with the one or more intent types, each of the one or more predefined attributes limiting a respective data analysis operation of a respective intent type;

in response to the request, for each of the one or more intent types:

formulating a respective intent specification according to the request, including determining one or more respective properties of the respective intent specification according to the respective one or more predefined attributes and according to data fields, from the data source, specified in the request;

applying one or more respective rules corresponding to the respective intent type to determine whether the respective intent type is ambiguous and/or underspecified; and in accordance with a determination that the respective intent type is ambiguous and/or underspecified:

inferring information to resolve the ambiguous and/or underspecified intent according to (i) the one or more respective rules, (ii) metadata for the data source, and (iii) metadata for data fields specified in the request; and updating the respective intent type according to the inferred information.

2. The method of claim 1, further comprising:

generating a respective output specification, the respective output specification including (i) a respective recommended data visualization type, selected from a predefined set of data visualization types, for the data source, and (ii) one or more respective data visualization parameters that (1) include the inferred information and (2) specify how to render a data visualization of the respective recommended data visualization type.

3. The method of claim 1, wherein the one or more intent types include one or more of: a focus intent, a trend intent, a correlation intent, a distribution intent, a geographic intent, an encoding intent, and a fields intent.

4. The method of claim 1, wherein applying one or more respective rules to determine whether the respective intent type is ambiguous and/or underspecified further comprises:

identifying a set of data properties corresponding to the respective intent specification for the respective intent type; and determining whether the request specifies attributes for each data property of the set of data properties, wherein:

when the request specifies more than one attribute for a data property in the set of data properties, determining that the respective intent type is ambiguous; and when the request specifies no attribute for at least one data property in the set of data properties, determining that the respective intent type is underspecified.

5. The method of claim 4, further comprising:

in accordance with a determination that the request specifies exactly one attribute for each data property of the set of data properties, establishing that the respective intent type is fully specified.

6. The method of claim 1, wherein applying one or more respective rules to determine whether the respective intent type is ambiguous and/or underspecified further comprises:

in accordance with a determination that the request specifies a measurable adjective and does not specify a quantity:

establishing that the respective intent type is ambiguous; and inferring a numeric value for the quantity.

7. The method of claim 1, wherein:

the respective intent type is a focus intent having a focus strategy property; and inferring information to resolve the underspecified intent further comprises:

in accordance with a determination that the request does not include a term selected from the group consisting of "filter," "highlight," and "zoom," selecting a highlight strategy as the default focus strategy.

8. The method of claim 7, wherein:

selecting the highlight strategy as the default strategy further comprises:

executing a sort operation that arranges data rows from a data table of the data source in an ascending or a descending order according to data values of a data field in the data table; and executing a highlight operation that highlights a specified number of the data values based on ranking of the data values.

9. The method of claim 1, wherein:

the respective intent type is a focus intent having a field property; and inferring information to resolve the underspecified intent further comprises:

in accordance with a determination that the request does not specify a data field, selecting a data field, from the data source, having a text data type and having a domain that is greater than or equal to a quantity specified in the request.

10. The method of claim 1, wherein:

the respective intent type is a focus intent having a field property; and inferring information to resolve the underspecified intent further comprises:

in accordance with a determination that the data source does not include a data field with a text data type and a domain that is greater than or equal to a quantity specified, selecting a data field, from the data source, whose domain contains a data value that is specified in the request.

11. The method of claim 1, wherein the respective intent type is a focus intent, the method further comprising:

in accordance with a determination that the request includes an adjective for price, determining whether the data source includes a data field having a currency field type;

in accordance with a determination that the data source includes a data field having a currency field type, executing a sort operation on the data field; and in accordance with a determination that the data source does not include a data field having a currency field type:

identifying all numeric data fields in the data source; and executing a respective sort operation on each of the numeric data fields.

12. The method of claim 1, wherein the metadata for the data source includes metadata for: semantics of data fields, data field types corresponding to the data fields, statistics of the data fields, derivations of the data fields, and/or default bin sizes corresponding to the data fields.

13. The method of claim 12, wherein the data field types include one or more of: a categorical field type, a time field type, a geographical field type, a currency field type, a quantitative dependent field type, a quantitative independent field type, a latitude field type, and a longitude field type.

14. The method of claim 1, wherein:
the respective intent type is a distribution intent having a grouping property that includes a grouping field and a bin size; and
inferring information to resolve the underspecified intent further comprises:
in accordance with a determination that the request does not specify a grouping field:
identifying all data fields in the data source having a quantitative dependent field type, a quantitative independent field type, or a currency field type; and
designating each of the identified data fields as the inferred information for the grouping field.

15. The method of claim 14, further comprising:
in accordance with a determination that the request specifies a bin size, replacing bin size information in the metadata with the specified bin size.

16. The method of claim 1, wherein:
the intent type is a trend intent having a trend property that includes a measure data field and a date data field; and
inferring information to resolve the underspecified intent further comprises:
in accordance with a determination that the request does not include a measure data field:
identifying all quantitative dependent fields in the data source; and
designating each of the quantitative dependent fields as the inferred information for the measure data field; and/or
in accordance with a determination that the request does not include a data field having a time field type:
identifying all time data fields in the data source; and
designating each of the time data fields as the inferred information for the date data field.

17. The method of claim 1, wherein the intent type is a correlation intent to correlate two numeric data fields; and
inferring information to resolve the underspecified intent further comprises:
when the request specifies only one numeric data field, inferring usage of a second data field from all numeric data fields from the data source; and
when the request specifies no numeric data fields, inferring usage of a first data field and a second data field, from all numeric data fields from the data source.

18. The method of claim 1, further comprising inferring information to resolve the ambiguous and/or underspecified intent according to context from previous requests, data fields identified in the previous requests, attributes identified in the previous requests, user-provided interpretations, and/or user-provided definitions.

19. An electronic device, comprising:
one or more processors; and
memory coupled to the one or more processors, the memory storing one or more programs configured to be executed by the one or more processors, the one or more programs including instructions for:
receiving a request directed to a data source, the request including (i) one or more intent types, each intent type selected from a predefined set of data analysis operations directed to the data source and (ii) one or more predefined attributes associated with the one or more intent types, each of the one or more predefined attributes limiting a respective data analysis operation of a respective intent type;
in response to the request, for each of the one or more intent types:
formulating a respective intent specification according to the request, including determining one or more respective properties of the respective intent specification according to the respective one or more predefined attributes and according to data fields, from the data source, specified in the request;
applying one or more respective rules corresponding to the respective intent type to determine whether the respective intent type is ambiguous and/or underspecified; and
in accordance with a determination that the respective intent type is ambiguous and/or underspecified:
inferring information to resolve the ambiguous and/or underspecified intent according to (i) the one or more respective rules, (ii) metadata for the data source, and (iii) metadata for data fields specified in the request; and
updating the respective intent type according to the inferred information.

20. A non-transitory computer-readable storage medium storing one or more programs, the one or more programs comprising instructions, which when executed by an electronic device, cause the electronic device to perform operations comprising:
receiving a request directed to a data source, the request including (i) one or more intent types, each intent type selected from a predefined set of data analysis operations directed to the data source and (ii) one or more predefined attributes associated with the one or more intent types, each of the one or more predefined attributes limiting a respective data analysis operation of a respective intent type;
in response to the request, for each of the one or more intent types:
formulating a respective intent specification according to the request, including determining one or more respective properties of the respective intent specification according to the respective one or more predefined attributes and according to data fields, from the data source, specified in the request;
applying one or more respective rules corresponding to the respective intent type to determine whether the respective intent type is ambiguous and/or underspecified; and
in accordance with a determination that the respective intent type is ambiguous and/or underspecified:
inferring information to resolve the ambiguous and/or underspecified intent according to (i) the one or more respective rules, (ii) metadata for the data source, and (iii) metadata for data fields specified in the request; and
updating the respective intent type according to the inferred information.

* * * * *